United States Patent
Liu et al.

(10) Patent No.: US 12,150,117 B2
(45) Date of Patent: Nov. 19, 2024

(54) BASE STATION APPARATUS, TERMINAL APPARATUS, AND COMMUNICATION METHOD

(71) Applicant: Sharp Kabushiki Kaisha, Sakai (JP)

(72) Inventors: Liqing Liu, Sakai (JP); Shohei Yamada, Sakai (JP); Hiroki Takahashi, Sakai (JP); Masayuki Hoshino, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 350 days.

(21) Appl. No.: 17/421,425

(22) PCT Filed: Jan. 10, 2020

(86) PCT No.: PCT/JP2020/000546
§ 371 (c)(1),
(2) Date: Jul. 8, 2021

(87) PCT Pub. No.: WO2020/145368
PCT Pub. Date: Jul. 16, 2020

(65) Prior Publication Data
US 2022/0159682 A1    May 19, 2022

(30) Foreign Application Priority Data
Jan. 10, 2019   (JP) ................ 2019-002867

(51) Int. Cl.
*H04W 72/1268*   (2023.01)
*H04W 72/23*   (2023.01)

(52) U.S. Cl.
CPC ....... *H04W 72/1268* (2013.01); *H04W 72/23* (2023.01)

(58) Field of Classification Search
None
See application file for complete search history.

(56) References Cited

U.S. PATENT DOCUMENTS

2020/0154427 A1    5/2020   Choi et al.
2020/0374902 A1*  11/2020   Liu ..................... H04L 5/0053
(Continued)

FOREIGN PATENT DOCUMENTS

WO    2018/203657 A1    11/2018
WO    WO-2020030790 A1 *  2/2020   .......... H04L 5/0044

OTHER PUBLICATIONS

ETSI et al. (TS 138 214 V15.3.0—5G; NR; Physical layer procedures for data) (Oct. 2018) (Year: 2018).*
(Continued)

*Primary Examiner* — The Hy Nguyen
(74) *Attorney, Agent, or Firm* — Keating & Bennett, LLP

(57) ABSTRACT

A terminal apparatus includes a reception circuitry configured to receive a DCI format, and a transmission circuitry configured to repeatedly transmit, on a PUSCH, a transport block scheduled by the DCI format, wherein a first number of repetition transmissions, a second number for a symbol number of a start symbol, and a third number of consecutive symbols are given based on the DCI format, and the number of slots used for repetition transmission of the transport block is determined based on the first number, the second number, the third number, and the number of symbols per slot.

4 Claims, 23 Drawing Sheets

(56) References Cited

U.S. PATENT DOCUMENTS

2021/0058952 A1* 2/2021 Li ..................... H04W 72/1268
2021/0204285 A1* 7/2021 Ma ........................ H04L 5/0044
2021/0282137 A1* 9/2021 Wang .................... H04L 5/0055
2021/0314982 A1* 10/2021 Panteleev ............. H04L 5/0053

OTHER PUBLICATIONS

NTT DOCOMO, "Revision of SI: Study on New Radio Access Technology", RP-161214, 3GPP TSG RAN Meeting #72, Jun. 13-16, 2016, 8 pages.
Ericsson, "PUSCH Enhancements for NR URLLC", 3GPP TSG-RAN WG1 Meeting #95, R1-1812155, Nov. 12-16, 2018, pp. 1-7.

* cited by examiner

 PDSCH
(A) PDSCH mapping type A
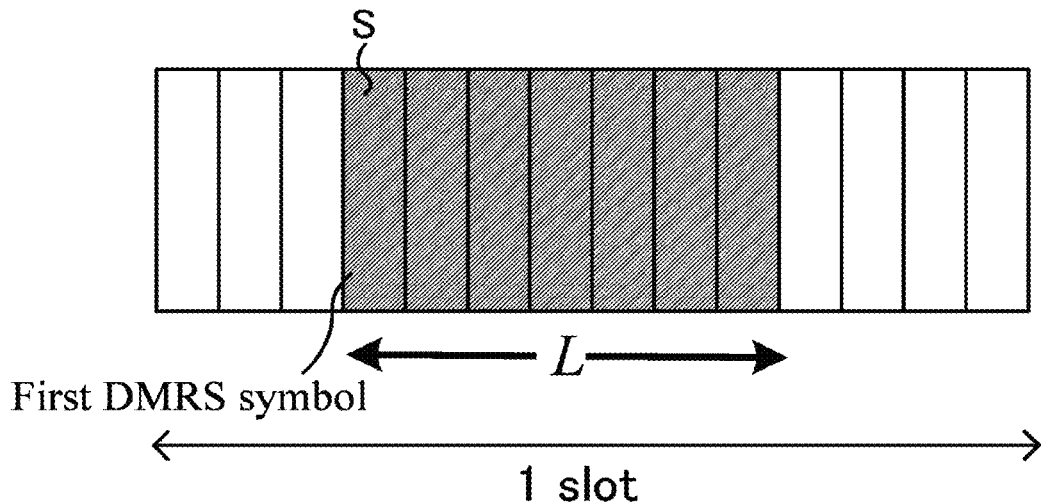
(B) PDSCH mapping type B
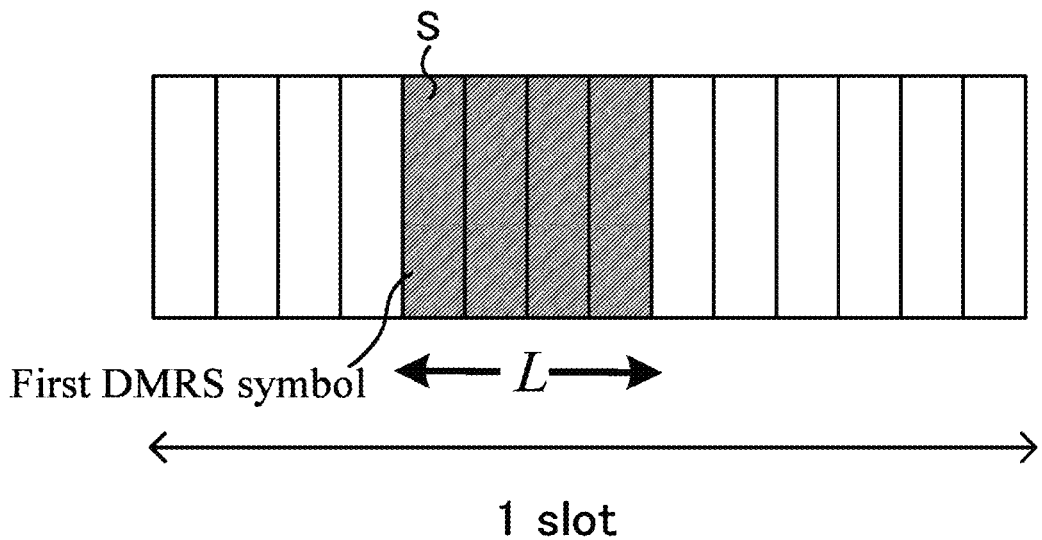
FIG. 7

Applicable PDSCH time domain resource allocation

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0 common | 1 | - | - | Default A for normal CP |
| | | 2 | - | - | Default B |
| | | 3 | - | - | Default C |
| SI-RNTI | Type0A common | 1 | No | - | Default A |
| | | 2 | No | - | Default B |
| | | 3 | No | - | Default C |
| | | 1,2,3 | Yes | - | pdsch-TimeDomainAllocationList provided in pdsch-ConfigCommon |
| RA-RNTI, TC-RNTI | Type1 common | 1, 2, 3 | No | - | Default A |
| | | 1, 2, 3 | Yes | - | pdsch-TimeDomainAllocationList provided in pdsch-ConfigCommon |
| P-RNTI | Type2 common | 1 | No | - | Default A |
| | | 2 | No | - | Default B |
| | | 3 | No | - | Default C |
| | | 1,2,3 | Yes | - | pdsch-TimeDomainAllocationList provided in pdsch-ConfigCommon |
| C-RNTI, MCS-C-RNTI, CS-RNTI | Any common search space associated with CORESET #0 | 1, 2, 3 | No | - | Default A |
| | | 1, 2, 3 | Yes | - | pdsch-TimeDomainAllocationList provided in pdsch-ConfigCommon |
| C-RNTI, MCS-C-RNTI, CS-RNTI | Any common search space not associated with CORESET #0 UE specific search space | 1,2,3 | No | No | Default A |
| | | 1,2,3 | Yes | No | pdsch-TimeDomainAllocationList provided in pdsch-ConfigCommon |
| | | 1,2,3 | No/Yes | Yes | pdsch-TimeDomainAllocationList provided in pdsch-Config |

FIG. 10

Default PDSCH time domain resource allocation A for normal CP

| Row index | dmrs-TypeA-Position | PDSCH mapping type | K₀ | S | L |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

FIG. 11

Default PDSCH time domain resource allocation B

| Row index | dmrs-TypeA-Position | PDSCH mapping type | $K_0$ | S | L |
|---|---|---|---|---|---|
| 1 | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 1 | 10 | 2 |
| 6 | 2,3 | Type B | 1 | 2 | 2 |
| 7 | 2,3 | Type B | 0 | 4 | 2 |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 (Note 1) | 2,3 | Type B | 0 | 10 | 4 |
| 13 (Note 1) | 2,3 | Type B | 0 | 2 | 7 |
| 14 (Note 1) | 2 | Type A | 0 | 2 | 12 |
| | 3 | Type A | 0 | 3 | 11 |
| 15 | 2,3 | Type B | 1 | 2 | 4 |
| 16 | | Reserved | | | |

Note 1: If the PDSCH was scheduled with SI-RNTI in PDCCH Type0 common search space, the UE may assume that this PDSCH resource allocation is not applied

FIG. 12

Default PDSCH time domain resource allocation C

| Row index | dmrs-TypeA-Position | PDSCH mapping type | $K_0$ | S | L |
|---|---|---|---|---|---|
| 1 (Note 1) | 2,3 | Type B | 0 | 2 | 2 |
| 2 | 2,3 | Type B | 0 | 4 | 2 |
| 3 | 2,3 | Type B | 0 | 6 | 2 |
| 4 | 2,3 | Type B | 0 | 8 | 2 |
| 5 | 2,3 | Type B | 0 | 10 | 2 |
| 6 | | | Reserved | | |
| 7 | | | Reserved | | |
| 8 | 2,3 | Type B | 0 | 2 | 4 |
| 9 | 2,3 | Type B | 0 | 4 | 4 |
| 10 | 2,3 | Type B | 0 | 6 | 4 |
| 11 | 2,3 | Type B | 0 | 8 | 4 |
| 12 | 2,3 | Type B | 0 | 10 | 4 |
| 13 (Note 1) | 2,3 | Type B | 0 | 2 | 7 |
| 14 (Note 1) | 2 | Type A | 0 | 2 | 12 |
| | 3 | Type A | 0 | 3 | 11 |
| 15 (Note 1) | 2,3 | Type A | 0 | 0 | 6 |
| 16 (Note 1) | 2,3 | Type A | 0 | 2 | 6 |
| Note 1: The UE may assume that this PDSCH resource allocation is not used, if the PDSCH was scheduled with SI-RNTI in PDCCH Type0 common search space | | | | | |

FIG. 13

The starting symbol $S$ relative to the start of the slot, and the number of consecutive symbols $L$ counting from the symbol $S$ allocated for the PDSCH are determined from the start and length indicator $SLIV$:

if $(L-1) \leq 7$ then $$SLIV = 14 \cdot (L-1) + S$$

else $$SLIV = 14 \cdot (14 - L + 1) + (14 - 1 - S)$$

where $0 < L \leq 14 - S$

FIG. 14

Redundancy version when *pusch-AggregationFactor* is present

| $rv_{id}$ indicated by the DCI scheduling the PUSCH | $rv_{id}$ to be applied to $n^{th}$ transmission occasion | | | |
|---|---|---|---|---|
| | $n \bmod 4 = 0$ | $n \bmod 4 = 1$ | $n \bmod 4 = 2$ | $n \bmod 4 = 3$ |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

FIG. 15

Applicable PUSCH time domain resource allocation

| RNTI | PDCCH search space | pusch-ConfigCommon includes pusch-TimeDomainAllocationList | pusch-Config includes pusch-TimeDomainAllocationList | PUSCH time domain resource allocation to apply |
|---|---|---|---|---|
|  | PUSCH scheduled by MAC RAR as described in subclause 8.2 of [6, TS 38.213] | No | - | Default A |
|  |  | Yes |  | pusch-TimeDomainAllocationList provided in pusch-ConfigCommon |
| C-RNTI, MCS-C-RNTI, TC-RNTI, CS-RNTI | Any common search space associated with CORESET 0 | No | - | Default A |
|  |  | Yes |  | pusch-TimeDomainAllocationList provided in pusch-ConfigCommon |
| C-RNTI, MCS-C-RNTI, TC-RNTI | Any common search space not associated with CORESET 0, | No | No | Default A |
|  |  | Yes | No | pusch-TimeDomainAllocationList provided in pusch-ConfigCommon |
| CS-RNTI | UE specific search space | No/Yes | Yes | pusch-TimeDomainAllocationList provided in pusch-Config |

FIG. 16

Default PUSCH time domain resource allocation A for normal CP (PUSCH default A)

| Row index | PUSCH mapping type | $K_2$ | S | L |
|---|---|---|---|---|
| 1 | Type A | $j$ | 0 | 14 |
| 2 | Type A | $j$ | 0 | 12 |
| 3 | Type A | $j$ | 0 | 10 |
| 4 | Type B | $j$ | 2 | 10 |
| 5 | Type B | $j$ | 4 | 10 |
| 6 | Type B | $j$ | 4 | 8 |
| 7 | Type B | $j$ | 4 | 6 |
| 8 | Type A | $j+1$ | 0 | 14 |
| 9 | Type A | $j+1$ | 0 | 12 |
| 10 | Type A | $j+1$ | 0 | 10 |
| 11 | Type A | $j+2$ | 0 | 14 |
| 12 | Type A | $j+2$ | 0 | 12 |
| 13 | Type A | $j+2$ | 0 | 10 |
| 14 | Type B | $j$ | 8 | 6 |
| 15 | Type A | $j+3$ | 0 | 14 |
| 16 | Type A | $j+3$ | 0 | 10 |

FIG. 17

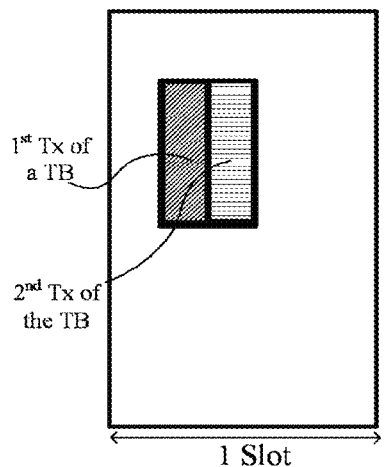
(a) frequencyHopping is not enabled
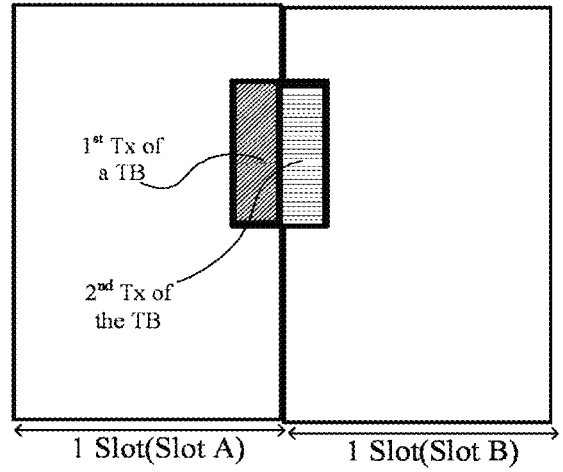
(b) frequencyHopping is not enabled
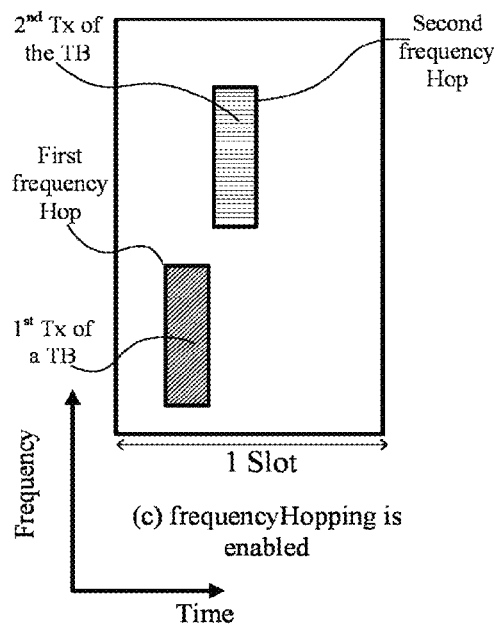
(c) frequencyHopping is enabled
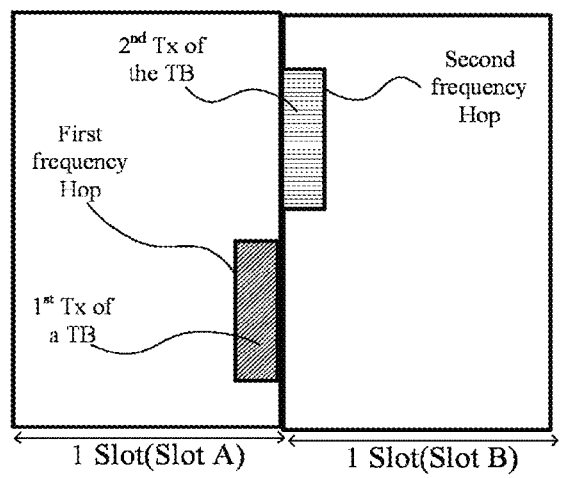
(d) frequencyHopping is enabled
FIG. 18

BASE STATION APPARATUS, TERMINAL APPARATUS, AND COMMUNICATION METHOD

TECHNICAL FIELD

The present invention relates to a base station apparatus, a terminal apparatus, and a communication method.

This application claims priority based on JP 2019-2867 filed on Jan. 10, 2019, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

CITATION LIST

Non Patent Literature

NPL 1: RP-161214, NTT DOCOMO, "Revision of SI: Study on New Radio Access Technology", June 2016

SUMMARY OF INVENTION

Technical Problem

An object of an aspect of the present invention is to provide a terminal apparatus, a base station apparatus, a communication method, and an integrated circuit that enable efficient communication in a radio communication system as described above.

Solution to Problem (1) In order to achieve the aforementioned object, aspects of the present invention provide the following measures. Specifically, a terminal apparatus according to an aspect of the present invention includes: a reception circuitry configured to receive a DCI format; and a transmission circuitry configured to repeatedly transmit, on a PUSCH, a transport block scheduled by the DCI format, wherein a first number of repetition transmissions, a second number for a symbol number of a start symbol, and a third number of consecutive symbols are given based on the DCI format, and the number of slots used for repetition transmission of the transport block is determined based on the first number, the second number, the third number, and the number of symbols per slot.

(2) A base station apparatus according to an aspect of the present invention includes: a transmission circuitry configured to transmit a DCI format; and a reception circuitry configured to receive, on a PUSCH, a repetition transmission of a transport block scheduled by the DCI format, wherein a first number of repetition transmissions, a second number for a symbol number of a start symbol, and a third number of consecutive symbols are given based on the DCI format, and the number of slots used for repetition transmission of the transport block is determined based on the first number, the second number, the third number, and the number of symbols per slot.

(3) A communication method according to an aspect of the present invention is a communication method for a terminal apparatus, the communication method including: receiving a DCI format; and repeatedly transmitting, on a PUSCH, a transport block scheduled by the DCI format, wherein a first number of repetition transmissions, a second number for a symbol number of a start symbol, and a third number of consecutive symbols are given based on the DCI format; and the number of slots used for repetition transmission of the transport block is determined based on the first number, the second number, the third number, and the number of symbols per slot.

(4) A communication method according to an aspect of the present invention is a communication method for a base station apparatus, the communication method including: transmitting a DCI format; and receiving, on a PUSCH, a repetition transmission of a transport block scheduled by the DCI format, wherein a first number of repetition transmissions, a second number for a symbol number of a start symbol, and a third number of consecutive symbols are given based on the DCI format; and the number of slots used for repetition transmission of the transport block is determined based on the first number, the second number, the third number, and the number of symbols per slot.

Advantageous Effects of Invention

According to an aspect of the present invention, a base station apparatus and a terminal apparatus can efficiently communicate with each other.

BRIEF DESCRIPTION OF DRAWINGS

FIG. 7 is a diagram illustrating an example of a PDSCH mapping type according to an embodiment of the present invention.

FIG. 10 is a diagram illustrating definition of which resource allocation table is applied to PDSCH time domain resource allocation according to an embodiment of the present invention.

FIG. 11 is a diagram illustrating an example of a default table A according to an embodiment of the present invention.

FIG. 12 is a diagram illustrating an example of a default table B according to an embodiment of the present invention.

FIG. 13 is a diagram illustrating an example of a default table C according to an embodiment of the present invention.

FIG. 14 is a diagram illustrating an example in which SLIV is calculated according to an embodiment of the present invention.

FIG. 15 is a diagram illustrating an example of a redundancy version applied to a transmission occasion according to the present embodiment.

FIG. 16 is a diagram illustrating definition of which resource allocation table is applied to PUSCH time domain resource allocation according to the present embodiment.

FIG. 17 is a diagram illustrating an example of a PUSCH default table A according to the present embodiment.

FIG. 18 is a diagram illustrating another example of determination of the number of repetition transmissions and frequency hopping according to the present embodiment.

DESCRIPTION OF EMBODIMENTS

Embodiments of the present invention will be described below.

Figure 1:
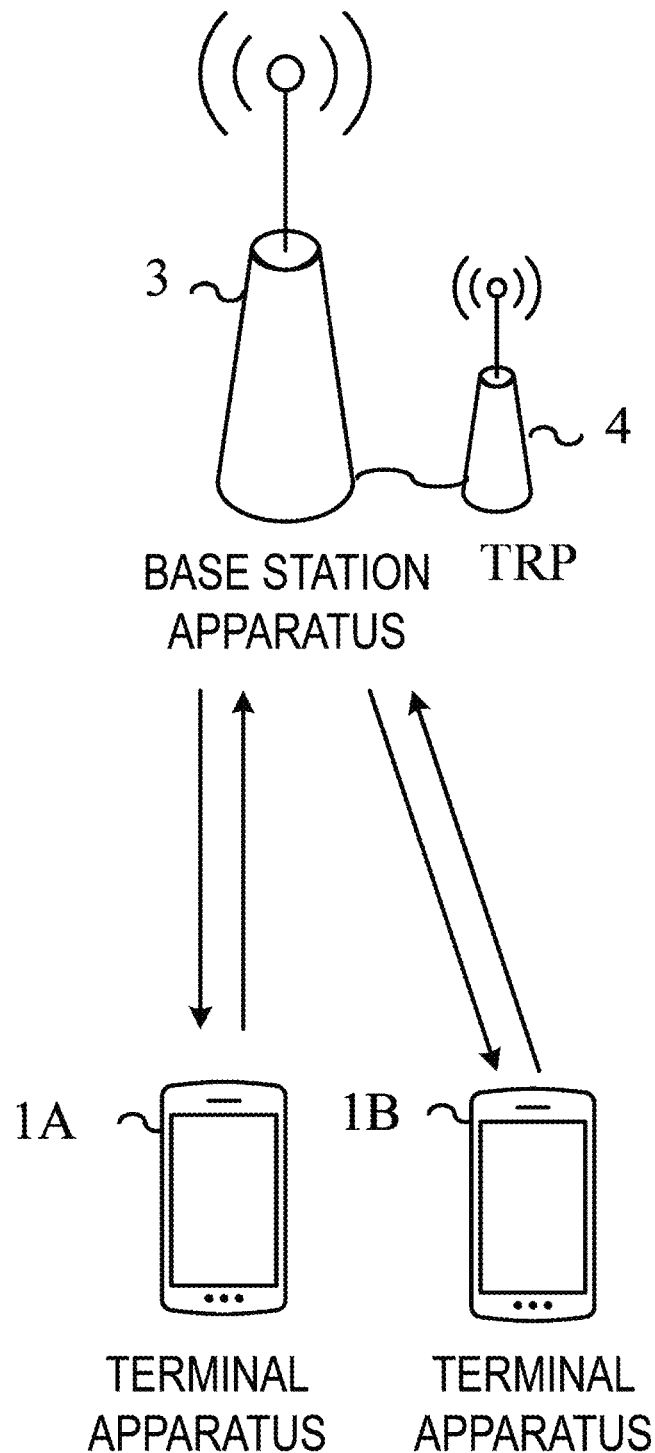
FIG. 1 is a diagram illustrating a concept of a radio communication system according to an embodiment of the present invention.

FIG. 1 is a conceptual diagram of a radio communication system according to the present embodiment. In FIG. 1, the radio communication system includes a terminal apparatus 1A, a terminal apparatus 1B, and a base station apparatus 3. The terminal apparatus 1A and the terminal apparatus 1B are also referred to as a terminal apparatus 1 below.

The terminal apparatus 1 is also called a user terminal, a mobile station device, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB. The base station apparatus 3 may include a core network apparatus. Furthermore, the base station apparatus 3 may include one or multiple transmission reception points (TRPs) 4. At least some of the functions/processing of the base station apparatus 3 described below may be the functions/processing of each of the transmission reception points 4 included in the base station apparatus 3. The base station apparatus 3 may use a communicable range (communication area) controlled by the base station apparatus 3, as one or multiple cells to serve the terminal apparatus 1. Furthermore, the base station apparatus 3 may use a communicable range (communication area) controlled by one or multiple transmission reception points 4, as one or multiple cells to serve the terminal apparatus 1. Furthermore, one cell may be divided into multiple beamed areas, and the terminal apparatus 1 may be served in each of the beamed areas. Here, a beamed area may be identified based on a beam index used for beamforming or a precoding index.

A radio communication link from the base station apparatus 3 to the terminal apparatus 1 is referred to as a downlink. A radio communication link from the terminal apparatus 1 to the base station apparatus 3 is referred to as an uplink.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that the present embodiment will be described in conjunction with OFDM symbols with the assumption that OFDM is used as a transmission scheme but that use of any other transmission scheme is also included in the present invention.

Furthermore, in FIG. 1, in the radio communication between the terminal apparatus 1 and the base station apparatus 3, the CP need not be used, or the above-described transmission scheme with zero padding may be used instead of the CP. Moreover, the CP or zero passing may be added both forward and backward.

An aspect of the present embodiment may be operated in carrier aggregation or dual connectivity with the Radio Access Technologies (RAT) such as LTE and LTE-A/LTE-A Pro. In this case, the aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). Moreover, the aspect may be independently operated and used in a stand-alone manner. In the dual connectivity operation, the Special Cell (SpCell) is referred to as a PCell of the MCG or a PSCell of the SCG, respectively, depending on whether a Medium Access Control (MAC) entity is associated with the MCG or the SCG. In a case that the operation is not in dual connectivity, the Special Cell (SpCell) is referred to as a PCell. The Special Cell (SpCell) supports PUCCH transmission and contention based random access.

In the present embodiment, one or multiple serving cells may be configured for the terminal apparatus 1. The multiple serving cells configured may include one primary cell and one or multiple secondary cells. The primary cell may be a serving cell on which an initial connection establishment procedure has been performed, a serving cell in which a connection re-establishment procedure has been initiated, or a cell indicated as a primary cell in a handover procedure. One or multiple secondary cells may be configured at a point of time in a case that or after a Radio Resource Control (RRC) connection is established. Note that the multiple serving cells configured may include one primary secondary cell. The primary secondary cell may be a secondary cell that is included in the one or multiple secondary cells configured and in which the terminal apparatus 1 can transmit control information in the uplink. Additionally, subsets of two types of serving cells corresponding to a master cell group and a secondary cell group may be configured for the terminal apparatus 1. The master cell group may include one primary cell and zero or more secondary cells. The secondary cell group may include one primary secondary cell and zero or more secondary cells.

Time Division Duplex (TDD) and/or Frequency Division Duplex (FDD) may be applied to the radio communication system according to the present embodiment. The Time Division Duplex (TDD) scheme or the Frequency Division Duplex (FDD) scheme may be applied to all of the multiple cells. Cells to which the TDD scheme is applied and cells to which the FDD scheme is applied may be aggregated. The TDD scheme may be referred to as an unpaired spectrum operation. The FDD scheme may be referred to as a paired spectrum operation.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described.

In FIG. 1, the following physical channels are used for the radio communication between the terminal apparatus 1 and the base station apparatus 3.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast essential information block ((Master Information Block (MIB), Essential Information Block (EIB), and Broadcast Channel (BCH)) which includes essential system information needed by the terminal apparatus 1.

The PBCH may be used to broadcast time indexes within the period of synchronization signal blocks (also referred to as SS/PBCH blocks). Here, the time index is information indicating the indexes of the synchronization signals and the PBCHs within the cell. For example, in a case that the SS/PBCH block is transmitted using the assumption of three transmission beams (transmission filter configuration and Quasi Co-Location (QCL) related to reception spatial parameters), the order of time within a prescribed period or within a configured period may be indicated. Additionally, the terminal apparatus may recognize the difference in time index as a difference in transmission beam.

The PDCCH is used to transmit (or carry) downlink control information (DCI) in a case of downlink radio communication (radio communication from the base station apparatus 3 to the terminal apparatus 1). Here, one or multiple pieces of DCI (which may be referred to as DCI formats) are defined for transmission of the downlink control information. In other words, a field for the downlink control information is defined as DCI and is mapped to information bits. The PDCCH is transmitted in a PDCCH candidate. The terminal apparatus 1 monitors a set of PDCCH candidates in the serving cell. The monitoring means an attempt to decode the PDCCH in accordance with a certain DCI format.

For example, the following DCI format may be defined.
DCI format 0_0
DCI format 0_1
DCI format 1_0
DCI format 1_1
DCI format 2_0
DCI format 2_1
DCI format 2_2
DCI format 2_3

DCI format 0_0 may be used for scheduling of the PUSCH in a certain serving cell. DCI format 0_0 may include information indicating PUSCH scheduling information (frequency domain resource allocation and time domain resource allocation). DCI format 0_0 may additionally include a CRC scrambled with any one of the C-RNTI, the CS-RNTI, the MCS-C-RNTI, and/or the TC-RNTI. DCI format 0_0 may be monitored in a common search space or a UE-specific search space.

DCI format 0_1 may be used for scheduling of the PUSCH in a certain serving cell. DCI format 0_1 may include information indicating PUSCH scheduling information (frequency domain resource allocation and time domain resource allocation), information indicating a Bandwidth Part (BWP), a Channel State Information (CSI) request, a Sounding Reference Signal (SRS) request, and information related to antenna ports. DCI format 0_1 may additionally include a CRC scrambled with any one of the C-RNTI, the CS-RNTI, the SP-CSI-RNTI, and/or the MCS-C-RNTI. DCI format 0_1 may be monitored in the UE-specific search space.

DCI format 1_0 may be used for scheduling of the PDSCH in a certain serving cell. DCI format 1_0 may include information indicating PDSCH scheduling information (frequency domain resource allocation and time domain resource allocation). DCI format 1_0 may additionally include a CRC scrambled with any one of the C-RNTI, the CS-RNTI, the MCS-C-RNTI, a P-RNTI, an SI-RNTI, an RA-RNTI, and/or a TC-RNTI. DCI format 1_0 may be monitored in the common search space or the UE-specific search space.

DCI format 1_1 may be used for scheduling of the PDSCH in a certain serving cell. DCI format 1_1 may include information indicating PDSCH scheduling information (frequency domain resource allocation and time domain resource allocation), information indicating a bandwidth part (BWP), transmission configuration indication (TCI), and information related to the antenna ports. DCI format 1_1 may additionally include a CRC scrambled with any one of the C-RNTI, the CS-RNTI, and/or the MCS-C-RNTI. DCI format 1_1 may be monitored in the UE-specific search space.

DCI format 2_0 is used to notify the slot format of one or multiple slots. The slot format is defined as a format in which each OFDM symbol in the slot is classified as downlink, flexible, or uplink. For example, in a case that the slot format is 28, DDDDDDDDDDDDFU is applied to the 14 OFDM symbols in the slot for which slot format 28 is indicated. Here, D is a downlink symbol, F is a flexible symbol, and U is an uplink symbol. Note that the slot will be described below.

DCI format 2_1 is used to notify the terminal apparatus 1 of physical resource blocks and OFDM symbols which may be assumed to involve no transmission. Note that this information may be referred to as a pre-emption indication (intermittent transmission indication).

DCI format 2_2 is used for transmission of the PUSCH and a Transmit Power Control (TPC) command for the PUSCH.

DCI format 2_3 is used to transmit a group of TPC commands for transmission of sounding reference signals (SRSs) by one or multiple terminal apparatuses 1. Additionally, the SRS request may be transmitted along with the TPC command. In addition, the SRS request and the TPC command may be defined in the DCI format 2_3 for uplink with no PUSCH and PUCCH or uplink in which the transmit power control for the SRS is not associated with the transmit power control for the PUSCH.

Here, the DCI for the downlink is also referred to as downlink grant or downlink assignment. Here, the DCI for the uplink is also referred to as uplink grant or uplink assignment. The DCI may also be referred to as a DCI format.

The Cyclic Redundancy Check (CRC) parity bits added to the DCI format transmitted on one PDCCH are scrambled with a System Information-Radio Network Temporary Identifier (SI-RNTI), a Paging-Radio Network Temporary Identifier (P-RNTI), a Cell-Radio Network Temporary Identifier (C-RNTI), a Configured Scheduling-Radio Network Temporary Identifier (CS-RNTI), a Random Access-Radio Network Temporary Identity (RA-RNTI), or a Temporary C-RNTI. The SI-RNTI may be an identifier used for broadcasting of the system information. The P-RNTI may be an identifier used for paging and notification of system information modification. The C-RNTI, the MCS-C-RNTI, and the CS-RNTI are identifiers for identifying a terminal apparatus within a cell. The Temporary C-RNTI is an identifier for identifying the terminal apparatus 1 that has transmitted a random access preamble during a contention based random access procedure.

The C-RNTI (identifier (identification information) of terminal apparatus) is used to control the PDSCH or the PUSCH in one or multiple slots.

The CS-RNTI is used to periodically allocate a resource for the PDSCH or the PUSCH.

The MCS-C-RNTI is used to indicate the use of a prescribed MCS table for grant-based transmission.

The Temporary C-RNTI (TC-RNTI) is used to control PDSCH transmission or PUSCH transmission in one or multiple slots.

The Temporary C-RNTI is used to schedule re-transmission of a random access message 3 and transmission of a random access message 4.

The RA-RNTI (random access response identification information) is determined in accordance with frequency and time position information regarding the physical random access channel on which the random access preamble has been transmitted.

The PUCCH is used to transmit Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate an HARQ-ACK for downlink data (Transport block, Medium Access Control Protocol Data Unit (MAC PDU), or Downlink-Shared CHannel (DL-SCH)).

The PDSCH is used to transmit downlink data (Downlink Shared CHannel (DL-SCH)) from a Medium Access Control (MAC) layer. Furthermore, in a case of the downlink, the PSCH is used to transmit System Information (SI), a Random Access Response (RAR), and the like.

The PUSCH may be used to transmit uplink data (UpLink-Shared CHannel (UL-SCH)) from the MAC layer or to transmit the HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. The base station apparatus 3 and the terminal apparatus 1 may transmit and/or receive a Medium Access Control (MAC) control element in a Medium Access Control (MAC) layer. Additionally, the RRC layer of the terminal apparatus 1 acquires system information broadcast from the base station apparatus 3. In this regard, the RRC signaling, the system information, and/or the MAC control element is also referred to as higher layer signaling or a higher layer parameter. The higher layer as used herein means a higher layer as viewed from the physical layer, and thus may include one or multiple of the MAC layer, the RRC layer, an RLC layer, a PDCP layer, a Non Access Stratum (NAS) layer, and the like. For example, in the processing of the MAC layer, the higher layer may include one or multiple of the RRC layer, the RLC layer, the PDCP layer, the NAS layer, and the like. Hereinafter, "A is given in the higher layer" or "A is given by the higher layer" may mean that the higher layer (mainly the RRC layer, the MAC layer, or the like) of the terminal apparatus 1 receives A from the base station apparatus 3 and that A received is provided from the higher layer of the terminal apparatus 1 to the physical layer of the terminal apparatus 1. Configuring a higher layer parameter for the terminal apparatus 1 may mean that the higher layer parameter is provided to the terminal apparatus.

The PDSCH or the PUSCH may be used to transmit the RRC signaling and the MAC control element. In this regard, in the PDSCH, the RRC signaling transmitted from the base station apparatus 3 may be signaling common to multiple terminal apparatuses 1 in a cell. The RRC signaling transmitted from the base station apparatus 3 may be dedicated signaling for a certain terminal apparatus 1 (also referred to as dedicated signaling). In other words, terminal apparatus-specific (UE-specific) information may be transmitted through dedicated signaling to the certain terminal apparatus 1. Additionally, the PUSCH may be used to transmit UE capabilities in the uplink.

In FIG. 1, the following downlink physical signals are used for downlink radio communication. Here, the downlink physical signals are not used to transmit information output from the higher layers but are used by the physical layer.

Synchronization signal (SS)
Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to establish synchronization in a frequency domain and a time domain in the downlink. Here, the synchronization signal may be used for the terminal apparatus 1 to select precoding or a beam in precoding or beamforming performed by the base station apparatus 3. Note that the beam may be referred to as a transmission or reception filter configuration, or a spatial domain transmission filter or a spatial domain reception filter.

A reference signal is used for the terminal apparatus 1 to perform channel compensation on a physical channel. Here, the reference signal is used for the terminal apparatus 1 to calculate the downlink CSI. Furthermore, the reference signal may be used for a numerology such as a radio parameter or subcarrier spacing, or used for fine synchronization that allows FFT window synchronization to be achieved.

According to the present embodiment, at least one of the following downlink reference signals are used.
  Demodulation Reference Signal (DMRS)
  Channel State Information Reference Signal (CSI-RS)
  Phrase Tracking Reference Signal (PTRS)
  Tracking Reference Signal (TRS)

The DMRS is used to demodulate a modulated signal. Note that two types of reference signals may be defined as the DMRS: a reference signal for demodulating the PBCH and a reference signal for demodulating the PDSCH or that both reference signals may be referred to as the DMRS. The CSI-RS is used for measurement of Channel State Information (CSI) and beam management, and a transmission method for a periodic, semi-persistent, or aperiodic CSI reference signal is applied to the CSI-RS. For the CSI-RS, a Non-Zero Power (NZP) CSI-RS and a CSI-RS with zero transmit power (or receive power) (Zero Power (ZP)) may be defined. Here, the ZP CSI-RS may be defined as a CSI-RS resource that has zero transmit power or that is not transmitted. The PTRS is used to track phase on the time axis to ensure frequency offset caused by phase noise. The TRS is used to ensure Doppler shift during fast movement. Note that the TRS may be used as one configuration of the CSI-RS. For example, a radio resource may be configured with the CSI-RS for one port as a TRS.

According to the present embodiment, one or multiple of the following uplink reference signals are used.
  Demodulation Reference Signal (DMRS)
  Phase Tracking Reference Signal (PTRS)
  Sounding Reference Signal (SRS)

The DMRS is used to demodulate a modulated signal. Note that two types of reference signals may be defined as the DMRS: a reference signal for demodulating the PUCCH and a reference signal for demodulating the PUSCH or that both reference signals may be referred to as the DMRS. The SRS is used for measurement of uplink channel state information (CSI), channel sounding, and beam management. The PTRS is used to track phase on the time axis to ensure frequency offset caused by phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

Figure 2:
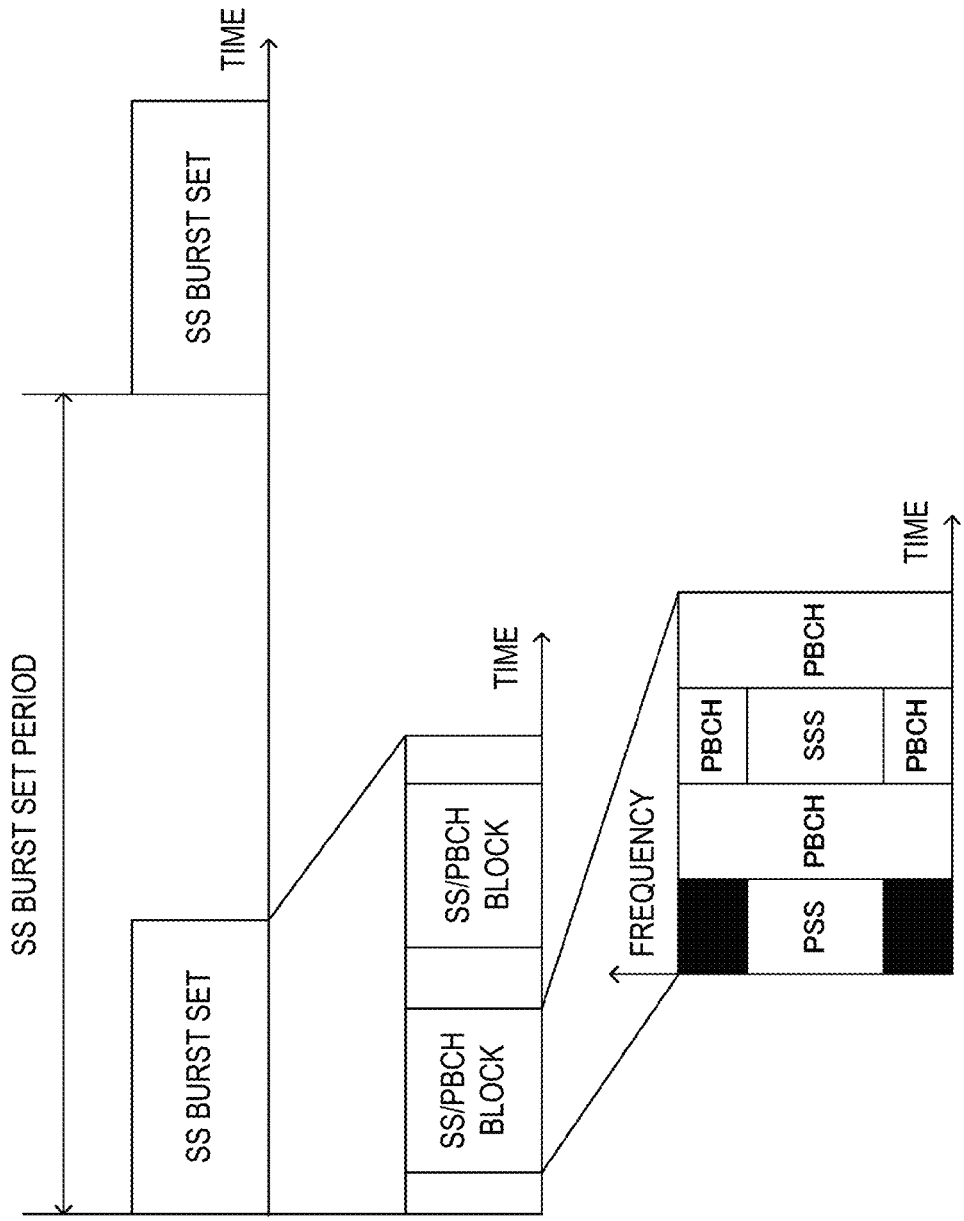
FIG. 2 is a diagram illustrating an example of an SS/PBCH block and an SS burst set according to an embodiment of the present invention.

FIG. 2 is a diagram illustrating an example of SS/PBCH blocks (also referred to as synchronization signal blocks, SS blocks, and SSBs) and SS burst sets (also referred to as synchronization signal burst sets) according to the present embodiment. FIG. 2 illustrates an example in which two SS/PBCH blocks are included in a periodically transmitted SS burst set, and the SS/PBCH block includes continuous four OFDM symbols.

The SS/PBCH block is a unit block including at least synchronization signals (PSS, SSS) and/or PBCHs. Transmitting the signals/channels included in the SS/PBCH block is described as transmitting the SS/PBCH block. In a case of transmitting the synchronization signals and/or the PBCHs using one or multiple SS/PBCH blocks in the SS burst set, the base station apparatus 3 may use an independent downlink transmission beam for each SS/PBCH block.

In FIG. 2, PSS, SSS, and PBCHs are time/frequency multiplexed in one SS/PBCH block. However, the order in which the PSS, the SSS, and/or the PBCHs are multiplexed in the time domain may be different from the order in the example illustrated in FIG. 2.

The SS burst set may be transmitted periodically. For example, a period used for initial access and a period configured for a connected (Connected or RRC_Connected) terminal apparatus may be defined. Furthermore, the period configured for the connected (Connected or RRC_Connected) terminal apparatus may be configured in the RRC layer. Additionally, the period configured for the connected (Connected or RRC_Connected) terminal may be a period of a radio resource in the time domain during which transmission is potentially to be performed, and in practice, whether the transmission is to be performed during the period may be determined by the base station apparatus 3. Furthermore, the period used for the initial access may be predefined in specifications or the like.

The SS burst set may be determined based on a System Frame Number (SFN). Additionally, a start position of the SS burst set (boundary) may be determined based on the SFN and the period.

The SS/PBCH block is assigned with an SSB index (which may be referred to as the SSB/PBCH block index) depending on the temporal position in the SS burst set. The terminal apparatus 1 calculates the SSB index, based on the information of the PBCH and/or the information of the reference signal included in the detected SS/PBCH block.

The SS/PBCH blocks with the same relative time in each SS burst set in the multiple SS burst sets are assigned with the same SSB index. The SS/PBCH blocks with the same relative time in each SS burst set in the multiple SS burst sets may be assumed to be QCLed (or the same downlink transmission beam may be assumed to be applied to these SS/PBCH blocks). In addition, antenna ports in the SS/PBCH blocks with the same relative time in each SS burst set in the multiple SS burst sets may be assumed to be QCLed for average delay, Doppler shift, and spatial correlation.

Within a certain SS burst set period, the SS/PBCH block assigned with the same SSB index may be assumed to be QCLed for average delay, average gain, Doppler spread, Doppler shift, and spatial correlation. A configuration corresponding to one or multiple SS/PBCH blocks (or the SS/PBCH blocks may be reference signals) that are QCLed may be referred to as a QCL configuration.

The number of SS/PBCH blocks (which may be referred to as the number of SS blocks or the SSB number) may be defined as, for example, the number of SS/PBCH blocks within an SS burst, an SS burst set, or an SS/PBCH block period. Additionally, the number of SS/PBCH blocks may indicate the number of beam groups for cell selection within the SS burst, the SS burst set, or the SS/PBCH block period. Here, the beam group may be defined as the number of different SS/PBCH blocks or the number of different beams included in the SS burst, the SS burst set, or the SS/PBCH block period.

Hereinafter, the reference signal described in the present embodiment includes a downlink reference signal, a synchronization signal, an SS/PBCH block, a downlink DM-RS, a CSI-RS, an uplink reference signal, an SRS, and/or an uplink DM-RS. For example, the downlink reference signal, the synchronization signal, and/or the SS/PBCH block may be referred to as a reference signal. The reference signals used in the downlink include a downlink reference signal, a synchronization signal, an SS/PBCH block, a downlink DM-RS, a CSI-RS, and the like. The reference signals used in the uplink include an uplink reference signal, an SRS and/or an uplink DM-RS, and the like.

The reference signal may also be used for Radio Resource Measurement (RRM). The reference signal may also be used for beam management.

Beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

Note that the procedures described below may be included as a procedure for configuring, setting, or establishing a beam pair link.

Beam selection

Beam refinement

Beam recovery

For example, the beam selection may be a procedure for selecting a beam in communication between the base station apparatus 3 and the terminal apparatus 1. Furthermore, the beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing human being, or the like in communication between the base station apparatus 3 and the terminal apparatus 1.

Beam management may include beam selection and beam refinement. Note that the beam recovery may include the following procedures.

Detection of beam failure

Discovery of a new beam

Transmission of a beam recovery request

Monitoring of a response to the beam recovery request

For example, the Reference Signal Received Power (RSRP) of the SSS included in the CSI-RS or the SS/PBCH block may be used or a CSI may be used in selecting the transmission beam of the base station apparatus 3 at the terminal apparatus 1. Additionally, as a report to the base station apparatus 3, the CSI-RS Resource Index (CRI) may be used, or an index indicated in the PBCHs included in the SS/PBCH block and/or in a sequence of demodulation reference signals (DMRSs) used for demodulation of the PBCHs may be used.

Additionally, the base station apparatus 3 indicates the CRI or the time index of the SS/PBCH in indicating the beam to the terminal apparatus 1, and the terminal apparatus 1 receives the beam, based on the CRI or the time index of the SS/PBCH that is indicated. At this time, the terminal apparatus 1 may configure a spatial filter, based on the CRI or the time index of the SS/PBCH that is indicated, and receive the beam. Additionally, the terminal apparatus 1 may receive the beam by using the assumption of Quasi Co-Location (QCL). One signal (such as an antenna port, a synchronization signal, a reference signal, etc.) being "QCLed" with another signal (such as an antenna port, a synchronization signal, a reference signal, etc.) or "using the assumption of QCL" for these signals can be interpreted as the one signal being associated with the other signal.

In a case that a long term property of a channel on which one symbol in one antenna port is carried may be estimated from a channel on which one symbol in the other antenna port is carried, the two antenna ports are said to be quasi co-located (QCLed). The long term property of the channel includes at least one of a delay spread, a Doppler spread, a Doppler shift, an average gain, or an average delay. For example, in a case that an antenna port 1 and an antenna port 2 are quasi co-located (QCLed) with respect to the average delay, this means that a reception timing for the antenna port 2 may be estimated from a reception timing for the antenna port 1.

The QCL may also be expanded to beam management. For this purpose, spatially expanded QCL may be newly defined. For example, the long term property of a channel in spatial QCL assumption may be an Angle of Arrival (AoA), a Zenith angle of Arrival (ZoA), or the like and/or an angle spread, for example, Angle Spread of Arrival (ASA) or a Zenith angle Spread of Arrival (ZSA), a transmission angle (AoD, ZoD, or the like) or an angle spread of the transmission angle, for example, an Angle Spread of Departure (ASD) or a Zenith angle Spread of Departure (ZSD), or Spatial Correlation, or a reception spatial parameter in a radio link or channel.

For example, in a case that the antenna port 1 and the antenna port 2 may be considered to be QCLed with respect to a reception spatial parameter, this means that a reception beam (reception spatial filter) in which a signal from the antenna port 2 is received may be inferred from a reception beam in which a signal from the antenna port 1 is received.

As QCL types, combinations of long term properties that may be considered to be QCLed may be defined. For example, the following types may be defined.

Type A: Doppler shift, Doppler spread, average delay, delay spread

Type B: Doppler shift, Doppler spread

Type C: Average delay, Doppler shift

Type D: Reception spatial parameter

The above-described QCL types may configure and/or indicate the assumption of QCL of the one or two reference signals and the PDCCH or the PDSCH DMRS in the RRC and/or MAC layer and/or DCI as a Transmission Configuration Indication (TCI). For example, in a case that the index #2 of the SS/PBCH block and the QCL type A+QCL type B are configured and/or indicated as one state of the TCI in a case that the terminal apparatus 1 receives the PDCCH, then at the time of reception of the PDCCH DMRS, the terminal apparatus 1 may receive the PDCCH DMRS and perform synchronization and channel estimation, with the Doppler shift, Doppler spread, average delay, delay spread, and reception spatial parameter in the reception of SS/PBCH block index #2 considered as the long term properties of the channels. At this time, the reference signal (in the example described above, the SS/PBCH block) indicated by the TCI may be referred to as a source reference signal, and the reference signal (in the above-described example, the PDCCH DMRS) affected by the long term property inferred from the long term property of the channel in a case that the source reference signal is received may be referred to as a target reference signal. Additionally, for the TCI, the RRC configures one or multiple TCI states and a combination of the source reference signal and the QCL type for each state, and the TCI may be indicated to the terminal apparatus 1 by using the MAC layer or DCI.

According to this method, operations of the base station apparatus 3 and the terminal apparatus 1 equivalent to beam management may be defined based on the QCL assumption for the spatial domain and radio resources (time and/or frequency) as beam management and beam indication/report.

The subframe will now be described. The subframe in the present embodiment may also be referred to as a resource unit, a radio frame, a time period, or a time interval.

Figure 3:
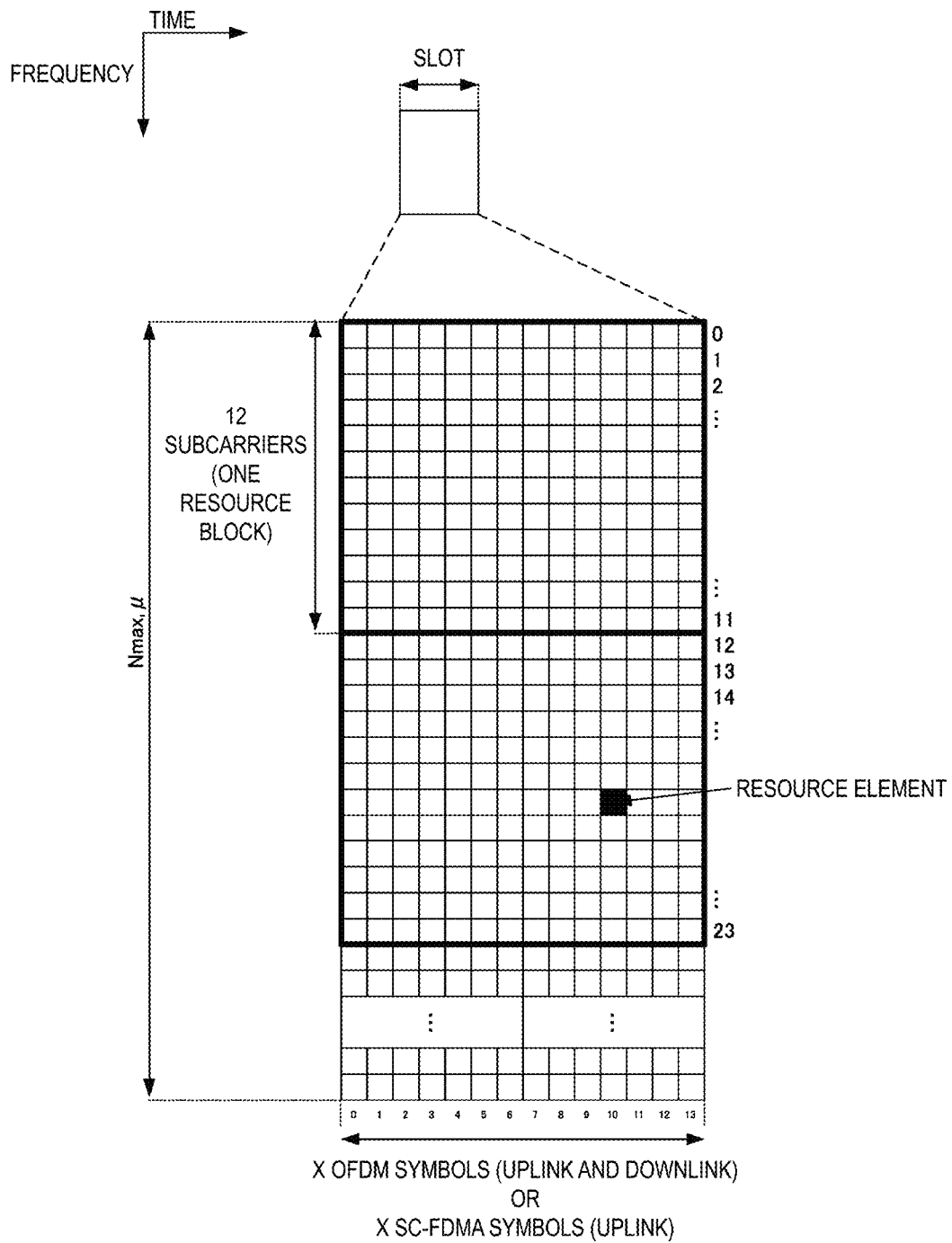
FIG. 3 is a diagram illustrating a schematic configuration of an uplink slot and a downlink slot according to an embodiment of the present invention.

FIG. 3 is a diagram illustrating a general configuration of an uplink and a downlink slots according to a first embodiment of the present invention. Each of the radio frames is 10 ms in length. Additionally, each of the radio frames includes 10 subframes and W slots. In addition, one slot includes X OFDM symbols. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 corresponds to 0.5 ms and X=14 corresponds to 1 ms. In addition, in a case that the subcarrier spacing is 60 kHz, X=7 or X=14, and X=7 and X=14 correspond to 0.125 ms and 0.25 ms, respectively. Additionally, for example, for X=14, W=10 in a case that the subcarrier spacing is 15 kHz, and W=40 in a case that the subcarrier spacing is 60 kHz. FIG. 3 illustrates a case of X=7 as an example. Note that a case of X=14 can be similarly configured by expanding the case of X=7. Furthermore, the uplink slot is defined similarly, and the downlink slot and the uplink slot may be defined separately. Additionally, the bandwidth of the cell of FIG. 3 may also be defined as a part of the band (BandWidth Part (BWP)). In addition, the slot may be referred to as a Transmission Time Interval (TTI). The slot need not be defined as a TTI. The TTI may be a transmission period for transport blocks.

The signal or the physical channel transmitted in each of the slots may be represented by a resource grid. The resource grid is defined by multiple subcarriers and multiple OFDM symbols for each numerology (subcarrier spacing and cyclic prefix length) and for each carrier. The number of subcarriers constituting one slot depends on each of the downlink and uplink bandwidths of a cell. Each element in the resource grid is referred to as a resource element. The resource element may be identified by using a subcarrier number and an OFDM symbol number.

The resource grid is used to represent mapping of a certain physical downlink channel (such as the PDSCH) or a certain physical uplink channel (such as the PUSCH) to resource elements. For example, for a subcarrier spacing of 15 kHz, in a case that the number X of OFDM symbols included in a subframe is 14 and NCPs are used, one physical resource block is defined by 14 continuous OFDM symbols in the time domain and by 12*Nmax continuous subcarriers in the frequency domain. Nmax is the maximum number of resource blocks determined by a subcarrier spacing configuration $\mu$ described below. In other words, the resource grid includes (14*12*Nmax, $\mu$) resource elements. Extended CPs (ECPs) are supported only at a subcarrier spacing of 60 kHz, and thus one physical resource block is defined by 12 (the number of OFDM symbols included in one slot)*4 (the number of slots included in one subframe) in the time domain=48 continuous OFDM symbols, 12*Nmax, $\mu$ continuous subcarriers in the frequency domain, for example. In other words, the resource grid includes (48*12*Nmax, $\mu$) resource elements.

As resource blocks, a reference resource block, a common resource block, a physical resource block, and a virtual resource block are defined. One resource block is defined as 12 subcarriers that are continuous in the frequency domain. Reference resource blocks are common to all subcarriers, and for example, resource blocks may be configured at a subcarrier spacing of 15 kHz and may be numbered in ascending order. Subcarrier index 0 at reference resource block index 0 may be referred to as reference point A (point A) (which may simply be referred to as a "reference point"). The common resource blocks are resource blocks numbered in ascending order from 0 at each subcarrier spacing configuration $\mu$ starting at the reference point A. The resource grid described above is defined by the common resource blocks. The physical resource blocks are resource blocks numbered in ascending order from 0 included in a bandwidth part (BWP) described below, and the physical resource blocks are resource blocks numbered in ascending order from 0 included in the bandwidth part (BWP). A certain physical uplink channel is first mapped to a virtual resource block. Thereafter, the virtual resource block is mapped to a physical resource block. Hereinafter, the resource block may be a virtual resource block, a physical resource block, a common resource block, or a reference resource block.

Now, the subcarrier spacing configuration $\mu$ will be described. As described above, one or multiple OFDM numerologies are supported in NR. In a certain BWP, the subcarrier spacing configuration $\mu$ ($\mu$=0, 1, . . . 5) and the cyclic prefix length are given for a downlink BWP by the higher layer and for an uplink BWP by the higher layer. In this regard, given $\mu$, a subcarrier spacing $\Delta f$ is given by $\Delta f = 2^{\mu} * 15$ (kHz).

At the subcarrier spacing configuration $\mu$, the slots are counted in ascending order from 0 to $N^{\{subframe, \mu\}}\_\{slot\}-1$ within the subframe, and counted in ascending order from 0 to $N^{\{frame, \mu\}}\_\{slot\}-1$ within the frame. $N^{\{slot\}}\_\{symb\}$ continuous OFDM symbols are in the slot, based on the slot configuration and the cyclic prefix. $N^{\{slot\}}\_\{symb\}$ is 14. The start of the slot $n^{\{\mu\}}\_\{s\}$ within the subframe is temporally aligned with the start of the $n^{\{\mu\}}\_\{s\}N^{\{slot\}}\_\{symb\}$th OFDM symbol within the same subframe.

Figure 4:
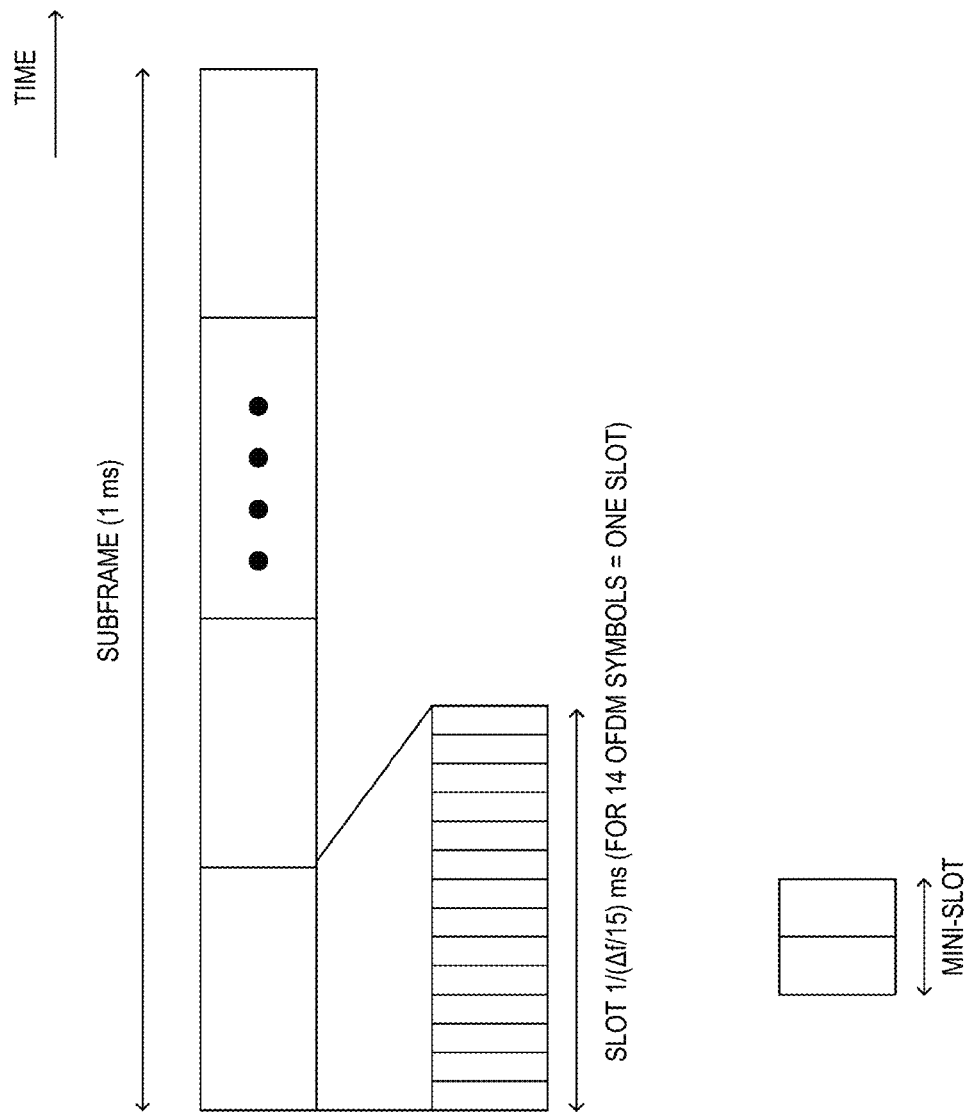
FIG. 4 is a diagram illustrating a relationship of a subframe, a slot, and a mini-slot in a time domain according to an embodiment of the present invention.

The subframe, the slot, and a mini-slot will now be described. FIG. 4 is a diagram illustrating the relationship of a subframe, slots, and mini-slots in the time domain. As illustrated in FIG. 4, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. The downlink slot may be referred to as PDSCH mapping type A. The uplink slot may be referred to as PUSCH mapping type A.

The mini-slot (which may be referred to as a subslot) is a time unit including OFDM symbols that are less in number than the OFDM symbols included in the slot. FIG. 4 illustrates, by way of example, a case in which the mini-slot includes 2 OFDM symbols. The OFDM symbols in the mini-slot may match the timing for the OFDM symbols constituting the slot. Note that the smallest unit of scheduling may be a slot or a mini-slot. Additionally, allocation of mini-slots may be referred to as non-slot based scheduling. Mini-slots being scheduled may also be expressed as resources being scheduled for which the relative time positions of the start positions of the reference signal and the data are fixed. The downlink mini-slot may be referred to as PDSCH mapping type B. The uplink mini-slot may be referred to as PUSCH mapping type B.

Figure 5:
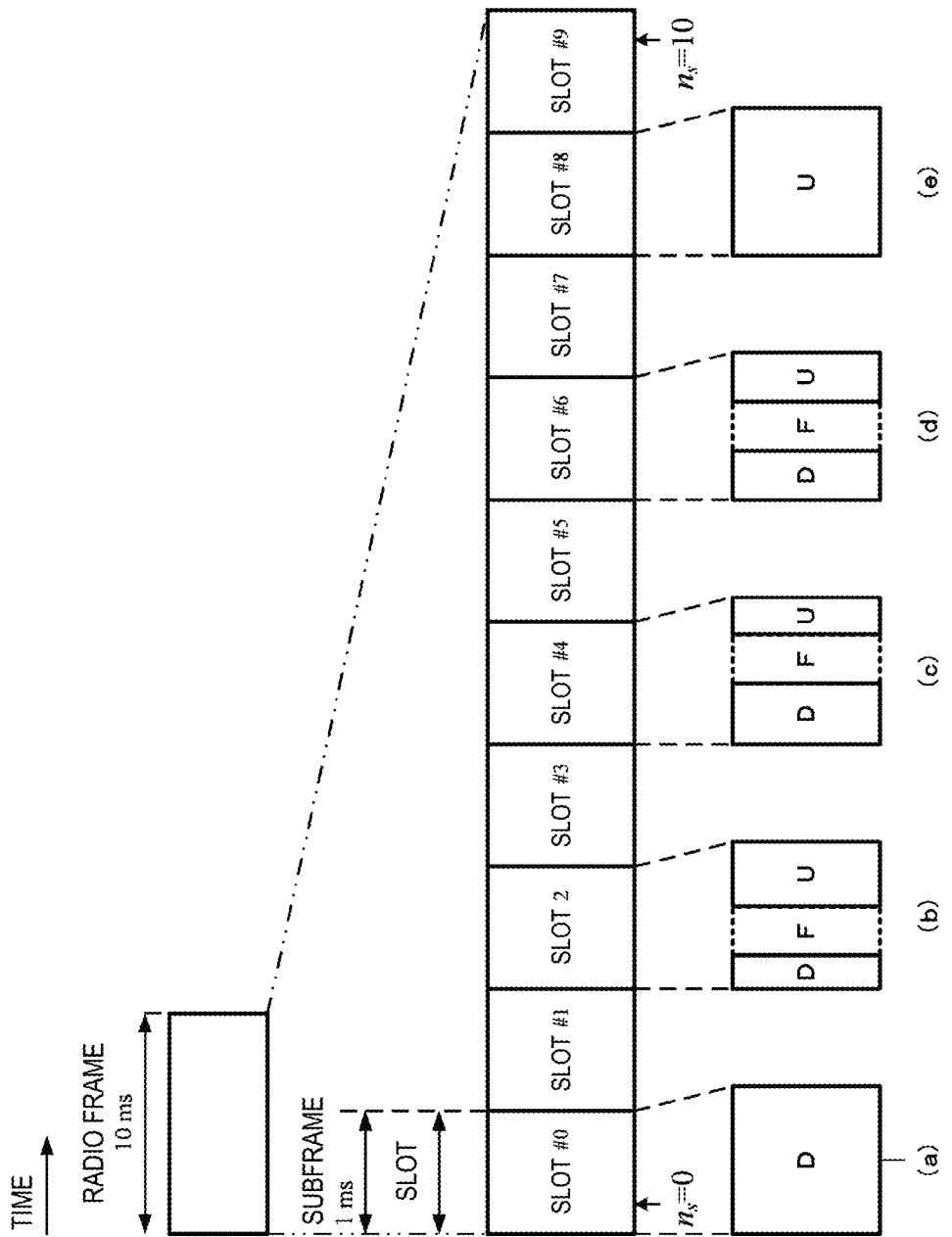
FIG. 5 is a diagram illustrating an example of a slot or a subframe according to an embodiment of the present invention.

FIG. 5 is a diagram illustrating an example of a slot format. In this regard, a case in which the slot length is 1 ms at a subcarrier spacing of 15 kHz is illustrated as an example. In FIG. 5, D represents the downlink, and U represents the uplink. As illustrated in FIG. 5, during a certain time period (for example, the minimum time period to be allocated to one UE in the system), at least one or multiple of the following types of symbols may be included:

downlink symbols, flexible symbols, and uplink symbols. Note that the ratio of these symbols may be preset as a slot format. Additionally, the definition may be made based on the number of downlink OFDM symbols included in the slot, and the start position and end position of the symbols within the slot. Additionally, the number of uplink OFDM symbols or DFT-S-OFDM symbols included in the slot or the start position and end position of the symbols within the slot may be defined. Note that the slot being scheduled may be expressed as resources being scheduled for which the relative time positions of the reference signal and the slot boundary are fixed.

The terminal apparatus 1 may receive a downlink signal or a downlink channel in the downlink symbols or the flexible symbols. The terminal apparatus 1 may transmit an uplink signal or a downlink channel in the uplink symbols or the flexible symbols.

FIG. 5(a) illustrates an example of a certain time period (which may be referred to as, for example, a minimum unit of time resource that can be allocated to one UE, a time unit, or the like, additionally, a set of multiple minimum units of time resources may be referred to as a time unit) in which all of the slot is used for downlink transmission, and in FIG. 5(b), the slot is used such that in the first time resource, for example, the uplink is scheduled via the PDCCH and that after a flexible symbol including a processing delay of the PDCCH, a time for switching from downlink to uplink, and generation of a transmit signal, an uplink signal is transmitted. In FIG. 5(c), the slot is used such that in the first time resource, the PDCCH and/or the downlink PDSCH is transmitted and that after a gap for a processing delay, a time for switching from downlink to uplink, and generation of a transmit signal, the PUSCH or PUCCH is transmitted. Here, for example, the uplink signal may be used to transmit the HARQ-ACK and/or CSI, namely, the UCI. In FIG. 5(d), the slot is used such that in the first time resource, the PDCCH and/or the PDSCH is transmitted and that after a gap for a processing delay, a time for switching from downlink to uplink, and generation of a transmit signal, the uplink PUSCH and/or PUCCH is transmitted. Here, for example, the uplink signal may be used to transmit the uplink data, namely, the UL-SCH. In FIG. 5(e), the entire slot is used for uplink transmission (PUSCH or PUCCH).

The above-described downlink part and uplink part may include multiple OFDM symbols as is the case with LTE.

Figure 6:
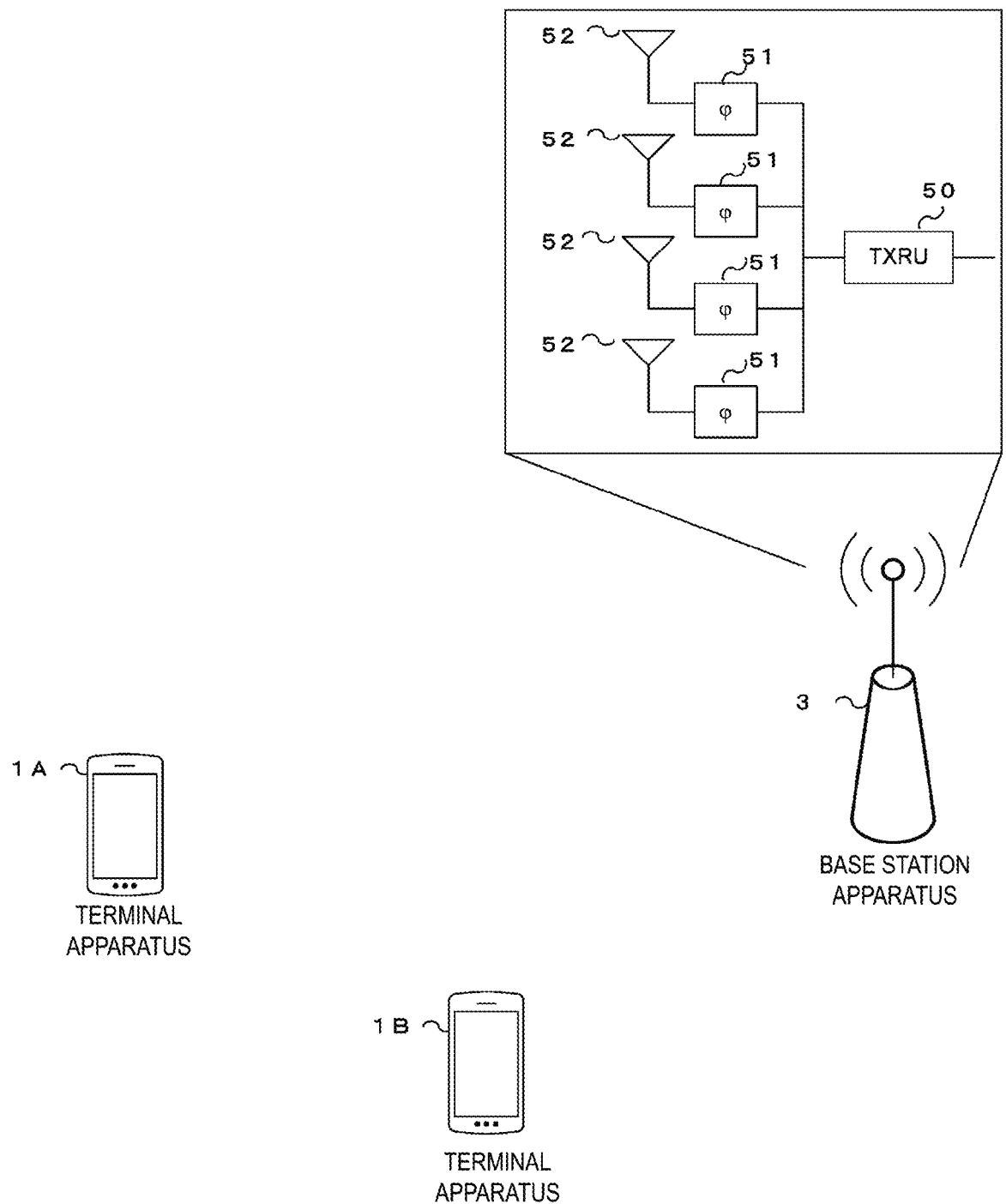
FIG. 6 is a diagram illustrating an example of beamforming according to an embodiment of the present invention.

FIG. 6 is a diagram illustrating an example of beamforming. Multiple antenna elements are connected to one Transceiver unit (TXRU) 50. The phase is controlled by using a phase shifter 51 for each antenna element and a transmission is performed from an antenna element 52, thus allowing a beam for a transmit signal to be directed in any direction. Typically, the TXRU may be defined as an antenna port, and only the antenna port may be defined for the terminal apparatus 1. Controlling the phase shifter 51 allows setting of directivity in any direction. Thus, the base station apparatus 3 can communicate with the terminal apparatus 1 by using a high gain beam.

Hereinafter, the bandwidth part (BWP) will be described. The BWP is also referred to as a carrier BWP. The BWP may be configured for each of the downlink and the uplink. The BWP is defined as a set of continuous physical resources selected from continuous subsets of common resource blocks. The terminal apparatus 1 can be configured with up to four BWPs such that one downlink carrier BWP (DL BWP) is activated at a certain time. The terminal apparatus 1 can be configured with up to four BWPs such that one uplink carrier BWP (UL BWP) is activated at a certain time. In a case of carrier aggregation, the BWP may be configured in each serving cell. At this time, one BWP being configured in a certain serving cell may be expressed as no BWP being configured. Two or more BWPs being configured may also be expressed as the BWP being configured.

MAC entity Operation

An activated serving cell always includes one active (activated) BWP. BWP switching for a certain serving cell is used to activate an inactive (deactivated) BWP and to deactivate an active (activated) BWP. BWP switching for a certain serving cell is controlled by the PDCCH indicating downlink allocation or uplink grant. BWP switching for a certain serving cell may be further controlled by a BWP inactivity timer or RRC signaling, or by the MAC entity itself at the initiation of a random access procedure. In the addition of the SpCell (PCell or PSCell) or the activation of the SCell, one of the BWPs is a first active BWP without reception of the PDCCH indicating downlink allocation or uplink grant. A first active DL BWP and a first active UL BWP may be designated in an RRC message sent from the base station apparatus 3 to the terminal apparatus 1. The active BWP for a certain serving cell is designated in the RRC or PDCCH sent from the base station apparatus 3 to the terminal apparatus 1. Additionally, the first active DL BWP and the first active UL BWP may be included in the message 4. In an unpaired spectrum (TDD bands or the like), the DL BWP and the UL BWP are paired, and the BWP switching is common to the UL and DL. In the active BWP for each of the activated serving cells for which the BWP is configured, the MAC entity of the terminal apparatus 1 applies normal processing. The normal processing includes transmitting a UL-SCH, transmitting an RACH, monitoring the PDCCH, transmitting the PUCCH, transmitting the SRS, and receiving the DL-SCH. In the inactive BWP for each of the activated serving cells for which the BWP is configured, the MAC entity of the terminal apparatus 1 does not transmit the UL-SCH, does not transmit the RACH, does not monitor the PDCCH, does not transmit the PUCCH, does not transmit the SRS, and does not receive the DL-SCH. In a case that a certain serving cell is deactivated, the active BWP may be configured to be absent (e.g., the active BWP is deactivated).

RRC Operation

BWP information elements (IEs) included in the RRC message (broadcast system information or information sent in a dedicated RRC message) is used to configure the BWP. The RRC message transmitted from the base station apparatus 3 is received by the terminal apparatus 1. For each serving cell, a network (such as the base station apparatus 3) configures, for the terminal apparatus 1, at least an initial BWP including at least a downlink BWP and one uplink BWP (such as a case that the serving cell is configured with the uplink) or two uplink BWPs (such as a case that a supplementary uplink is used). Furthermore, the network may configure an additional uplink BWP or downlink BWP for a certain serving cell. The BWP configuration is divided into uplink parameters and downlink parameters. Additionally, the BWP configuration is also divided into common parameters and dedicated parameters. The common parameters (such as a BWP uplink common IE and a BWP downlink common IE) are cell specific. The common parameters for the initial BWP of the primary cell are also provided by using system information. For all the other serving cells, the network provides the common parameters through dedicated signals. The BWP is identified by a BWP ID. For the initial BWP, the BWP ID is 0. For each of the other BWPs, the BWP ID takes a value ranging from 1 to 4.

In a case that the higher layer parameter initialDownlinkBWP is not configured (provided) for the terminal apparatus 1, an initial DL BWP (initial active DL BWP) may be defined by the position and number of continuous PRBs, the subcarrier spacing, and the cyclic prefix for PDCCH reception in a control resource set (CORESET) for a Type0-PDCCH common search space. The position of each of the continuous PRBs corresponds to the PRBs in the control resource set for the Type0-PDCCH common search space, and starts with the PRB with the smallest index and ends with the PRB with the largest index. In a case that the higher layer parameter initialDownlinkBWP is configured (provided) for the terminal apparatus 1, the initial DL BWP may be indicated by the higher layer parameter initialDownlinkBWP. The higher layer parameter initialDownlinkBWP may be included in the SIB 1 (systemInformationBlockType1, ServingCellConfigCommonSIB) or ServingCellConfigCommon. The information element ServingCellConfigCommonSIB is used to configure a cell-specific parameter for the serving cell for the terminal apparatus 1 in SIB1.

In other words, in a case that the higher layer parameter initialDownlinkBWP is not configured (provided) for the terminal apparatus 1, the size of the initial DL BWP may correspond to the number of resource blocks in the control resource set (CORESET #0) for the Type0-PDCCH common search space. In a case that the higher layer parameter initialDownlinkBWP is configured (provided) for the terminal apparatus 1, the size of the initial DL BWP may be given by locationAndBandwidth included in the higher layer parameter initialDownlinkBWP. The higher layer parameter locationAndBandwidth may indicate the location and bandwidth of the frequency domain of the initial DL BWP.

As described above, multiple DL BWPs may be configured for the terminal apparatus 1. In the DL BWPs configured for the terminal apparatus 1, a default DL BWP can be configured by a higher layer parameter defaultDownlinkBWP-Id. In a case that the higher layer parameter defaultDownlinkBWP-Id is not provided for the terminal apparatus 1, the default DL BWP is the initial DL BWP.

The terminal apparatus 1 may be provided with an initial UL BWP by SIB1 (systemInformationBlockType1) or initialUplinkBWP. The information element initialUplinkBWP is used to configure the initial UL BWP. For an operation on the SpCell or the secondary cell, the initial UL BWP (initial active UL BWP) may be configured (provided) for the terminal apparatus 1 by the higher layer parameter initialUplinkBWP. In a case that a supplementary uplink carrier (supplementary UL carrier) is configured for the terminal apparatus 1, the initial UL BWP in the supplementary uplink carrier may be configured for the terminal apparatus 1 by initialUplinkBWP included in the higher layer parameter supplementaryUplink.

The control resource set (CORESET) in the present embodiment will be described below.

The control resource set (CORESET) includes time and frequency resources for a search for downlink control information. The configuration information of the CORESET includes the identifier of the CORESET (ControlResourceSetId, CORESET-ID) and information identifying the frequency resource for the CORESET. The information element ControlResourceSetId (the identifier of the CORESET) is used to identify the control resource set in a certain serving cell. The identifier of the CORESET is used among the BWPs in a certain serving cell. The identifier of CORESET is unique among the BWPs in the serving cell. The number of CORESETs in each BWP is limited to three, including the initial CORESET. In a certain serving cell, the value of the identifier of each CORESET takes a value ranging from 0 to 11.

The control resource set identified by the identifier 0 (ControlResourceSetId 0) of the CORESET is referred to as CORESET #0. CORESET #0 may be configured by pdcch-ConfigSIB1 included in the MIB or PDCCH-ConfigCommon included in ServingCellConfigCommon. In other words, the configuration information of CORESET #0 may be pdcch-ConfigSIB1 included in the MIB or PDCCH-ConfigCommon included in ServingCellConfigCommon. The configuration information of CORESET #0 may be configured by controlResourceSetZero included in the PDCCH-ConfigSIB1 or PDCCH-ConfigCommon. In other words, the information element controlResourceSetZero is used to indicate CORESET #0 (common CORESET) of the initial DL BWP. The CORESET denoted by pdcch-ConfigSIB1 is CORESET #0. The information element pdcch-ConfigSIB1 in the MIB or the dedicated configuration is used to configure the initial DL BWP. CORESET configuration information pdcch-ConfigSIB1 for CORESET #0 does not include information explicitly identifying the identifier of the CORESET and the frequency resource (e.g., the number of continuous resource blocks) and the time resource (the number of consecutive symbols) for the CORESET, but the frequency resource (e.g., the number of continuous resource blocks) and time resource (the number of consecutive symbols) for the CORESET for CORESET #0 can be implicitly identified by information included in pdcch-ConfigSIB1. The information element PDCCH-ConfigCommon is used to configure a cell-specific PDCCH parameter provided by using the SIB. Additionally, PDCCH-ConfigCommon may also be provided in a case that handover and the PSCell and/or the SCell are added. The configuration information of CORESET #0 is included in the configuration of the initial BWP. That is, the configuration information of CORESET #0 need not be included in the configuration of the BWP other than the initial BWP. controlResourceSetZero corresponds to four bits in pdcch-ConfigSIB1 (e.g., four MSB bits, four most significant bits). CORESET #0 is a control resource set for Type0-PDCCH common search space.

The configuration information of the additional common control resource (additional common CORESET) set may be configured by commonControlResourceSet included in PDCCH-ConfigCommon. Additionally, the configuration information of the additional common CORESET may also be used to specify additional common CORESET for system information and/or a paging procedure. The configuration information of the additional common CORESET may be used to specify an additional common CORESET used in a random access procedure. The configuration information of the additional common CORESET may be included in the configuration of each BWP. The identifier of the CORESET indicated in commonControlResourceSet takes a value other than 0.

The common CORESET may be a CORESET used in the random access procedure (e.g., an additional common CORESET). Additionally, in the present embodiment, the common CORESET may include CORESET #0 and/or the CORESET configured by the configuration information of the additional common CORESET. In other words, the common CORESET may include CORESET #0 and/or the additional common CORESET. CORESET #0 may be referred to as common CORESET #0. Also in the BWP other than the BWP for which the common CORESET is configured, the terminal apparatus 1 may reference (acquire) the configuration information of the common CORESET.

The configuration information of the one or multiple CORESETs may be configured by PDCCH-Config. The information element PDCCH-Config is used to configure UE-specific PDCCH parameters (e.g., CORSET, a search space, etc.) for a certain BWP. PDCCH-Config may be included in the configuration of each BWP.

In other words, in the present embodiment, the configuration information of the common CORESET indicated by the MIB is pdcch-ConfigSIB1, and the configuration information of the common CORESET indicated by PDCCH-ConfigCommon is controlResourceSetZero, and the configuration information of the common CORESET (additional common CORESET) indicated by PDCCH-ConfigCommon is commonControlResourceSet. Additionally, the configuration information of one or multiple CORESETs (UE specifically configured Control Resource Sets, UE-specific CORESETs) indicated by PDCCH-Config is controlResourceSetToAddModList.

The search space is defined to search for PDCCH candidates. searchSpaceType included in the search space configuration information indicates whether the search space is a Common Search Space (CSS) or a UE-specific Search Space (USS). The UE-specific search space is derived at least from the value of the C-RNTI set by the terminal apparatus 1. In other words, the UE-specific search space is derived separately for each terminal apparatus 1. The common search space is a search space common to the multiple terminal apparatuses 1, and includes a Control Channel Element (CCE) with a prescribed index. The CCE includes multiple resource elements. The configuration information of the search space includes information regarding a DCI format monitored in the search space.

The configuration information of the search space includes the identifier of the CORESET identified by the configuration information of the CORESET. The CORESET identified by the identifier of the CORESET included in the configuration information of the search space is associated with the search space. In other words, the CORESET associated with the search space is the CORESET identified by the identifier of the CORESET included in the search space. The DCI format indicated by the configuration information of the search space is monitored by the associated CORESET. Each search space is associated with a single CORESET. For example, the configuration information of the search space for the random access procedure may be configured by ra-SearchSpace. In other words, the CORESET associated with ra-SearchSpace is used to monitor the DCI format provided with a CRC scrambled with the RA-RNTI or TC-RNTI is added.

The terminal apparatus 1 monitors the set of candidates for the PDCCH in one or multiple CORESETs allocated in each active serving cell configured to monitor the PDCCH. The set of candidates for the PDCCH corresponds to one or multiple search space sets. Monitoring means decoding of candidates for each PDCCH in accordance with one or multiple DCI formats to be monitored. The set of candidates for the PDCCH monitored by the terminal apparatus 1 is defined by the PDCCH search space sets. One search space set is a common search space set or a UE-specific search space set. In the above, the search space set is referred to as a search space, the common search space set is referred to as a common search space, and the UE-specific search space set is referred to as a UE-specific search space. The terminal apparatus 1 monitors the PDCCH candidates by using one or multiple search space sets described below.

Type0-PDCCH common search space set (Type0 common search space): the search space set is configured by a search space SIB1 (searchSpaceSIB1) indicated by pdcch-ConfigSIB1 or PDCCH-ConfigCommon indicated by the MIB, or searchSpaceZero included in PDCCH-ConfigCommon, searchSpaceSIB1 and searchSpaceZero corresponding to higher layer parameters. The search space is for monitoring of the DCI format with the CRC scrambled with SI-RNRI in the primary cell.

Type0A-PDCCH common search space set (Type0A common search space): the search space set is configured by a search space (searchSpaceOtherSystemInformation) corresponding to a higher layer parameter and indicated by PDCCH-ConfigCommon. The search space is for monitoring of the DCI format with the CRC scrambled with SI-RNRI in the primary cell.

Type1-PDCCH common search space set (Type1 common search space): the search space set is configured by a search space for a random access procedure (ra-SearchSpace) corresponding to a higher layer parameter and indicated by PDCCH-ConfigCommon. The search space is for monitoring of the DCI format with the CRC scrambled with RA-RNRI or TC-RNTI in the primary cell. Type1-PDCCH common search space set is a search space set for the random access procedure.

Type2-PDCCH common search space set (Type2 common search space): the search space set is configured by a search space for the paging procedure (paging-SearchSpace) corresponding to a higher layer parameter and indicated by PDCCH-ConfigCommon. The search space is for monitoring of the DCI format with the CRC scrambled with P-RNTI in the primary cell.

Type3-PDCCH common search space set (Type3 common search space): the search space set is configured by a search space of a common search space type (SearchSpace) corresponding to a higher layer parameter and indicated by PDCCH-Config. The search space is for monitoring of the DCI format with the CRC scrambled with INT-RNTI, SFI-RNTI, TPC-PUSCH-RNTI, TPC-PUCCH-RNTI, or TPC-SRS-RNTI. For the primary cell, the search space is for monitoring of the DCI format with the CRC scrambled with C-RNTI, CS-RNTI(s), or MSC-C-RNTI.

UE-specific search space set: the search space set is configured by a search space of a UE-specific search space type (SearchSpace) corresponding to a higher layer parameter and indicated by PDCCH-Config. The search space is for monitoring of the DCI format with the CRC scrambled with C-RNTI, CS-RNTI(s), or MSC-C-RNTI.

In a case that the terminal apparatus 1 is provided with one or multiple search space sets by the corresponding higher layer parameter (searchSpaceZero, searchSpaceSIB1, searchSpaceOtherSystemInformation, paging-SearchSpace, ra-SearchSpace, etc.) and provided with C-RNTI or CS-RNTI, the terminal apparatus 1 may use the one or multiple search space sets to monitor PDCCH candidates for DCI format 0_0 and DCI format 1_0 with the C-RNTI or CS-RNTI.

The configuration information of the BWP is divided into the configuration information of the DL BWP and the configuration information of the UL BWP. The configuration information of the BWP includes an information element bwp-Id (identifier of the BWP). The identifier of the BWP included in the configuration information of the DL BWP is used to identify (reference) the DL BWP in a certain serving cell. The identifier of the BWP included in the configuration information of the UL BWP is used to identify (reference) the UL BWP in a certain serving cell. The identifier of the BWP is assigned to each of the DL BWP and UL BWP. For example, the identifier of the BWP corresponding to the DL BWP may be referred to as a DL BWP index. The identifier of the BWP corresponding to the UL BWP may be referred to as a UL BWP index. The initial DL BWP is referenced by identifier 0 of the DL BWP. The initial UL BWP is referenced by identifier 0 of the UL BWP. Each of the other DL BWPs or the other UL BWPs may be referenced by any of the identifiers of the BWPs ranging from 1 to maxNrofBWPs. In other words, the identifier of the BWP set to 0 (bwp-Id=0) is associated with the initial BWP and prevented from being used for the other BWPs. maxNrofBWPs is the maximum number of BWPs per serving cell and is 4. In other words, each of the identifiers of the other BWPs takes a value ranging from 1 to 4. Other higher layer configuration information is associated with a particular BWP by utilizing the identifier of the BWP. The DL BWP and UL BWP having the same BWP identifier may mean that the DL BWP and UL BWP are paired.

For the terminal apparatus 1, one primary cell and up to 15 secondary cells may be configured.

A procedure for receiving the PDSCH will be described below.

By detecting a PDCCH including DCI format 1_0 or DCI format 1_1, the terminal apparatus 1 may decode (receive) the corresponding PDSCH. The corresponding PDSCH is scheduled (indicated) by the DCI format (DCI). The start position (start symbol) of the scheduled PDSCH is referred to as S. The start symbol S of the PDSCH may be the first symbol in which the PDSCH is transmitted (mapped) within a certain slot. The start symbol S corresponds to the beginning of the slot. For example, in a case that S has a value of 0, the terminal apparatus 1 may receive the PDSCH from the first symbol in the certain slot. Additionally, for example, in a case that S has a value of 2, the terminal apparatus 1 may receive the PDSCH from the third symbol of the certain slot. The number of consecutive symbols of the scheduled PDSCH is referred to as L. The number of consecutive symbols L is counted from the start symbol S. The determination of S and L allocated to the PDSCH will be described later.

The type of PDSCH mapping includes PDSCH mapping type A and PDSCH mapping type B. For the PDSCH mapping type A, S takes a value ranging from 0 to 3. L takes a value ranging from 3 to 14. However, the sum of S and L takes a value ranging from 3 to 14. For the PDSCH mapping type B, S takes a value ranging from 0 to 12. L takes one of the values {2, 4, and 7}. However, the sum of S and L takes a value ranging from 2 to 14.

The position of a DMRS symbol for the PDSCH depends on the type of the PDSCH mapping. The position of the first DMRS symbol (first DM-RS symbol) for the PDSCH depends on the type of the PDSCH mapping. For the PDSCH mapping type A, the position of the first DMRS symbol may be indicated in a higher layer parameter dmrs-TypeA-Position. In other words, the higher layer parameter dmrs-TypeA-Position is used to indicate the position of the first DMRS for the PDSCH or PUSCH. dmrs-TypeA-Position may be set to either 'pos2' or 'pos3'. For example, in a case that dmrs-TypeA-Position is set to 'pos2', the position of the first DMRS symbol for the PDSCH may correspond to the third symbol in the slot. For example, in a case that dmrs-TypeA-Position is set to 'pos3', the position of the first DMRS symbol for the PDSCH may correspond to the fourth symbol in the slot. In this regard, S can take a value of 3 only in a case that dmrs-TypeA-Position is set to 'pos3'. In other words, in a case that dmrs-TypeA-Position is set to 'pos2', then S takes a value ranging from 0 to 2. For the PDSCH mapping type B, the position of the first DMRS symbol corresponds to the first symbol of the allocated PDSCH.

FIG. 7 is a diagram illustrating an example of the PDSCH mapping type according to the present embodiment. FIG. 7(A) is a diagram illustrating an example of PDSCH mapping type A. In FIG. 7(A), S of the allocated PDSCH is 3. L of the allocated PDSCH is 7. In FIG. 7(A), the position of the first DMRS symbol for the PDSCH corresponds to the fourth symbol in the slot. In other words, dmrs-TypeA-Position is set to 'pos3'. FIG. 7(B) is a diagram illustrating an example of PDSCH mapping type A. In FIG. 7(B), S of the allocated PDSCH is 4. L of the allocated PDSCH is 4. In FIG. 7(B), the position of the first DMRS symbol for the PDSCH corresponds to the first symbol to which the PDSCH is allocated.

A method for identifying PDSCH time domain resource allocation will be described below.

The base station apparatus 3 may use the DCI to perform scheduling such that the terminal apparatus 1 receives the PDSCH. The terminal apparatus 1 may receive the PDSCH by detecting the DCI addressed to the terminal apparatus 1. In identifying PDSCH time domain resource allocation, the terminal apparatus 1 first determines a resource allocation table to be applied to the corresponding PDSCH. The resource allocation table includes one or multiple PDSCH time domain resource allocation configurations. Next, the terminal apparatus 1 may select one PDSCH time domain resource allocation configuration in the determined resource allocation table, based on a value indicated in a 'Time domain resource assignment' field included in the DCI scheduling the corresponding PDSCH. In other words, the base station apparatus 3 determines the PDSCH resource allocation for the terminal apparatus 1, generates a value for the 'Time domain resource assignment' field, and transmits, to the terminal apparatus 1, the DCI including the 'Time domain resource assignment' field. The terminal apparatus 1 identifies the resource allocation in the time direction for the PDSCH, based on the value set in the 'Time domain resource assignment' field.

FIG. 10 is a diagram defining which resource allocation table is applied to the PDSCH time domain resource allocation. With reference to FIG. 10, the terminal apparatus 1 may determine a resource allocation table to be applied to the PDSCH time domain resource allocation. The resource allocation table includes one or multiple PDSCH time domain resource allocation configurations. In the present embodiment, each resource allocation table is classified as one of (I) a predefined resource allocation table and (II) a resource allocation table configured from a higher layer RRC signal. The predefined resource allocation table is defined as a default PDSCH time domain resource allocation A, a default PDSCH time domain resource allocation B, and a default PDSCH time domain resource allocation C. Hereinafter, the default PDSCH time domain resource allocation A is referred to as a default table A. The default PDSCH time domain resource allocation B is referred to as a default table B. The default PDSCH time domain resource allocation C is referred to as a default table C.

FIG. 11 is a diagram illustrating an example of the default table A according to the present embodiment. FIG. 12 is a diagram illustrating an example of the default table B according to the present embodiment. FIG. 13 is a diagram illustrating an example of the default table C according to the present embodiment. With reference to FIG. 11, the default table A includes 16 rows. Each row in the default table A indicates a PDSCH time domain resource allocation configuration. Specifically, in FIG. 11, indexed rows each define the PDSCH mapping type, a slot offset $K_0$ between the PDCCH including the DCI and the corresponding PDSCH, the start symbol S for the PDSCH in the slot, and the number L of continuous allocated symbols. The resource allocation table configured from the higher layer RRC signal is given by a higher layer signal pdsch-TimeDomainAllocationList. An information element PDSCH-TimeDomainResourceAllocation indicates a PDSCH time domain resource allocation configuration. PDSCH-TimeDomainResourceAllocation may also be used to configure a time domain relationship between the PDCCH including the DCI and the PDSCH. pdsch-TimeDomainAllocationList includes one or multiple information elements PDSCH-TimeDomainResourceAllocation. In other words, pdsch-TimeDomainAllocationList is a list including one or multiple elements (information elements). One information element PDSCH-TimeDomainResourceAllocation may also be referred to as one entry (or one row). pdsch-TimeDomainAllocationList may include up to 16 entries. Each entry may be defined by $K_0$, mappingType, and startSymbolAndLength. $K_0$ indicates the slot offset between the PDCCH including the DCI and the corresponding PDSCH. In a case that the PDSCH-TimeDomainResourceAllocation does not indicate $K_0$, the terminal apparatus 1 may assume that the value of $K_0$ is 0. mappingType indicates either PDSCH mapping type A or PDSCH mapping type A. startSymbolAndLength is an index providing an effective combination of the start symbol S of the PDSCH and the number L of continuous allocated symbols. startSymbolAndLength may be referred to as a start and length indicator SLIV. In other words, unlike in the default table directly defining the start symbol S and the consecutive symbols L, the start symbol S and the consecutive symbols L are given based on the SLIV. The base station apparatus 3 can set the SLIV value such that the PDSCH time domain resource allocation does not exceed the slot boundary. The slot offset $K_0$ and the SLIV will be described below.

The higher layer signal pdsch-TimeDomainAllocationList may be included in pdsch-ConfigCommon and/or pdsch-Config. The information element pdsch-ConfigCommon is used to configure a cell-specific parameter for the PDSCH for a certain BWP. The information element pdsch-Config is used to configure a UE-specific parameter for the PDSCH for a certain BWP.

FIG. 14 is a diagram illustrating an example of calculating the SLIV.

In FIG. 14, 14 is the number of symbols included in the slot. FIG. 14 illustrates an example of calculating the SLIV for a Normal Cyclic Prefix (NCP). The value of the SLIV is calculated based on the number of symbols included in the slot, the start symbol S, and the number L of consecutive symbols. Here, the value of L is equal to or greater than 1 and does not exceed (14-S). In a case of an ECP, in a case that the SLIV is calculated, 6 and 12 are used instead of 7 and 14 in FIG. 14.

The slot offset $K_0$ will be described below.

As described above, at the subcarrier spacing configuration $\mu$, the slots are counted in ascending order from 0 to $N^{\{subframe, \mu\}}\_\{slot\}-1$ within the subframe, and counted in ascending order from 0 to $N^{\{frame, \mu\}}\_\{slot\}-1$ within the frame. $K_0$ is the number of slots based on the subcarrier spacing of the PDSCH. $K_0$ may take a value ranging from 0 to 32. In a certain subframe or frame, the number of the slots is counted in ascending order from 0. Slot number n with a subcarrier spacing configuration of 15 kHz corresponds to slot numbers 2n and 2n+1 with a subcarrier spacing configuration of 30 kHz.

The terminal apparatus 1 detects DCI scheduling the PDSCH. The slot assigned to the PDSCH is given by (Expression 1) Floor($n*2\mu^{PDSCH}/2\mu^{PDCCH}$)+$K_0$. The function Floor(A) outputs a maximum integer that does not exceed A. n is a slot in which a PDCCH that schedules the PDSCH is detected. $\mu_{PDSCH}$ is a subcarrier spacing configuration for the PDSCH. $\mu_{PDCCH}$ is a subcarrier spacing configuration for the PDCCH.

With reference to FIG. 10, the terminal apparatus 1 may determine which resource allocation table is to be applied to the PDSCH time domain resource allocation. In other words, the terminal apparatus 1 may determine the resource allocation table to be applied to the PDSCH scheduled by the DCI, at least based on some or all of the following elements (A) to (F).

Element A: the type of the RNTI that scrambles the CRC to be added to the DCI
    Element B: the type of the search space in which the DCI is detected
    Element C: whether the CORESET associated with the search space is CORESET #0
    Element D: whether pdsch-ConfigCommon includes pdsch-TimeDomainAllocationList
    Element E: whether pdsch-Config includes pdsch-TimeDomainAllocationList
    Element F: SS/PBCH and CORESET multiplexing pattern For the element A, the type of the RNTI that scrambles the CRC added to the DCI is one of the Si-RNTI, the RA-RNTI, the TC-RNTI, the P-RNTI, the C-RNTI, the MCS-C-RNTI, or the CS-RNTI.

For the element B, the type of the search space in which the DCI is detected is the common search space or the UE-specific search space. The common search space includes a Type0 common search space, a Type1 common search space, and a Type2 common search space.

In Example A, the terminal apparatus 1 may detect the DCI in any common search space associated with CORE-SET #0. The detected DCI is provided with the CRC scrambled with one of the C-RNTI, the MCS-C-RNTI, and the CS-RNTI. The terminal apparatus 1 may determine a resource allocation table to be applied to the PDSCH scheduled by the DCI. In a case that pdsch-ConfigCommon includes pdsch-TimeDomainAllocationList for the terminal apparatus 1, the terminal apparatus 1 may determine a resource allocation table configured from the higher layer RRC signal. The resource allocation table is given by pdsch-TimeDomainAllocationList included in pdsch-ConfigCommon. In a case that pdsch-ConfigCommon does not include pdsch-TimeDomainAllocationList for the terminal apparatus 1, the terminal apparatus 1 may determine the default table A. In other words, the terminal apparatus 1 may use and apply, to the determination of the PDSCH time domain resource allocation, the default table A indicating the PDSCH time domain resource allocation configuration.

In addition, in Example B, the terminal apparatus 1 may detect the DCI in any common search space not associated with CORESET #0. The detected DCI is provided with the CRC scrambled with one of the C-RNTI, the MCS-C-RNTI, and the CS-RNTI. The terminal apparatus 1 may determine a resource allocation table to be applied to the PDSCH scheduled by the DCI. In a case that pdsch-Config includes pdsch-TimeDomainAllocationList for the terminal apparatus 1, the terminal apparatus 1 may determine a resource allocation table given from pdsch-TimeDomainAllocationList provided by pdsch-Config to be a resource allocation table to be applied to the PDSCH time domain resource allocation. In other words, in a case that pdsch-Config includes pdsch-TimeDomainAllocationList, the terminal apparatus 1 may use and apply pdsch-TimeDomainAllocationList provided by using pdsch-Config, to the determination of the PDSCH time domain resource allocation regardless of whether pdsch-ConfigCommon includes pdsch-TimeDomainAllocationList. Additionally, in a case that pdsch-Config does not include pdsch-TimeDomainAllocationList and pdsch-ConfigCommon includes pdsch-TimeDomainAllocationList, the terminal apparatus 1 may determine a resource allocation table given from pdsch-TimeDomainAllocationList provided by pdsch-ConfigCommon to be a resource allocation table to be applied to the PDSCH time domain resource allocation. In other words, the terminal apparatus 1 uses and applies, to the determination of the PDSCH time domain resource allocation, pdsch-TimeDomainAllocationList provided by using pdsch-ConfigCommon. Additionally, in a case that pdsch-Config does not include pdsch-TimeDomainAllocationList and pdsch-ConfigCommon does not include pdsch-TimeDomainAllocationList, the terminal apparatus 1 may determine the default table A to be a resource allocation table to be applied to the PDSCH time domain resource allocation.

In addition, in Example C, the terminal apparatus 1 may detect the DCI in the UE-specific search space. The detected DCI is provided with the CRC scrambled with one of the C-RNTI, the MCS-C-RNTI, and the CS-RNTI. The terminal apparatus 1 may determine the resource allocation table to be applied to the PDSCH scheduled by the DCI. In a case that pdsch-Config includes pdsch-TimeDomainAllocationList for the terminal apparatus 1, the terminal apparatus 1 may determine the resource allocation table to be applied to the PDSCH time domain resource allocation to be a resource allocation table given from pdsch-TimeDomainAllocationList provided by using pdsch-Config. In other words, in a case that pdsch-Config includes pdsch-TimeDomainAllocationList, the terminal apparatus 1 may use and apply pdsch-TimeDomainAllocationList provided by using pdsch-Config, to the determination of the PDSCH time domain resource allocation regardless of whether pdsch-ConfigCommon includes pdsch-TimeDomainAllocationList. Additionally, in a case that pdsch-Config does not include pdsch-TimeDomainAllocationList and pdsch-ConfigCommon includes pdsch-TimeDomainAllocationList, the terminal apparatus 1 may determine a resource allocation table given from pdsch-TimeDomainAllocationList provided by pdsch-ConfigCommon to be a resource allocation table to be applied to the PDSCH time domain resource allocation. In other words, the terminal apparatus 1 uses and applies, to the determination of the PDSCH time domain resource allocation, pdsch-TimeDomainAllocationList provided by using pdsch-ConfigCommon. Additionally, in a case that pdsch-Config does not include pdsch-TimeDomainAllocationList and pdsch-ConfigCommon does not include pdsch-TimeDomainAllocationList, the terminal apparatus 1 may determine the default table A to be a resource allocation table to be applied to the PDSCH time domain resource allocation.

A comparison between Example B and Example C indicates that the method for determining the resource allocation table to be applied to the PDSCH detected in the UE-specific search space is similar to a method for determining a resource allocation table to be applied to a PDSCH detected in any common search space not associated with CORESET #0.

Next, the terminal apparatus 1 may select one PDSCH time domain resource allocation configuration in the determined resource allocation table, based on the value indicated in the 'Time domain resource assignment' field included in the DCI scheduling the corresponding PDSCH. For example, in a case that the resource allocation table applied to the PDSCH time domain resource allocation is the default table A, a value m indicated in the 'Time domain resource assignment' field may indicate a row index m+1 in the default table A. At this time, the PDSCH time domain resource allocation is a time domain resource allocation configuration indicated by the row index m+1. The terminal apparatus 1 assumes the time domain resource allocation configuration indicated by the row index m+1, and receives the PDSCH. For example, in a case that the value m indicated in the 'Time domain resource assignment' field is 0, the terminal apparatus 1 uses a PDSCH time domain resource allocation configuration with the row index 1 in the default table A to identify the resource allocation in the time direction for the PDSCH scheduled by the corresponding DCI.

In a case that the resource allocation table applied to the PDSCH time domain resource allocation is a resource allocation table given from pdsch-TimeDomainAllocationList, the value m indicated in the 'Time domain resource assignment' field corresponds to the (m+1)th element (entry, row) in the list pdsch-TimeDomainAllocationList. For example, in a case that the value m indicated in the 'Time domain resource assignment' field is 0, the terminal apparatus 1 may reference the first element (entry) in the list pdsch-TimeDomainAllocationList. For example, in a case that the value m indicated in the 'Time domain resource assignment' field is 1, the terminal apparatus 1 may reference the second element (entry) in the list pdsch-TimeDomainAllocationList.

Hereinafter, the number of bits (size) of the 'Time domain resource assignment' field included in the DCI will be described.

By detecting the PDCCH including DCI format 1_0 or DCI format 1_1, the terminal apparatus 1 may decode (receive) the corresponding PDSCH. The number of bits in the 'Time domain resource assignment' field in the DCI format 1_0 may be a fixed number of bits. For example, the fixed number of bits may be four. In other words, the size of the 'Time domain resource assignment' field in DCI format 1_0 is four bits. The size of the 'Time domain resource assignment' field included in DCI format 1_1 may be a variable number of bits. For example, the number of bits in the 'Time domain resource assignment' field included in DCI format 1_1 may be one of 0, 1, 2, 3, and 4.

The determination of the number of bits in the 'Time domain resource assignment' field included in DCI format 1_1 will be described below.

The number of bits in the 'Time domain resource assignment' field included in DCI format 1_1 may be given at least based on (I) whether pdsch-ConfigCommon includes pdsch-TimeDomainAllocationList, and/or (II) whether pdsch-Config includes pdsch-TimeDomainAllocationList and/or (III) the number of rows included in the predefined default table. In the present embodiment, DCI format 1_1 is provided with a CRC scrambled with one of the C-RNTI, the MCS-C-RNTI, and the CS-RNTI. DCI format 1_1 may be detected in the UE-specific search space. In the present embodiment, the meaning of 'pdsch-Config includes pdsch-TimeDomain-AllocationList' may be the meaning of 'pdsch-TimeDomainAllocationList is provided by using pdsch-Config'. The meaning of 'pdsch-ConfigCommon includes pdsch-Time-DomainAllocationList' may mean 'pdsch-TimeDomainAllocationList is provided by using pdsch-ConfigCommon'.

The number of bits in the 'Time domain resource assignment' field may be given as ceiling ($\log_2$ (I)). A function Ceiling (A) outputs a minimum integer not less than A. In a case that pdsch-TimeDomainAllocationList is configured (provided) for the terminal apparatus 1, the value of I may be the number of entries included in pdsch-TimeDomain-AllocationList. In a case that pdsch-TimeDomainAllocationList is not configured (provided) for the terminal apparatus 1, the value of I may be the number of rows in the default table (default table A). In other words, in a case that pdsch-TimeDomainAllocationList is configured for the terminal apparatus 1, the number of bits in the Time domain resource assignment' field may be given based on the number of entries included in pdsch-TimeDomainAllocationList. In a case that pdsch-TimeDomainAllocationList is not configured for the terminal apparatus 1, the number of bits in the Time domain resource assignment' field may be given based on the number of rows in the default table (default table A). Specifically, in a case that pdsch-Config includes pdsch-TimeDomainAllocationList, the value of I may be the number of entries included in pdsch-TimeDomainAllocationList provided by using pdsch-Config. Additionally, in a case that pdsch-Config does not include pdsch-TimeDomainAllocationList and pdsch-ConfigCommon includes pdsch-TimeDomainAllocationList, the value of I may be the number of entries included in pdsch-TimeDomainAllocationList provided by using pdsch-ConfigCommon. Additionally, in a case that pdsch-Config does not include pdsch-TimeDomainAllocationList and pdsch-ConfigCommon does not include pdsch-TimeDomainAllocationList, the value of I may be the number of rows included in the default table (e.g., the default table A).

In other words, in a case that pdsch-TimeDomainAllocationList is configured (provided) for the terminal apparatus 1, the number of bits in the 'Time domain resource assignment' field may be given as ceiling ($\log_2$ (I)). In a case that pdsch-TimeDomainAllocationList is not configured (provided) for the terminal apparatus 1, the number of bits in the 'Time domain resource assignment' field may be a fixed number of bits. For example, the fixed number of bits may be four bits.

Here, I may be the number of entries included in pdsch-TimeDomainAllocationList. Specifically, in a case that pdsch-Config includes pdsch-TimeDomainAllocationList, the value of I may be the number of entries included in pdsch-TimeDomainAllocationList provided by using pdsch-Config. Additionally, in a case that pdsch-Config does not include pdsch-TimeDomainAllocationList and pdsch-ConfigCommon includes pdsch-TimeDomainAllocationList, the value of I may be the number of entries included in pdsch-TimeDomainAllocationList provided by using pdsch-ConfigCommon.

In this way, the terminal apparatus 1 can identify the number of bits in the 'Time domain resource assignment' field generated by the base station apparatus 3. In other words, the terminal apparatus 1 can correctly receive the PDSCH addressed to the terminal apparatus 1 scheduled by the base station apparatus 3.

A procedure for receiving the PUSCH will be described below.

In response to detection of DCI format 0_0 or the PDCCH including DCI format 0_1, the terminal apparatus 1 may transmit the corresponding PUSCH. In other words, the corresponding PUSCH may be scheduled (indicated) by the DCI format (DCI). Additionally, the PUSCH may also be scheduled by RAR UL grant included in an RAR message. The start position (start symbol) of the scheduled PUSCH is referred to as S. The start symbol S of the PUSCH may be the first symbol to which the PUSCH is transmitted (mapped) within a certain slot. The start symbol S corresponds to the beginning of the slot. For example, in a case that S has a value of 0, the terminal apparatus 1 may transmit the PUSCH from the first symbol in the certain slot. Additionally, for example, in a case that S has a value of 2, the terminal apparatus 1 may transmit the PUSCH from the third symbol of the certain slot. The number of consecutive symbols of the scheduled PUSCH is referred to as L. The number of consecutive symbols L is counted from the start symbol S. Determination of S and L allocated to the PUSCH will be described later.

The type of PUSCH mapping includes PUSCH mapping type A and PUSCH mapping type B. For PUSCH mapping type A, S has a value of 0. L takes a value ranging from 4 to 14. However, the sum of S and L takes a value ranging from 4 to 14. For the PUSCH mapping type B, S takes a value ranging from 0 to 13. L takes a value ranging from 1 to 14. However, the sum of S and L takes a value ranging from 1 to 14.

The position of the DMRS symbol for the PUSCH depends on the type of the PUSCH mapping. The position of the first DMRS symbol (first DM-RS symbol) for the PUSCH depends on the type of the PUSCH mapping. For the PUSCH mapping type A, the position of the first DMRS symbol may be indicated in the higher layer parameter dmrs-TypeA-Position. dmrs-TypeA-Position is set to one of 'pos2' or 'pos3'. For example, in a case that dmrs-TypeA-Position is set to 'pos2', the position of the first DMRS symbol for the PUSCH may correspond to the third symbol in the slot. For example, in a case that dmrs-TypeA-Position is set to 'pos3', the position of the first DMRS symbol for the PUSCH may correspond to the fourth symbol in the slot. For the PUSCH mapping type B, the position of the first DMRS symbol may correspond to the first symbol of the allocated PUSCH.

A method of identifying the PUSCH time domain resource allocation will be described below.

The base station apparatus 3 may perform scheduling by using the DCI to cause the terminal apparatus 1 to transmit the PUSCH. Then, by detecting the DCI addressed to the terminal apparatus 1, the terminal apparatus 1 may transmit the PUSCH. In a case of identifying the PUSCH time domain resource allocation, the terminal apparatus 1 first determines a resource allocation table to be applied to the corresponding PUSCH. The resource allocation table includes one or multiple PUSCH time domain resource allocation configurations. Then, the terminal apparatus 1 may select one PUSCH time domain resource allocation configuration in the determined resource allocation table, based on the value indicated in the 'Time domain resource assignment' field included in the DCI scheduling the corresponding PUSCH. In other words, the base station apparatus 3 determines the PUSCH resource allocation for the terminal apparatus 1, generates a value for the 'Time domain resource assignment' field, and transmits, to the terminal apparatus 1, the DCI including the 'Time domain resource assignment' field. The terminal apparatus 1 identifies the resource allocation in the time direction for the PUSCH, based on the value set in the 'Time domain resource assignment' field.

FIG. 16 is a diagram defining which resource allocation table is applied to the PUSCH time domain resource allocation. With reference to FIG. 16, the terminal apparatus 1 may determine a resource allocation table to be applied to the PUSCH time domain resource allocation. The resource allocation table includes one or multiple PUSCH time domain resource allocation configurations. In the present embodiment, the resource allocation table is classified as one of (I) a predefined resource allocation table and (II) a resource allocation table configured from a higher layer RRC signal. The predefined resource allocation table is defined as a default PUSCH time domain resource allocation A. Hereinafter, the default PUSCH time domain resource allocation A is referred to as the PUSCH default table A.

FIG. 17 is a diagram illustrating an example of the PUSCH default table A for the Normal Cyclic Prefix (NCP). With reference to FIG. 17, the PUSCH default table A includes 16 rows. Each row in the PUSCH default table A indicates a PUSCH time domain resource allocation configuration. Specifically, in FIG. 17, indexed rows each define the PUSCH mapping type, a slot offset $K_2$ between the PDCCH including the DCI and the corresponding PUSCH, the start symbol S for the PUSCH in the slot, and the number L of continuous allocated symbols. The resource allocation table configured from the higher layer RRC signal is given by a higher layer signal pusch-TimeDomainAllocationList. An information element PUSCH-TimeDomainResourceAllocation indicates a PUSCH time domain resource allocation configuration. PUSCH-TimeDomainResourceAllocation may be used to configure a time domain relationship between the PDCCH including the DCI and the PUSCH. pusch-TimeDomainAllocationList includes one or multiple information elements PUSCH-TimeDomainResourceAllocation. In other words, pusch-TimeDomainAllocationList is a list including one or multiple elements (information elements). One information element PDSCH-TimeDomainResourceAllocation may also be referred to as one entry (or one row). pusch-TimeDomainAllocationList may include up to 16 entries. Each entry may be defined by $K_2$, mappingType, and startSymbolAndLength. $K_2$ indicates a slot offset between the PDCCH including the DCI and the PUSCH scheduled by the DCI. In a case that PUSCH-TimeDomainResourceAllocation does not indicate $K_2$, the terminal apparatus 1 may assume that $K_2$ has a value of 1 in a case that the PUSCH has a subcarrier spacing of 15 kHz or 30 kHz, and that $K_2$ has a value of 2 in a case that the PUSCH has a subcarrier spacing of 60 kHz, and that $K_2$ has a value of 3 in a case that the PUSCH has a subcarrier spacing of 120 kHz. mappingType indicates one of PUSCH mapping type A or PUSCH mapping type A. startSymbolAndLength is an index providing an effective combination of the start symbol S of the PUSCH and the number L of continuous allocated symbols. startSymbolAndLength may be referred to as a start and length indicator SLIV. In other words, unlike in the default table directly defining the start symbol S and the consecutive symbols L, the start symbol S and the consecutive symbols L are given based on the SLIV. The base station apparatus 3 can set the SLIV value such that the time domain resource allocation of the PUSCH does not exceed the slot boundary. The value of SLIV is calculated based on the number of symbols included in the slot, the start symbol S, and the number L of consecutive symbols, as in the equations in FIG. 14.

The higher layer signal pusch-TimeDomainAllocationList may be included in pusch-ConfigCommon and/or pusch-Config. The information element pusch-ConfigCommon is used to configure a cell-specific parameter for the PUSCH for a certain BWP. The information element pusch-Config is used to configure a UE-specific parameter for the PUSCH for the certain BWP.

The terminal apparatus 1 detects the DCI scheduling the PUSCH. The slot in which the PUSCH is transmitted is given by (Expression 4) Floor($n*2\mu^{PUSCH}/2\mu^{PDCCH}$)+$K_2$. n is a slot in which a PDCCH is detected that schedules the PUSCH. $\mu_{PUSCH}$ is a subcarrier spacing configuration for the PUSCH. $\mu_{PDCCH}$ is a subcarrier spacing configuration for the PDCCH.

In FIG. 17, $K_2$ has a value of one of j, j+1, j+2, and j+3. The value of j is a value specified for the subcarrier spacing of the PUSCH. For example, in a case that the subcarrier spacing to which the PUSCH is applied is 15 kHz or 30 kHz, the value of j may be one slot. For example, in a case that the subcarrier spacing to which the PUSCH is applied is 60 kHz, the value of j may be two slots. For example, in a case that the subcarrier spacing to which the PUSCH is applied is 120 kHz, the value of j may be three slots.

As described above, the terminal apparatus 1 may determine, with reference to FIG. 16, which resource allocation table is applied to the PUSCH time domain resource allocation.

In Example D, the terminal apparatus 1 may determine a resource allocation table to be applied to the PUSCH scheduled by RAR UL grant. In a case that pusch-ConfigCommon includes pusch-TimeDomainAllocationList for the terminal apparatus 1, the terminal apparatus 1 may determine a resource allocation table configured from the higher layer RRC signal. The resource allocation table is given by pusch-TimeDomainAllocationList included in pusch-ConfigCommon. Additionally, in a case that pusch-ConfigCommon does not include pusch-TimeDomainAllocationList for the terminal apparatus 1, the terminal apparatus 1 may determine the PUSCH default table A. In other words, the terminal apparatus 1 may use and apply, to the determination of the PUSCH time domain resource allocation, the default table A indicating the PUSCH time domain resource allocation configuration.

In addition, in Example E, the terminal apparatus 1 may detect the DCI in any common search space associated with CORESET #0. The detected DCI is provided with the CRC scrambled with one of the C-RNTI, the MCS-C-RNTI, the TC-RNTI, and the CS-RNTI. Then, the terminal apparatus 1 may determine a resource allocation table to be applied to the PUSCH scheduled by the DCI. In a case that pusch-ConfigCommon includes pusch-TimeDomainAllocationList for the terminal apparatus 1, the terminal apparatus 1 may determine a resource allocation table given from pusch-TimeDomainAllocationList provided by pusch-ConfigCommon to be a resource allocation table to be applied to the PUSCH time domain resource allocation. Additionally, in a case that pusch-ConfigCommon does not include pusch-TimeDomainAllocationList, the terminal apparatus 1 may determine the PUSCH default table A to be a resource allocation table to be applied to the PUSCH time domain resource allocation.

In addition, in Example F, the terminal apparatus 1 may detect the DCI in (I) any common search space associated with CORESET #0 or (II) the UE-specific search space. The detected DCI is provided with the CRC scrambled with one of the C-RNTI, the MCS-C-RNTI, the TC-RNTI, and the CS-RNTI. The terminal apparatus 1 may determine a resource allocation table to be applied to the PUSCH scheduled by the DCI. In a case that the pusch-Config includes pusch-TimeDomainAllocationList for the terminal apparatus 1, the terminal apparatus 1 may determine a resource allocation table given from pusch-TimeDomainAllocationList provided by pusch-Config to be a resource allocation table to be applied to the PUSCH time domain resource allocation. In other words, in a case that pusch-Config includes pusch-TimeDomainAllocationList, the terminal apparatus 1 may use and apply, to the determination of the PUSCH time domain resource allocation, pusch-TimeDomainAllocationList provided by using pusch-Config, regardless of whether pusch-ConfigCommon includes pusch-TimeDomainAllocationList. Additionally, in a case that pusch-Config does not include pusch-TimeDomainAllocationList and pusch-ConfigCommon includes pusch-TimeDomainAllocationList, the terminal apparatus 1 may determine a resource allocation table given from pusch-TimeDomainAllocationList provided by pusch-ConfigCommon to be a resource allocation table to be applied to the PUSCH time domain resource allocation. In other words, the terminal apparatus 1 uses and applies pusch-TimeDomainAllocationList provided by using pusch-ConfigCommon to the determination of the PUSCH time domain resource allocation. Additionally, in a case that pusch-Config does not include pusch-TimeDomainAllocationList and pusch-ConfigCommon does not include pusch-TimeDomainAllocationList, the terminal apparatus 1 may determine the PUSCH default table A to be a resource allocation table to be applied to the PUSCH time domain resource allocation.

Subsequently, the terminal apparatus 1 may select one PUSCH time domain resource allocation configuration in the determined resource allocation table, based on the value indicated in the 'Time domain resource assignment' field included in the DCI scheduling the PUSCH. For example, in a case that the resource allocation table applied to the PUSCH time domain resource allocation is the PUSCH default table A, the value m indicated in the 'Time domain resource assignment' field may indicate the row index m+1 of the default table A. At this time, the PUSCH time domain resource allocation is a time domain resource allocation configuration indicated by the row index m+1. The terminal apparatus 1 assumes the time domain resource allocation configuration indicated by the row index m+1, and transmits the PUSCH. For example, in a case that the value m indicated in the 'Time domain resource assignment' field is 0, the terminal apparatus 1 uses a PUSCH time domain resource allocation configuration with the row index 1 in the PUSCH default table A to identify the resource allocation in the time direction for the PUSCH scheduled by the corresponding DCI.

In a case that the resource allocation table applied to the PUSCH time domain resource allocation is a resource allocation table given from pusch-TimeDomainAllocationList, the value m indicated in the 'Time domain resource assignment' field corresponds to the (m+1)th element (entry, row) in the list pusch-TimeDomainAllocationList. For example, in a case that the value m indicated in the 'Time domain resource assignment' field is 0, the terminal apparatus 1 may reference the first element (entry) in the list pusch-TimeDomainAllocationList. For example, in a case that the value m indicated in the 'Time domain resource assignment' field is 1, the terminal apparatus 1 may reference the second element (entry) in the list pusch-TimeDomainAllocationList.

Hereinafter, the number of bits (size) of the 'Time domain resource assignment' field included in the DCI will be described.

In response to detection of the PDCCH including DCI format 0_0 or DCI format 0_1, the terminal apparatus 1 may transmit the corresponding PUSCH. The number of bits in the 'Time domain resource assignment' field in the DCI format 0_0 may be a fixed number of bits. For example, the fixed number of bits may be four. In other words, the size of the 'Time domain resource assignment' field in DCI format 0_0 is four bits. The size of the 'Time domain resource assignment' field included in DCI format 0_1 may be a variable number of bits. For example, the number of bits in the 'Time domain resource assignment' field included in DCI format 0_1 may be one of 0, 1, 2, 3, and 4.

The determination of the number of bits in the 'Time domain resource assignment' field included in DCI format 0_1 will be described below.

The number of bits in the 'Time domain resource assignment' field may be given as ceiling ($\log_2 (I)$). In a case that pusch-TimeDomainAllocationList is configured (provided) for the terminal apparatus 1, the value of I may be the number of entries included in the pusch-TimeDomainAllocationList. In a case that pusch-TimeDomainAllocationList is not configured (provided) for the terminal apparatus 1, the value of I may be the number of rows in the PUSCH default table A. In other words, in a case that pusch-TimeDomainAllocationList is configured for the terminal apparatus 1, the number of bits in the Time domain resource assignment' field may be given based on the number of entries included in pusch-TimeDomainAllocationList. In a case that pusch-TimeDomainAllocationList is not configured for the terminal apparatus 1, the number of bits in the Time domain resource assignment' field may be given based on the number of rows in the default table (default table A). Specifically, in a case that the pusch-Config includes pusch-TimeDomainAllocationList, the value of I may be the number of entries included in pusch-TimeDomainAllocationList provided by using pusch-Config. Additionally, in a case that pusch-Config does not include pusch-TimeDomainAllocationList and pusch-ConfigCommon includes pusch-TimeDomainAllocationList, the value of I may be the number of entries included in pusch-TimeDomainAllocationList provided by using pusch-ConfigCommon. In a case that the pusch-Config does not include pusch-TimeDomainAllocationList and pusch-ConfigCommon does not include pusch-TimeDomainAllocationList, the value of I may be the number of rows included in the PUSCH default table A.

Hereinafter, slot aggregation transmission (multi-slot transmission) according to the present embodiment will be described.

A higher layer parameter pusch-AggregationFactor is used to indicate the number of repetition transmissions of data (a transport block). The higher layer parameter pusch-AggregationFactor indicates a value of one of 2, 4, and 8. The base station apparatus 3 may transmit, to the terminal apparatus 1, the higher layer parameter pusch-AggregationFactor indicating the number of data transmission repetitions. The base station apparatus 3 can cause, using pusch-AggregationFactor, the terminal apparatus 1 to repeat transmission of the transport block a prescribed number of times. The terminal apparatus 1 may receive the higher layer parameter pusch-AggregationFactor from the base station apparatus 3 and may repeat transmission of the transport block by using the number of repetition transmissions indicated in pusch-AggregationFactor thus received. However, in a case of not receiving pusch-AggregationFactor from the base station apparatus, the terminal apparatus 1 may consider the number of repetition transmissions of the transport block as one. In other words, in this case, the terminal apparatus 1 may perform one transmission of the transport block scheduled by the PDCCH. In other words, in a case that the terminal apparatus 1 does not receive pusch-AggregationFactor from the base station apparatus, the terminal apparatus 1 need not perform slot aggregation transmission (multi-slot transmission) on the transport block scheduled by the PDCCH.

Specifically, the terminal apparatus 1 may receive the PDCCH including the DCI format provided with the CRC scrambled with the C-RNTI or the MCS-C-RNTI, and transmit the PUSCH scheduled by the PDCCH. In a case that pusch-AggregationFactor is configured for the terminal apparatus 1, the terminal apparatus 1 may transmit the PUSCH N times in N continuous slots starting with the slot in which the PUSCH is first transmitted. A single PUSCH transmission (transmission of a transport block) may be performed per slot. In other words, transmission of the same transport block (repetition transmission) is performed only once within one slot. The value of N is indicated by pusch-AggregationFactor. In a case that pusch-AggregationFactor is not configured for the terminal apparatus 1, N may have a value of one. The slot in which the PUSCH is first transmitted may be given by (Expression 4) as described above. The PUSCH time domain resource allocation given based on the PDCCH scheduling the PUSCH may be applied to continuous N slots. That is, the same symbol allocation (the same start symbol S and the same number L of continuous allocated symbols) may be applied to continuous N slots. The terminal apparatus 1 may repeatedly transmit the transport block over continuous N slots starting with the slot in which the PUSCH is first transmitted. The terminal apparatus 1 may repeatedly transmit the transport block by using the same symbol allocation in each slot. The slot aggregation transmission performed by the terminal apparatus 1 in a case that the higher layer parameter pusch-AggregationFactor is configured may be referred to as a first aggregation transmission. In other words, the higher layer parameter pusch-AggregationFactor is used to indicate the number of repetition transmissions of the first aggregation transmission (repetition transmissions). The higher layer parameter pusch-AggregationFactor is also referred to as a first aggregation transmission parameter.

In the first aggregation transmission, the 0th transmission occasion may be in the slot in which the PUSCH is first transmitted. The 1st transmission occasion may be in the slot next to the slot in which the PUSCH is first transmitted. The (N−1)th transmission occasion may be in the Nth slot from the slot in which the PUSCH is first transmitted. A redundancy version applied to transmission of a transport block may be determined based on the (n−1)th transmission occasion of the transport block and $rv_{id}$ indicated by the DCI scheduling the PUSCH. A sequence of the redundancy versions is {0, 2, 3, 1}. The variable $rv_{id}$ is an index to the sequence of the redundancy versions. The variable is updated by the variable modulo 4. The redundancy version is used for coding (rate matching) of the transport block transmitted on the PUSCH. The redundancy version may be incremented in the order of 0, 2, 3, and 1. The repetition transmission of the transport block may be performed in order of the redundancy version.

FIG. 15 is a diagram illustrating an example of the redundancy version applied to a transmission occasion.

As illustrated in FIG. 15, the redundancy version $rv_{id}$ applied to the 0th transmission occasion is a value indicated by the DCI scheduling the PUSCH (transport block). For example, in a case that the DCI scheduling the PUSCH indicates that $rv_{id}$ has a value of 0, the terminal apparatus 1 may determine the redundancy version $rv_{id}$ to be provided to the transmission occasion, with reference to the first row in FIG. 15. The redundancy version to be applied to the transmission occasion may be incremented in the order of 0, 2, 3, and 1. For example, in a case that the DCI scheduling the PUSCH indicates that $rv_{id}$ has a value of 2, the terminal apparatus 1 may determine the redundancy version $rv_{id}$ to be provided to the transmission occasion, with reference to the second row in FIG. 15. The redundancy version applied to the transmission occasion may be incremented in the order of 2, 3, 1, and 0.

In a case that at least one symbol in the symbol allocation for a certain transmission occasion is indicated as a downlink symbol through a higher layer parameter, the terminal apparatus 1 need not transmit the transport block in a certain slot in the transmission occasion.

In the present embodiment, the base station apparatus 3 may transmit a higher layer parameter pusch-AggregationFactor-r16 to the terminal apparatus 1. The higher layer parameter pusch-AggregationFactor-r16 may be used to indicate the number of repetition transmissions of data (transport block). The higher layer parameter pusch-AggregationFactor-r16 may be used to indicate the number of repetition transmissions of slot aggregation transmission and/or mini-slot aggregation transmission. The slot aggregation transmission and the mini-slot aggregation transmission will be described below.

In the present embodiment, pusch-AggregationFactor-r16 is configured with a value of one of n1, n2, and n3, for example. The values of n1, n2, and n3 may respectively be 2, 4, and 8, or may be other values. n1, n2, and n3 each indicate the number of repetition transmissions of the transport block. In other words, pusch-AggregationFactor-r16 may indicate one value of the number of repetition transmissions. The number of repetition transmissions of the transport block may be the number of repetition transmissions within the slot (such as $N_{rep}$), or the number of repetition transmissions both within the slot and across slots (such as $N_{total}$), or the number of repetition transmissions across slots (such as $N_{total}$). Alternatively, the base station apparatus 3 may transmit, to the terminal apparatus 1, pusch-AggregationFactor-r16 including more than one element such that the number of repetition transmissions can be more flexibly configured for the terminal apparatus 1. Each element (information element or entry) may be used to indicate the number of repetition transmissions of the transport block. In other words, pusch-AggregationFactor-r16 may indicate the value of the number of multiple repetition transmissions being more than one. In the present embodiment, a second aggregation transmission may refer to the slot aggregation transmission performed by the terminal apparatus 1 in a case that the higher layer parameter pusch-AggregationFactor-r16 is configured. In other words, the higher layer parameter pusch-AggregationFactor-r16 may be used to indicate at least the number of repetition transmissions of the second aggregation transmission. The higher layer parameter pusch-AggregationFactor-r16 is also referred to as a second aggregation transmission parameter. The base station apparatus 3 may indicate any of the elements through the field included in the DCI scheduling the transport block, and notify the terminal apparatus 1 of the number of repetition transmissions of the transport block. A specific procedure will be described below. Additionally, the base station apparatus 3 may indicate any of the elements via a MAC Control Element (MAC CE), and notify the terminal apparatus 1 of the number of repetition transmissions of the transport block. In other words, the base station apparatus 3 may indicate any of the elements via a field included in the DCI and/or the MAC CE, and dynamically notify the terminal apparatus 1 of the number of repetition transmissions. The application, to the terminal apparatus 1, of the function of the number of dynamic repetitions may mean that the terminal apparatus 1 is dynamically notified of the number of repetition transmissions by the base station apparatus 3.

As a first example, the base station apparatus 3 need not transmit pusch-AggregationFactor and pusch-AggregationFactor-r16 to the terminal apparatus 1. In other words, the terminal apparatus 1 need not be configured with pusch-AggregationFactor and pusch-AggregationFactor-r16. In other words, the terminal apparatus 1 may receive, from the base station apparatus 3, an RRC message not including (not configured with) pusch-AggregationFactor and pusch-AggregationFactor-r16. In this case, the terminal apparatus 1 may transmit the PUSCH in the slot given by (Expression 4) as described above. In other words, the number of repetition transmissions of the transport block may be one. In other words, the terminal apparatus 1 need not perform slot aggregation transmission and/or mini-slot aggregation transmission.

As a second example, the base station apparatus 3 may transmit pusch-AggregationFactor and need not transmit pusch-AggregationFactor-r16, to the terminal apparatus 1. In other words, for the terminal apparatus 1, pusch-AggregationFactor may be configured, whereas pusch-AggregationFactor-r16 need not be configured. In other words, the terminal apparatus 1 may receive, from the base station apparatus 3, an RRC message including (configured with) pusch-AggregationFactor and not including (not configured with) pusch-AggregationFactor-r16. In this case, the terminal apparatus 1 may transmit the PUSCH N times in continuous N slots starting with the slot given by (Expression 4) as described above. In other words, the number of repetition transmissions of the transport block may be N indicated by pusch-AggregationFactor. The terminal apparatus 1 may perform the first aggregation transmission on the PUSCH scheduled by the DCI. The PDCCH including the DCI scheduling the PUSCH may be transmitted in the CSS or may be transmitted in the USS. The same symbol allocation may be applied to continuous N slots.

As a third example, the base station apparatus 3 need not transmit pusch-AggregationFactor but may transmit pusch-AggregationFactor-r16, to the terminal apparatus 1. In other words, for the terminal apparatus 1, pusch-AggregationFactor need not be configured, whereas pusch-AggregationFactor-r16 may be configured. In other words, the terminal apparatus 1 may receive, from the base station apparatus 3, an RRC message not including (not configured with) pusch-AggregationFactor but including (configured with) pusch-AggregationFactor-r16. In this case, the terminal apparatus 1 may transmit the PUSCH M times in one or multiple slots from the slot given by (Expression 4) as described above. Unlike in the first aggregation transmission, multiple slots may be continuous or discontinuous. In other words, the number M of repetitions of the transport block may be indicated by pusch-AggregationFactor-r16. The PDCCH including the DCI scheduling the PUSCH may be transmitted in the CSS or may be transmitted in the USS. The same symbol allocation need not be applied to multiple slots. In other words, the PUSCH time domain resource allocation (symbol allocation) applied to the first repetition transmission of the transport block may be given based on the DCI scheduling the transport block. However, the PUSCH symbol allocation applied to the second and subsequent repetition transmissions of the transport block may be different from the symbol allocation given based on the PDCCH (such as DCI) that schedules the PUSCH. This is referred to as symbol allocation expansion. Specifically, the start symbol S applied to the second and subsequent repetition transmissions of the transport block may be different from the start symbol S given based on the PDCCH (start symbol expansion). For example, the start symbol S applied to the second and subsequent repetition transmissions of the transport block may be the 0th symbol at the beginning of the slot. The start symbol S applied to the second and subsequent repetition transmissions of the transport block may be the same as the start symbol S given based on the PDCCH. For example, the start symbol S applied to the second and subsequent repetition transmissions of the transport block may be the first available symbol at the beginning of the slot. Additionally, the number L of continuous allocated symbols of the PUSCH to be applied to the second and subsequent repetition transmissions of the transport block may be different from the number L of continuous allocated symbols given based on the PDCCH (symbol number expansion). The number L of continuous allocated symbols of the PUSCH to be applied to the second and subsequent repetition transmissions of the transport block may be the same as the number L of continuous allocated symbols given based on the PDCCH. The start symbol and/or the number of symbols in each repetition transmission may be determined based on the available symbols. The number L of symbols of the Xth PUSCH may be determined based on one, multiple, or all of the start symbol S given based on the PDCCH, the number L of symbols given based on the PDCCH, the number of symbols in the slot, the available symbols within the slot, $N_{total}$, $N_{rep}$, and $N_{slots}$.

Additionally, in a third example, in a case that pusch-AggregationFactor-r16 includes one and/or more than one element, the terminal apparatus 1 may select one of the multiple elements by using the 'Repetition Number' field included in the DCI (dynamic repetition number). The 'Repetition Number' field included in the DCI may be present in a case that pusch-AggregationFactor-r16 includes one and/or more than one element, and may otherwise be absent. The 'Repetition Number' field included in the DCI may be absent in a case that pusch-AggregationFactor-r16 is not configured. The value indicated by the selected element is the number of repetition transmissions of the transport block scheduled by the DCI. The terminal apparatus 1 may repeatedly transmit the transport block the notified number of times. The number of bits in the 'Repetition Number' field may be given as ceiling ($\log_2(X+1)$) or ceiling ($\log_2(X)$). X is the number of elements included in pusch-AggregationFactor-r16. In a case that the number of bits in the 'Repetition Number' field is given as ceiling ($\log_2(X)$), the value m indicated in the 'Repetition Number' field may correspond to the (m+1)th element included in pusch-AggregationFactor-r16. The number of repetition transmissions of the transport block may be a value indicated by the (m+1)th element. For example, in a case that the value m indicated in the 'Repetition Number' field is 0, the terminal apparatus 1 may reference the first element included in pusch-AggregationFactor-r16. The value indicated by the element may be greater than 1. The value indicated by the element may be equal to 1. Additionally, in a case that the number of bits in the 'Repetition Number' field is given as ceiling ($\log_2(X+1)$), the value m indicated in the 'Repetition Number' field may correspond to the mth element included in pusch-AggregationFactor-r16. In this case, m has a non-zero value. In a case that the value m indicated in the 'Repetition Number' field is 0, the terminal apparatus 1 may consider the number of repetition transmissions as one. The value indicated by each element may be greater than one. In a case that pusch-AggregationFactor-r16 is configured, functions for symbol allocation expansion (start symbol expansion and/or symbol number expansion), the number of dynamic repetitions and/or mini-slot aggregation transmission are applied to the aggregation transmission (the second aggregation transmission).

Additionally, as a fourth example, the base station apparatus 3 may transmit pusch-AggregationFactor and pusch-AggregationFactor-r16 to the terminal apparatus 1. In other words, the terminal apparatus 1 may be configured with pusch-AggregationFactor and pusch-AggregationFactor-r16. In other words, the terminal apparatus 1 may receive, from the base station apparatus 3, an RRC message including (configuring) pusch-AggregationFactor and pusch-AggregationFactor-r16. Basically, the function for symbol allocation expansion (start symbol expansion and/or symbol number expansion), the number of dynamic repetitions, and/or mini-slot aggregation transmission is applied, the function corresponding to an operation performed in a case that pusch-AggregationFactor-r16 is configured as described as the third example.

In the following, the terminal apparatus 1 configured with pusch-AggregationFactor-r16 may determine whether or not the 'Repetition Number' field is present in certain DCI, based on at least some or all of elements (A) to (D) described below.

Element A: the type of the RNTI that scrambles the CRC to be added to the DCI
Element B: the type of the search space in which the DCI is detected
Element C: the type of the DCI format
Element D: information indicated in the field of DCI For the element A, in a case that the type of the RNTI that scrambles the CRC to be added to the DCI is one of the SI-RNTI, RA-RNTI, TC-RNTI, P-RNTI, C-RNTI, MCS-C-RNTI, and CS-RNTI, the 'Repetition Number' field may be absent from the DCI. In a case that the type of the RNTI that scrambles the CRC to be added to the DCI is NEW-RNTI, the 'Repetition Number' field included in the DCI may be present.

For the element B, the type of the search space in which the terminal apparatus 1 monitors the DCI is a common search space or a UE-specific search space. The common search space includes a Type0 common search space, a Type1 common search space, and a Type2 common search space. In a case that the search space in which the DCI is monitored is a common search space, the 'Repetition Number' field may be absent from the DCI. In a case that the search space in which the DCI is monitored is a UE-specific search space, a 'Repetition Number' field may be present in the DCI.

For the element C, the type of the DCI format includes DCI format 0_0, DCI format 0_1, and DCI format 0_2. In a case that the DCI is of DCI format 0_0 and DCI format 0_1, the 'Repetition Number' field may be absent from the DCI. In a case that the DCI is of DCI format 0_2, a 'Repetition Number' field may be present in the DCI. Alternatively, in a case that the DCI is of DCI format 0_0, the 'Repetition Number' field may be absent from the DCI. In a case that the DCI is of DCI format 0_1 or DCI format 0_2, the 'Repetition Number' field may be present in the DCI.

Additionally, for example, in a case that DCI format 0_0 is monitored in the common search space, the 'Repetition Number' field may be absent from the DCI. In a case that DCI format 0_0 is monitored in the UE-specific search space, the 'Repetition Number' field may be present in the DCI. Additionally, for example, in a case that DCI format 0_1 is scrambled with the NEW-RNTI, the 'Repetition Number' field may be present in the DCI. In a case that DCI format 0_1 is scrambled with an RNTI other than the NEW-RNTI, the 'Repetition Number' field may be absent from the DCI.

In the following, the terminal apparatus 1 configured with pusch-AggregationFactor-r16 may determine, based on at least some or all of the following elements (A) to (C), whether to apply the above-described function provided in a case that pusch-AggregationFactor-r16 is configured for the PUSCH transmission scheduled by the DCI.

Element A: the type of the RNTI that scrambles the CRC to be added to the DCI
Element B: the type of the search space in which the DCI is detected
Element C: the type of the DCI format For the element A, the type of the RNTI that scrambles the CRC to be added to the DCI is one of the SI-RNTI, RA-RNTI, TC-RNTI, P-RNTI, C-RNTI, MCS-C-RNTI, and CS-RNTI, the function provided in a case that pusch-AggregationFactor-r16 is configured for the PUSCH transmission scheduled by the DCI need not be applied. Additionally, in a case that the type of the RNTI that scrambles the CRC to be added to the DCI is the NEW-RNTI, the function provided in a case that pusch-AggregationFactor-r16 is configured for the PUSCH transmission scheduled by the DCI may be applied.

For the element B, the type of the search space in which the terminal apparatus 1 monitors the DCI is a common search space or a UE-specific search space. The common search space includes a Type0 common search space, a Type1 common search space, and a Type2 common search space. In a case that the search space in which the DCI is monitored is the common search space, the function provided in a case that pusch-AggregationFactor-r16 is configured for the PUSCH transmission scheduled by the DCI need not be applied. In a case that the search space in which the DCI is monitored is the UE-specific search space, the function provided in a case that pusch-AggregationFactor-r16 is configured for the PUSCH transmission scheduled by the DCI may be applied.

For the element C, the type of the DCI format includes DCI format 0_0, DCI format 0_1, and DCI format 0_2. In a case that the DCI is of DCI format 0_0 and DCI format 0_1, the function provided in a case that pusch-AggregationFactor-r16 is configured for the PUSCH transmission scheduled by the DCI need not be applied. In a case that the DCI is of DCI format 0_2, the function provided in a case that pusch-AggregationFactor-r16 is configured for the PUSCH transmission scheduled by the DCI may be applied. Alternatively, in a case that the DCI is of DCI format 0_0, the function provided in a case that pusch-AggregationFactor-r16 is configured for the PUSCH transmission scheduled by the DCI need not be applied. In a case that the DCI is of DCI format 0_1 or DCI format 0_2, the function provided in a case that pusch-AggregationFactor-r16 is configured for the PUSCH transmission scheduled by the DCI may be applied.

Additionally, for example, in a case that DCI format 0_0 is monitored in the common search space, the function provided in a case that pusch-AggregationFactor-r16 is configured for the PUSCH transmission scheduled by the DCI need not be applied. In a case that DCI format 0_0 is monitored in the UE-specific search space, the function provided in a case that pusch-AggregationFactor-r16 is configured for the PUSCH transmission scheduled by the DCI may be applied.

In a case that the function provided in a case that the pusch-AggregationFactor-r16 is configured is not applied, as described above, the first aggregation transmission may be performed for the PUSCH transmission scheduled by the DCI in a case that pusch-AggregationFactor is configured. In other words, the terminal apparatus 1 may repeatedly transmit the transport block N times across N continuous slots. The value of N may be given by pusch-AggregationFactor. The same symbol allocation may be applied in the N slots. Additionally, in a case that the function provided in a case that the pusch-AggregationFactor-r16 is configured is not applied, the PUSCH transmission scheduled by the DCI may be performed once in a case that pusch-AggregationFactor is not configured. In other words, the terminal apparatus 1 may transmit the transport block once.

The mini-slot aggregation transmission (subslot aggregation transmission, multi-subslot transmission, intra-slot aggregation transmission) in the present embodiment will be described below.

As described above, for the slot aggregation transmission (the slot aggregation transmission in the first aggregation transmission and the second aggregation transmission), one uplink grant may schedule two or more PUSCH repetition transmissions. Repetition transmissions are performed in the respective continuous slots (or respective available slots). In other words, in the slot aggregation, the maximum number of repetition transmissions of the same transport block within one slot (one available slot) is one. The available slot may be a slot in which the repetition transmission of the transport block is actually performed.

In the mini-slot aggregation transmission, one uplink grant may schedule two or more PUSCH repetition transmissions. The repetition transmissions may be performed in the same slot or across continuous available slots. In the scheduled PUSCH repetition transmissions, each slot may have a different number of repetition transmissions performed in the slot, based on the symbols available for PUSCH repetition transmission in the slot (available slot). In other words, in the mini-slot aggregation transmission, the number of repetition transmissions of the same transport block within one slot (one available slot) may be one or more. In other words, in the mini-slot aggregation transmission, the terminal apparatus 1 can transmit one or more repetition transmissions of the same transport block to the base station apparatus 3 within one slot. In other words, it can also be said that the mini-slot aggregation transmission means a mode that supports intra-slot aggregation. The symbol allocation expansion (start symbol expansion and/or symbol number expansion) and/or the number of dynamic repetitions described above may be applied to the mini-slot aggregation transmission.

In the present embodiment, the terminal apparatus 1 may determine, based at least on (I) a higher layer parameter and/or (II) a field included in the uplink grant, whether the aggregation transmission is applied to the PUSCH transmission for which the uplink grant is scheduled, or whether any of the aggregation transmission types is applied. The aggregation transmission type may include the first aggregation transmission and the second aggregation transmission. As another example, the second aggregation transmission may be divided into different types: slot aggregation transmission and mini-slot aggregation transmission. In other words, the types of aggregation transmission may include first slot aggregation transmission (first aggregation transmission), second slot aggregation transmission (slot aggregation in the second aggregation transmission), and the mini-slot aggregation transmission.

In Aspect A of the present embodiment, the base station apparatus 3 may notify, by the higher layer parameter, the terminal apparatus 1 of which of the slot aggregation transmission and the mini-slot aggregation transmission is configured. Which of the slot aggregation transmission and the mini-slot aggregation transmission is configured may mean which of the slot aggregation transmission and the mini-slot aggregation transmission is applied. For example, pusch-AggregationFactor may be used to indicate the number of repetition transmissions of the first aggregation transmission (the first slot aggregation transmission). pusch-AggregationFactor-r16 may be used to indicate the number of repetition transmissions of the second slot aggregation transmission and/or the mini-slot aggregation transmission. pusch-AggregationFactor-r16 may be a common parameter for the second slot aggregation transmission and/or the mini-slot aggregation transmission. A higher layer parameter repTxWithinSlot-r16 may be used to indicate mini-slot aggregation transmission. In a case that the higher layer parameter repTxWithinSlot-r16 is effectively set, the terminal apparatus 1 may consider that the mini-slot aggregation transmission is applied to transport block transmission, and may perform the mini-slot aggregation transmission. In other words, in a case that pusch-AggregationFactor-r16 is configured for the terminal apparatus 1 and repTxWithinSlot-r16 is configured (set effectively), the terminal apparatus 1 may consider that mini-slot aggregation transmission is applied. The number of repetition transmissions of the mini-slot aggregation transmission may be indicated by pusch-AggregationFactor-r16. In a case that pusch-AggregationFactor-r16 is configured for the terminal apparatus 1 and repTxWithinSlot-r16 is not configured, the terminal apparatus 1 may consider that the second slot aggregation transmission is applied. The number of repetition transmissions of the second slot aggregation transmission may be indicated by pusch-AggregationFactor-r16. Additionally, in a case that pusch-AggregationFactor is configured for the terminal apparatus 1 and pusch-AggregationFactor-r16 is not configured, the terminal apparatus 1 may consider that the first slot aggregation transmission is applied. In a case that pusch-AggregationFactor and pusch-AggregationFactor-r16 are not configured for the terminal apparatus 1, the terminal apparatus 1 may consider that the aggregation transmission is not applied and may perform one transmission of the PUSCH for which the uplink grant is scheduled. In the present embodiment, configuring the higher layer parameter (e.g., repTxWithinSlot-r16) may mean that the higher layer parameter (e.g., repTxWithinSlot-r16) is validly set or that the higher layer parameter (e.g., repTxWithinSlot-r16) is transmitted from the base station apparatus 3. In the present embodiment, not configuring the higher layer parameter (e.g., repTxWithinSlot-r16) may mean that the higher layer parameter (e.g., repTxWithinSlot-r16) is invalidly configured or that the higher layer parameter (e.g., repTxWithinSlot-r16) is not transmitted from the base station apparatus 3.

In Aspect B of the present embodiment, the base station apparatus 3 may notify, by the higher layer parameter, the terminal apparatus 1 of which of the slot aggregation transmission and the mini-slot aggregation transmission is configured. pusch-AggregationFactor may be used to indicate the number of repetition transmissions of the first slot aggregation transmission. pusch-AggregationFactor-r16 may be used to indicate the number of repetition transmissions of the second slot aggregation transmission and/or the mini-slot aggregation transmission. pusch-AggregationFactor-r16 may be a common parameter for the second slot aggregation transmission and/or the mini-slot aggregation transmission. In a case that pusch-AggregationFactor-r16 is configured for the terminal apparatus 1, the second slot aggregation transmission and/or the mini-slot aggregation transmission may be applied to the terminal apparatus 1.

Next, the terminal apparatus 1 may determine which of the slot aggregation transmission and the mini-slot aggregation transmission is applied, based on the field included in the uplink grant scheduling PUSCH transmission (PUSCH repetition transmission). As an example, a certain field included in the uplink grant may be used to indicate which of the slot aggregation transmission and the mini-slot aggregation transmission is applied. The field may include one bit. Additionally, the terminal apparatus 1 may determine which of the slot aggregation transmission and the mini-slot aggregation transmission is applied, based on the field included in the uplink grant transmitted from the base station apparatus 3. The terminal apparatus 1 may determine that the slot aggregation transmission is applied in a case that the field indicates 0, and may determine that the mini-slot aggregation transmission is applied in a case that the field indicates 1.

As an example, the terminal apparatus 1 may determine which of the slot aggregation transmission and the mini-slot aggregation transmission is applied, based on the 'Time domain resource assignment' field included in the uplink grant transmitted from the base station apparatus 3. As described above, the 'Time domain resource assignment' field is used to indicate the PUSCH time domain resource allocation. The terminal apparatus 1 may determine which of the slot aggregation transmission and the mini-slot aggregation transmission is applied, based on whether the number L of continuous allocated symbols obtained based on the 'Time domain resource assignment' field exceeds a prescribed value. The terminal apparatus 1 may determine that the slot aggregation transmission is applied, in a case that the symbol number L exceeds a prescribed value. The terminal apparatus 1 may determine that the mini-slot aggregation transmission is applied, in a case that the symbol number L does not exceed the prescribed value. The prescribed value may be a value indicated by the higher layer parameter. The prescribed value may be a value defined in advance in specifications or the like. For example, the prescribed value may be seven symbols.

In Aspect C of the present embodiment, the base station apparatus 3 may notify, by the higher layer parameter, the terminal apparatus 1 of which of the slot aggregation transmission and the mini-slot aggregation transmission is configured. For example, the base station apparatus 3 may individually configure the higher layer parameter indicating the number of repetition transmissions for each of the second slot aggregation transmission and the mini-slot aggregation transmission. For example, pusch-AggregationFactor-r16 may be used to indicate the number of repetition transmissions of the second slot aggregation transmission. pusch-MiniAggregationFactor-r16 may be used to indicate the number of repetition transmissions of the mini-slot aggregation transmission. In a case of configuring one of the second slot aggregation transmission and the mini-slot aggregation transmission for the terminal apparatus 1, the base station apparatus 3 may transmit the corresponding higher layer parameter. In other words, in a case that the base station apparatus 3 transmits pusch-AggregationFactor-r16 to the terminal apparatus 1, the terminal apparatus 1 may consider that the first slot aggregation transmission is applied. In a case that the base station apparatus 3 transmits pusch-MiniAggregationFactor-r16 to the terminal apparatus 1, the terminal apparatus 1 may consider that the mini-slot aggregation transmission is applied.

In Aspect A, Aspect B, or Aspect C of the present embodiment, the terminal apparatus 1 may determine which of the slot aggregation transmission and the mini-slot aggregation transmission is applied, based on the PUSCH mapping type obtained based on the 'Time domain resource assignment' field included in the uplink grant. Specifically, in a case that the second slot aggregation transmission and/or the mini-slot aggregation transmission is applied, the terminal apparatus 1 may consider that the second slot aggregation transmission and/or the mini-slot aggregation transmission is not applied in a case that PUSCH mapping type A is obtained as a PUSCH mapping type based on the 'Time domain resource assignment' field. In a case that pusch-AggregationFactor is transmitted from the base station apparatus 3, the terminal apparatus 1 may determine that the first slot aggregation transmission is applied to the PUSCH transmission scheduled by the uplink grant. The number of repetition transmissions of the slot aggregation transmission is indicated by pusch-AggregationFactor. In a case that pusch-AggregationFactor is not transmitted from the base station apparatus 3, the terminal apparatus 1 may perform one transmission of the PUSCH scheduled by the uplink grant. In other words, in a case of satisfying a first condition, the terminal apparatus 1 and the base station apparatus 3 may apply the same symbol allocation in multiple slots and repeatedly transmit the transport block N times in continuous N slots in a case that pusch-AggregationFactor is configured, and transmit the transport block once in a case that pusch-AggregationFactor is not configured. In a case of satisfying a second condition, the terminal apparatus 1 and the base station apparatus 3 may transmit the transport block by applying the second aggregation transmission as described above. In this case, the first condition at least includes the PUSCH mapping type being indicated as the type A in the DCI scheduling the PUSCH transmission. The second condition at least includes the PUSCH mapping type being indicated as the type B in the DCI scheduling the PUSCH transmission. The value of N is given by pusch-AggregationFactor. That is, the type B may be the mapping type of the PUSCH to which the second slot aggregation transmission and/or mini-slot aggregation transmission is applied. Either the type A or the type B may be the mapping type of the PUSCH to which the first slot aggregation transmission is applied.

The determination of the number of repetition transmissions and a procedure for frequency hopping according to the present embodiment will be described below.

The terminal apparatus 1 may determine $N_{total}$. $N_{total}$ is the total number (total number of PUSCHs repeatedly transmitted) of repetition transmissions of the same transport block scheduled by one uplink grant. In other words, $N_{total}$ is the number of one or multiple PUSCHs scheduled by one uplink grant. The terminal apparatus 1 may determine $N_{rep}$. $N_{rep}$ is the number of repetition transmissions of the same transport block within the slot (number of PUSCHs repeatedly transmitted). In other words, $N_{rep}$ is, for one or multiple PUSCHs scheduled by one uplink grant, the number of one or multiple PUSCHs allocated in a certain slot. The terminal apparatus 1 may determine $N_{slots}$. $N_{slots}$ is the number of slots in which the same transport block scheduled by one uplink grant is repeatedly transmitted. In other words, $N_{slots}$ is the number of slots used for one or multiple PUSCHs scheduled by one uplink grant. The terminal apparatus 1 may derive $N_{total}$ from $N_{rep}$ and $N_{slots}$. The terminal apparatus 1 may derive $N_{rep}$ from $N_{total}$ and $N_{slots}$. The terminal apparatus 1 may derive $N_{slots}$ from $N_{rep}$ and $N_{total}$. $N_{slots}$ may be one or two. $N_{rep}$ may have a value varying among the slots. $N_{rep}$ may have the same value among the slots. A higher layer parameter frequencyHopping may be configured (provided) for the terminal apparatus 1. The higher layer parameter frequencyHopping may be set to one of 'intraSlot' and 'interSlot'. In a case that frequencyHopping is set to 'intraSlot', the terminal apparatus 1 may transmit the PUSCH with intra-slot frequency hopping. In other words, configuring the intra-slot frequency hopping for the terminal apparatus 1 may mean that frequencyHopping is set to 'intraSlot' and that the 'Frequency hopping flag' field included in the DCI scheduling the PUSCH has a value set to 1. In a case that frequencyHopping is set to 'interSlot', the terminal apparatus 1 may transmit the PUSCH with inter-slot frequency hopping. In other words, configuring the inter-slot frequency hopping for the terminal apparatus 1 may mean that the frequencyHopping is set to 'interSlot' and that the 'Frequency hopping flag' field included in the DCI scheduling the PUSCH has a value set to 1. Additionally, in a case that the base station apparatus 3 does not transmit frequencyHopping to the terminal apparatus 1, the terminal apparatus 1 may perform the PUSCH transmission without frequency hopping. In other words, the lack of configuration of frequency hopping for the terminal apparatus 1 may include the lack of transmission of frequencyHopping. Additionally, the lack of configuration of frequency hopping for the terminal apparatus 1 may include setting, to 0, of the value of the 'Frequency hopping flag' field included in the DCI scheduling the PUSCH despite transmission of frequencyHopping.

Figure 8:
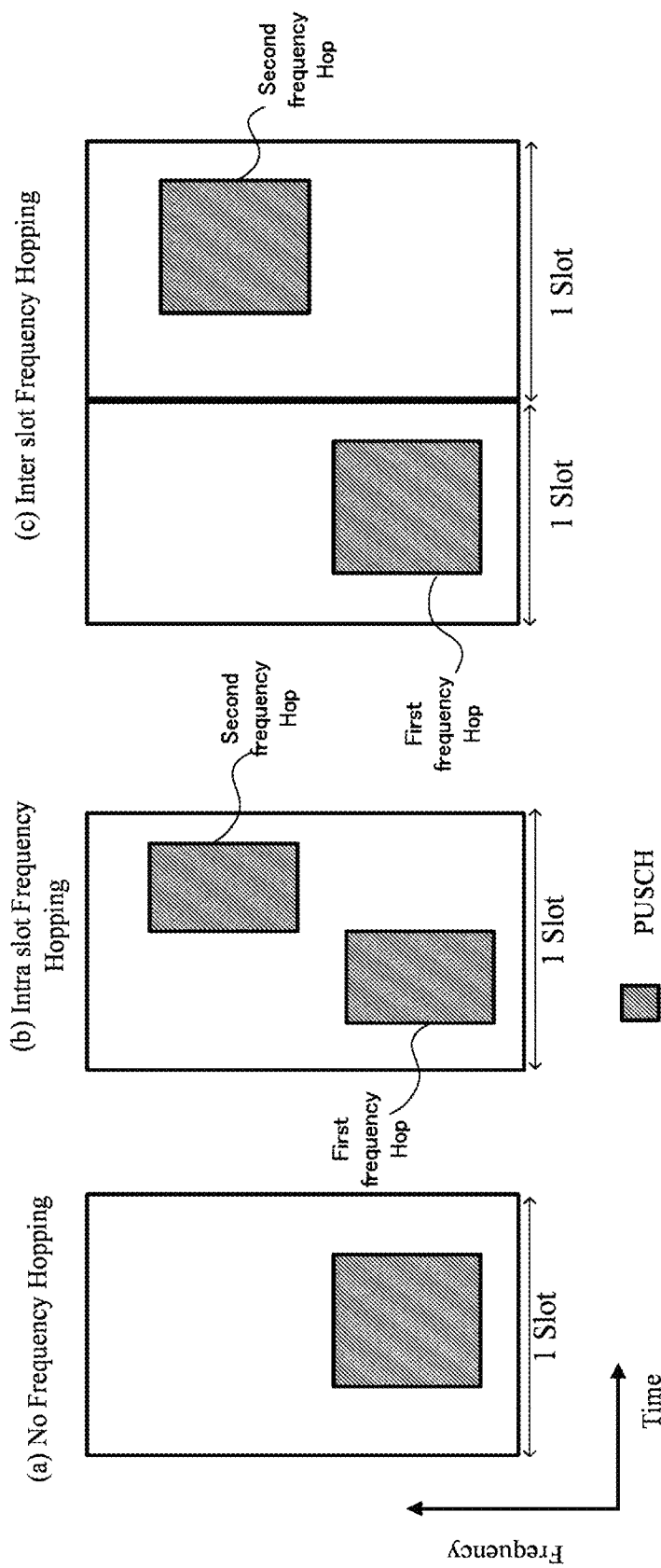
FIG. 8 is a diagram illustrating an example of frequency hopping according to an embodiment of the present invention.

FIG. 8 is a diagram illustrating an example of the frequency hopping according to the present embodiment. FIG. 8(a) is an example of PUSCH transmission without frequency hopping. FIG. 8(b) is an example of PUSCH transmission with intra-slot frequency hopping. FIG. 8(c) is an example of PUSCH transmission with inter-slot frequency hopping. FIG. 8 may be applied to the slot aggregation transmission. FIG. 8 may be applied to the mini-slot aggregation transmission with one repetition transmission within one slot.

In FIG. 8(b), the PUSCH transmission with intra-slot frequency hopping includes a first frequency hop (first hop or first frequency unit) and a second frequency hop (first hop or second frequency unit) in the slot. The number of symbols for the first frequency hop may be given by Floor($N^{PUSCH,s}_{symb}/2$). The number of symbols for the second frequency hop may be given by $N^{PUSCH,s}_{symb}$−Floor($N^{PUSCH,s}_{symb}/2$). $N^{PUSCH,s}_{symb}$ is the length of one PUSCH transmission in OFDM symbols within one slot. In other words, $N^{PUSCH,s}_{symb}$ may be the number of OFDM symbols used for one PUSCH scheduled in one slot. The value of $N^{PUSCH,s}_{symb}$ may be indicated in a field included in the DCI format or the RAR UL grant. $N^{PUSCH,s}_{symb}$ may be the number of continuous allocated symbols obtained based on the 'Time domain resource assignment' field included in the uplink grant scheduling transmission of the transport block. The difference of the resource block $RB_{offset}$ between the starting RB of the first frequency hop and the starting RB of the first frequency hop may be referred to as a resource block frequency offset. In other words, $RB_{offset}$ is the RB frequency offset between two frequency hops. Additionally, $RB_{offset}$ may also be referred to as a frequency offset for the second frequency hop. For example, the starting RB of the first frequency hop is referred to as $RB_{start}$. The starting RB of the second frequency hop may be given by (Expression 5) ($RB_{start}+RB_{offset}$) mod $N^{size}_{BWP}$. $RB_{start}$ may be given by a frequency resource allocation field included in the DCI scheduling the PUSCH. $N^{size}_{BWP}$ is the size of an activated BWP (number of physical resource blocks). The function (A) mod (B) executes division of A and B, and outputs a number for a remainder resulting from the division. The value of the frequency offset $RB_{offset}$ is configured by a higher layer parameter frequencyHoppingOffsetLists included in PUSCH-Config. The higher layer parameter frequencyHoppingOffsetLists is used to indicate a set of frequency offset (frequency hopping offset) values in a case that the frequency hopping is applied. In FIG. 8(b), the intra-slot frequency hopping may be applied to single-slot PUSCH transmission and/or multi-slot (slot aggregation) PUSCH transmission.

In FIG. 8(c), inter-slot frequency hopping may be applied to multi-slot PUSCH transmission. $RB_{offset}$ is an RB frequency offset between two frequency hops. The starting RB of the PUSCH transmitted in a certain slot may be determined based on the number $n^u_s$ of the slot. In a case that $n^u_s$ mod 2 is 0, the starting RB of the PUSCH in the slot is $RB_{start}$. In a case that $n^u_s$ mod 2 is 1, the starting RB of the PUSCH in the slot may be given by (Expression 5) ($RB_{start}+RB_{offset}$) mod $N^{size}_{BWP}$. $RB_{start}$ may be given by the frequency resource allocation field included in the DCI scheduling the PUSCH. In FIG. 8(c), the terminal apparatus 1 repeatedly transmits the same transport block in two continuous slots.

The intra-slot frequency hopping may be applied to the single-slot transmission or slot aggregation transmission. The inter-slot frequency hopping may be applied to the slot aggregation transmission.

Figure 9:
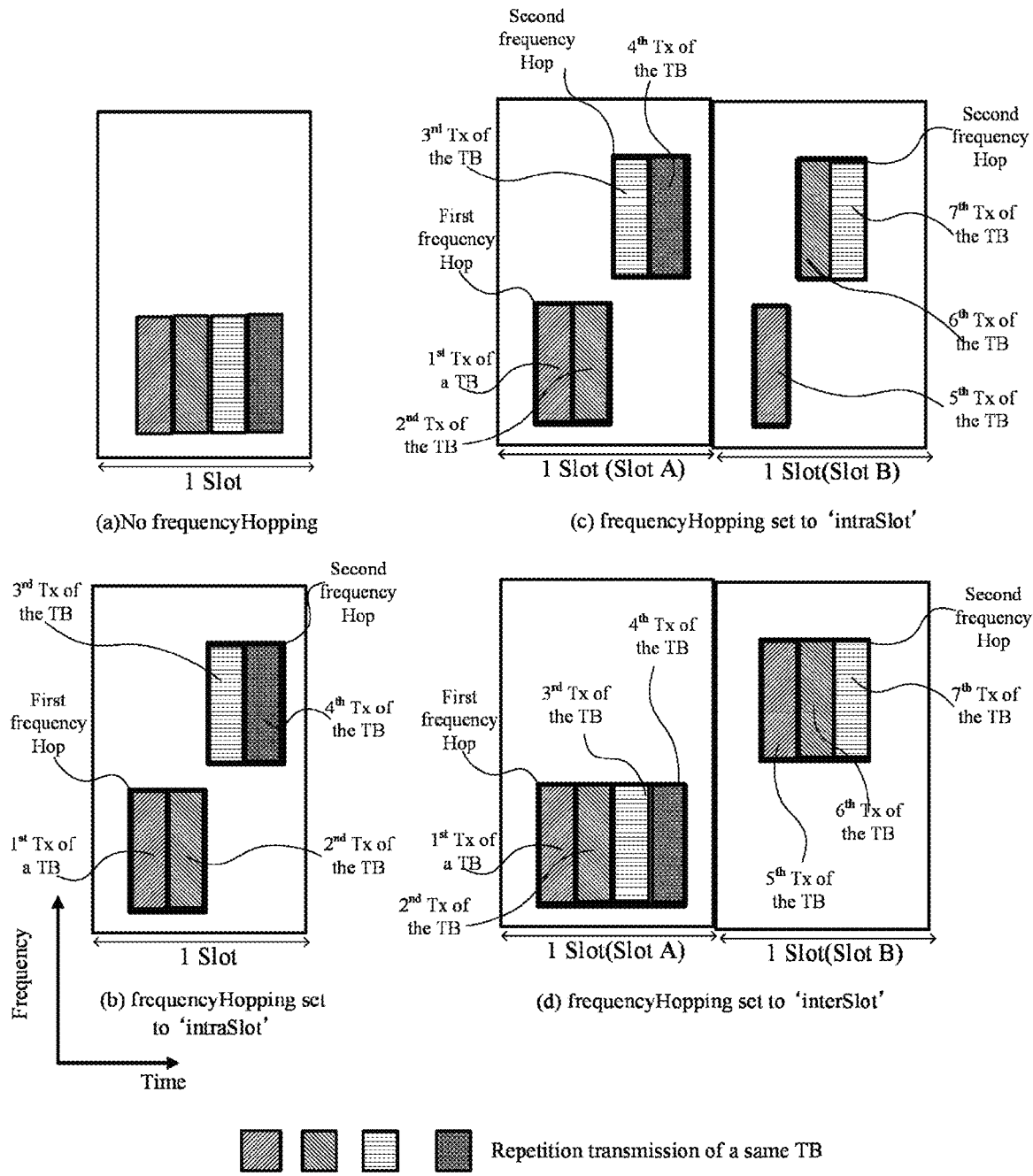
FIG. 9 is a diagram illustrating another example of determination of the number of repetition transmissions and the frequency hopping according to an embodiment of the present invention.

FIG. 9 is a diagram illustrating another example of the determination of the number of repetition transmissions and the frequency hopping according to the present embodiment. FIG. 9(a) is an example of PUSCH transmission without frequency hopping. FIG. 9(b) is an example of PUSCH transmission with intra-slot frequency hopping. FIG. 9(c) is another example of PUSCH transmission with intra-slot frequency hopping. FIG. 9(d) is an example of PUSCH transmission with inter-slot frequency hopping. FIG. 9 may be applied to the slot aggregation transmission. The frequency hopping as illustrated in FIG. 9 may be applied to the mini-slot aggregation transmission. Alternatively, the frequency hopping as illustrated in FIG. 9 may be applied to the mini-slot aggregation transmission in which one slot contains more than one repetition transmission. FIG. 9(a) illustrates a case where the frequency hopping is not configured and where the slot aggregation is not configured or the number of slot aggregation transmissions is one and the number of mini-slot aggregation transmissions is four. In this case, $N_{rep}=4$, $N_{total}=1$, and $N_{slots}=1$.

In a case that frequencyHopping is set to 'intraSlot', the mini-slot aggregation transmission in the slot includes the first frequency hop and second frequency hop in the slot. The number of repetition transmissions included in the first frequency hop may be given by $Floor(N_{rep}/2)$. The number of repetition transmissions included in the second frequency hop may be given by $N_{rep}-Floor(N_{rep}/2)$. $N_{rep}$ is the number of repetition transmissions of the same transport block within the slot. The difference of the resource block $RB_{offset}$ between the starting RB of the first frequency hop and the starting RB of the first frequency hop may be referred to as a resource block frequency offset. In other words, $RB_{offset}$ is the RB frequency offset between two frequency hops. Additionally, $RB_{offset}$ may also be referred to as a frequency offset for the second frequency hop. For example, the starting RB of the first frequency hop is referred to as $_{RBstart}$. The starting RB of the second frequency hop may be given by (Expression 5) $(RB_{start}+RB_{offset})$ mod $N^{size}_{BWP}$. $RB_{start}$ may be given by the frequency resource allocation field. The function (A) mod (B) executes division of A and B, and outputs a number for a remainder resulting from the division. In a case that $N_{rep}$ is 1, the number of frequency hops may be one. In other words, in a case that frequencyHopping is set to 'intraSlot', the terminal apparatus 1 may perform the PUSCH transmission without intra-slot frequency hopping. The starting RB of the PUSCH transmission without intra-slot frequency hopping may be given by (Expression 5) $(RB_{start}+RB_{offset})$ mod $N^{size}_{BWP}$. Additionally, even in a case that $N_{rep}$ is 1, the number of frequency hops may be considered two. In other words, the number of symbols for the first frequency hop may be zero. The number of symbols of the second frequency hop may be $N_{rep}*N^{PUSCH, s}_{symb}$.

In FIG. 9(b), the total number $N_{total}$ of repetition transmissions of the transport block is four. The total number $N_{total}$ of repetition transmissions may be notified by a higher layer parameter and/or a field in the DCI scheduling the transport block transmission. In FIG. 9(b), $N_{total}$ repetition transmissions of the transport block ($N_{total}$ PUSCH transmissions) are performed within one slot. In FIG. 9(b), in one slot, $N_{rep}=4$ PUSCH transmissions may include $N_{rep}=4$ repetition transmissions of the same transport block. The first frequency hop includes the first $(Floor(N_{rep}/2)=2)$ repetition transmissions. The second frequency hop includes $(N_{rep}-Floor(N_{rep}/2)=2)$ repetition transmissions. The first frequency hop includes symbols corresponding to the first two repetition transmissions. The second frequency hop includes symbols corresponding to the last two repetition transmissions. In this case, $N_{rep}=4$, $N_{total}=1$, and $N_{slots}=1$.

In FIG. 9(c), the number $N_{total}$ of repetition transmissions of the transport block is seven. $N_{total}$ may be notified by a higher layer parameter and/or a field in the DCI scheduling the transport block transmission. In FIG. 9(c), $N_{total}$ repetition transmissions of the transport block are performed in two slots. The terminal apparatus 1 may perform intra-slot frequency hopping for each of the slots for the repetition transmission of the transport block. In FIG. 9(c), in the first one slot, the PUSCH transmission may include $N_{rep}=4$ repetition transmissions of the same transport block. The first frequency hop includes the first $(Floor(N_{rep}/2)=2)$ repetition transmissions. The second frequency hop includes $(N_{rep}-Floor(N_{rep}/2)=2)$ repetition transmissions. The first frequency hop includes symbols corresponding to the first two repetition transmissions in the slot. The second frequency hop includes symbols corresponding to the last two repetition transmissions in the slot. In the next slot, the PUSCH transmission may include $N_{rep}=3$ repetition transmissions of the same transport block. The first frequency hop includes the first $(Floor(N_{rep}/2)=1)$ repetition transmissions. The second frequency hop includes $(N_{rep}-Floor(N_{rep}/2)=2)$ repetition transmissions. The first frequency hop includes symbols corresponding to the first repetition transmission in the slot. The second frequency hop includes symbols corresponding to the last two repetition transmissions in the slot. The symbols corresponding to one repetition transmission in a slot A may be the same as or different from the symbols corresponding to one repetition transmission in a slot B. The symbols corresponding to the respective repetition transmissions in the slot A or the slot B may be the same or different from each other. At this time, $N_{rep}=4$ in the slot A, $N_{rep}=3$ in the slot B, $N_{total}=7$, and $N_{slots}=2$.

In FIG. 9(d), the total number $N_{total}$ of repetition transmissions of the transport block is seven. The $N_{total}$ repetition transmissions of the transport block are performed in two slots. The terminal apparatus 1 may perform inter-slot frequency hopping with the transport block repeatedly transmitted. $RB_{offset}$ is an RB frequency offset between two frequency hops. The starting RB of the PUSCH transmitted in a certain slot may be determined based on the number $n^u_s$ of the slot. In a case that $n^u_s$ mod 2 is 0, the starting RB of the PUSCH in the slot is RB start. In a case that $n^u_s$ mod 2 is 1, the starting RB of the PUSCH in the slot may be given by (Expression 5) $(RB_{start}+RB_{offset})$ mod $N^{size}_{BWP}$. $RB_{start}$ may be given by the frequency resource allocation field included in the DCI scheduling the PUSCH. At this time, $N_{rep}=4$ in the slot A, $N_{rep}=3$ in the slot B, $N_{total}=7$, and $N_{slots}=2$.

In FIG. 9(d), for example, in a case that $N_{total}$ notified is 4, the terminal apparatus 1 performs a total number of repetition transmissions within one slot (slot A). In other words, in the slot B, the terminal apparatus 1 need not perform repetition transmissions of the same transport block. In this case, the terminal apparatus 1 may consider that the inter-slot frequency hopping is not applied. In other words, the terminal apparatus 1 may consider that the frequency hopping is not configured, and may perform the PUSCH transmission without frequency hopping. In other words, $RB_{start}$ transmitted within the slot may be given by the frequency resource allocation field included in the DCI rather than based on the slot number. Additionally, in this case, the intra-slot frequency hopping may be considered to be applied, and the intra-slot frequency hopping as illustrated in FIG. 9(b) may be performed. At this time, $N_{rep}=4$ in the slot A, $N_{rep}=0$ in the slot B, $N_{total}=4$, and $N_{slots}=1$.

Another example of the intra-slot frequency hopping according to the present embodiment will be described below.

The terminal apparatus 1 configured with the intra-slot frequency hopping may determine the first frequency hop and the second frequency hop, based on the number of repetition transmissions of the same transport block within one slot.

In a case that one slot contains one repetition transmission of the same transport block, the terminal apparatus 1 may determine the number of symbols for the first frequency hop to be $\text{Floor}(N^{PUSCH, s}_{symb}/2)$ and determine the number of symbols for the second frequency hop to be $N^{PUSCH, s}_{symb}-\text{Floor}(N^{PUSCH, s}_{symb}/2)$. In other words, in a case that one slot contains one repetition transmission of the same transport block, the number of symbols for the first frequency hop may be given by $\text{Floor}(N^{PUSCH, s}_{symb}/)2)$, and the number of symbols for the second frequency hop may be given by $N^{PUSCH, s}_{symb}-\text{Floor}(N^{PUSCH, s}_{symb}/2)$. Here, $N^{PUSCH, s}_{symb}$ may be the length of the PUSCH transmission in OFDM symbols in one slot. The $N^{PUSCH, s}_{symb}$ may be the number of continuous allocated symbols obtained based on the 'Time domain resource assignment' field included in the uplink grant scheduling transmission of the transport block. In other words, $N^{PUSCH, s}_{symb}$ may be the number of symbols corresponding to a single repetition transmission of the transport block within one slot.

Additionally, in a case that one slot contains more than one repetition transmission of the same transport block, the terminal apparatus 1 may determine the number of repetition transmissions included in the first frequency hop to be $\text{Floor}(N_{rep}/2)$ and determine the number of repetition transmissions included in the second frequency hop to be $N_{rep}-\text{Floor}(N_{rep}/2)$. $N_{rep}$ may be the number of repetition transmissions of the same transport block within the slot. In other words, in a case that one slot contains more than one repetition transmission of the same transport block, the number of repetition transmissions included in the first frequency hop may be given by $\text{Floor}(N_{rep}/2)$, and the number of repetition transmissions included in the second frequency hop may be given by $N_{rep}-\text{Floor}(N_{re}p/2)$. The number of symbols for the first frequency hop may indicate symbols corresponding to the repetition transmissions included in the first frequency hop. The number of symbols for the second frequency hop may indicate symbols corresponding to the repetition transmissions included in the second frequency hop. For example, the number of symbols for the first frequency hop may be given by Floor $(N_{rep}/2)$*L. The number of symbols for the second frequency hop may be given by $(N_{rep}-\text{Floor}(N_{rep}/2))$*L. Here, L may be the number of continuous allocated symbols obtained based on the 'Time domain resource assignment' field included in the uplink grant scheduling the repetition transmission of the transport block. In other words, L may be the number of symbols corresponding to one repetition transmission of the transport block within one slot. In other words, L may be $N^{PUSCH, s}_{symb}$ as described above. In other words, in a case that one slot contains one repetition transmission of the same transport block, the slot may contain two frequency hops.

Figure 20:
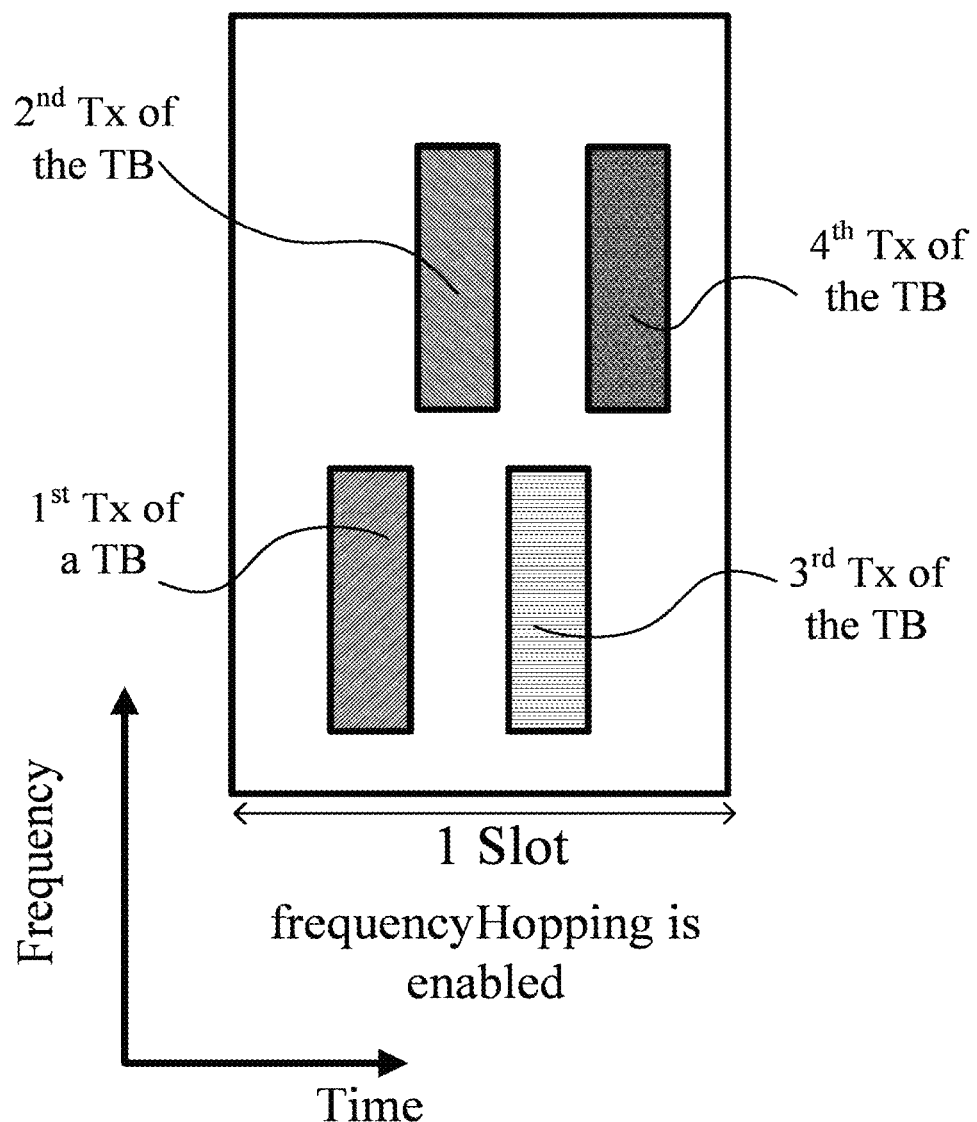
FIG. 20 is a diagram illustrating another example of the number of repetition transmissions and the frequency hopping according to the present embodiment.

Additionally, in a case that one slot contains more than one repetition transmission of the same transport block, the terminal apparatus 1 configured with the intra-slot frequency hopping may determine the number of frequency hops within the slot to be $N_{rep}$. $N_{rep}$ may be the number of repetition transmissions of the same transport block within the slot. In other words, in a case that one slot contains more than one repetition transmission of the same transport block, the number of frequency hops within the slot may be the value of $N_{rep}$. The first frequency hop may correspond to the first repetition transmission of the transport block. The second frequency hop may correspond to the second repetition transmission of the transport block. The ith frequency hop may correspond to the ith repetition transmission of the transport block. The $N_{rep}$th frequency hop may correspond to the Nrepth repetition transmission of the transport block. In other words, i takes a value ranging from 1 to $N_{rep}$. The starting RB of the ((i−1) mod 2=0)th frequency hop may be $RB_{start}$. The starting RB of the ((i−1) mod 2=1)th frequency hop may be given by (Expression 5) $(RB_{start}+RB_{offset})$ mod $N^{size}_{BWP}$. As described above, RB start may be given by a frequency resource allocation field included in the DCI for scheduling the PUSCH. $RB_{offset}$ is the RB frequency offset between two frequency hops indicated by the higher layer parameter. In other words, $RB_{offset}$ is the RB frequency offset between the first frequency hop and the second frequency hop. Specifically, $RB_{offset}$ is the RB frequency offset between the ith frequency hop and the (i+1)th frequency hop. FIG. 20 is a diagram illustrating another example of the number of repetition transmissions and the frequency hopping according to the present embodiment. The frequency hopping as illustrated in FIG. 20 may be applied to the mini-slot aggregation transmission. FIG. 20 is an example of PUSCH transmission to which the intra-slot mini-slot transmission with intra-slot frequency hopping is applied. Alternatively, the frequency hopping as shown in FIG. 20 may be applied to the mini-slot aggregation transmission with more than one repetition transmission within one slot.

In FIG. 20, $N_{total}=4$, $N_{rep}=4$, and $N_{slots}=1$. In FIG. 20, the terminal apparatus 1 may perform intra-slot frequency hopping with repetition transmissions of the transport block. The first frequency hop may correspond to the first repetition transmission of the transport block. The second frequency hop may correspond to the second repetition transmission of the transport block. The third frequency hop may correspond to the third repetition transmission of the transport block. The fourth frequency hop may correspond to the fourth repetition transmission of the transport block. The starting RBs of the first frequency hop and the third frequency hop may be RB start. The starting RBs of the second and fourth frequency hops may be given by (Expression 5) as described above.

FIG. 18 is a diagram illustrating another example of the determination of the number of repetition transmissions and the frequency hopping according to the present embodiment. FIG. 18 assumes $N_{total}=2$. FIG. 18(a) illustrates an example of the PUSCH transmission to which the intra-slot mini-slot transmission is applied without frequency hopping. FIG. 18(b) illustrates an example of the PUSCH transmission to which the inter-slot mini-slot transmission is applied without frequency hopping. FIG. 18(c) is an example of the PUSCH transmission to which the intra-slot mini slot transmission with intra-slot frequency hopping is applied. FIG. 18(d) is an example of the PUSCH transmission to which the inter-slot mini-slot transmission with inter-slot frequency hopping is applied. FIG. 18 may be applied in a case that the second aggregation transmission is configured. The frequency hopping as illustrated in FIG. 18 may be applied to the mini-slot aggregation transmission. Alternatively, the frequency hopping as illustrated in FIG. 18 may be applied to the mini-slot aggregation transmission with more than one repetition transmission within one slot.

In FIG. 18(a), $N_{rep}=2$, $N_{total}=2$, $N_{slots}=1$. For example, the terminal apparatus 1 may receive $N_{total}$ by a higher layer parameter and/or a field in the DCI scheduling the transport block transmission. The terminal apparatus 1 may receive $N_{rep}$ by a higher layer parameter and/or a field in the DCI scheduling the transport block transmission. The start symbol S of the first PUSCH is given based on the PDCCH transmitted from the base station apparatus 3 to the terminal apparatus 1. The number L of continuous allocated symbols for the first PUSCH is given based on the PDCCH transmitted from the base station apparatus 3 to the terminal apparatus 1. The start symbol S for the second PUSCH may be the first available symbol after the first PUSCH. The start symbol S for the second PUSCH may be the first symbol continuous with the first PUSCH. The number L of continuous allocated symbols for the second PUSCH is given based on the PDCCH transmitted from the base station apparatus 3 to the terminal apparatus 1. However, the continuous allocated symbols for the second PUSCH are symbols from the start symbol S of the second PUSCH to the last symbol of the slot and do not span the next slot. Thus, in a case that L symbols from the start symbol S of the second PUSCH exceed the last symbol number of the slot, L is the number of symbols from the start symbol S of the second PUSCH to the last symbol number of the slot. In other words, the terminal apparatus 1 and the base station apparatus 3 may determine the number L of symbols for the second PUSCH, based on one, multiple, or all of the start symbol S given based on the PDCCH, the number L of symbols given based on the PDCCH, and the number of symbols in the slot. In other words, it can be said that the mini-slot aggregation, the start symbol expansion, and the symbol number expansion are applied to the second PUSCH. The terminal apparatus 1 and the base station apparatus 3 may determine that $N_{slots}=1$ based on one, multiple, or all of $N_{rep}$, $N_{total}$, the start symbol S given based on the PDCCH, the number L of symbols given based on the PDCCH, and the number of symbols in the slot. Alternatively, the terminal apparatus 1 may receive, from the base station apparatus 3, information indicating that $N_{slots}=1$. In FIG. 18(b), $N_{rep}=1$ in the slot A, $N_{rep}=1$ in the slot B, $N_{total}=2$, and $N_{slots}=2$. For example, the terminal apparatus 1 may receive $N_{total}$ by a higher layer parameter and/or a field in the DCI scheduling the transport block transmission. The terminal apparatus 1 may receive $N_{rep}$ by a higher layer parameter and/or a field in the DCI scheduling the transport block transmission. The start symbol S of the first PUSCH is given based on the PDCCH transmitted from the base station apparatus 3 to the terminal apparatus 1. The number L of continuous allocated symbols for the first PUSCH is given based on the PDCCH transmitted from the base station apparatus 3 to the terminal apparatus 1. However, the continuous allocated symbols for the first PUSCH are symbols from the start symbol S of the first PUSCH to the last symbol of the slot given based on the PDCCH, and do not span the next slot. Thus, in a case that L symbols from the start symbol S of the first PUSCH exceed the last symbol number of the slot, L is the number of symbols from the start symbol S of the first PUSCH to the last symbol number of the slot. In other words, the terminal apparatus 1 and the base station apparatus 3 may determine the number L of symbols for the first PUSCH based on one, multiple, or all of the start symbol S given based on the PDCCH, the number L of symbols given based on the PDCCH, and the number of symbols in the slot. In a case that the mini-slot aggregation is not applied, the base station apparatus need not execute special processing as long as the base station apparatus reports the number L of symbols with such a value as not to span the next slot. However, in a case of FIG. 18(b), L given based on the PDCCH may be a value obtained in consideration of two slots, and thus the processing as described above is effective. The start symbol S of the second PUSCH may be the first available symbol of the slot B. The start symbol S of the second PUSCH may be the first symbol continuous with the first PUSCH. The number L of continuous allocated symbols for the second PUSCH is given based on the PDCCH transmitted from the base station apparatus 3 to the terminal apparatus 1. However, the continuous allocated symbols for the second PUSCH may correspond to the number of symbols left after some of the symbols are used for the first PUSCH transmission. In other words, L given based on the PDCCH minus the number L of symbols for the first PUSCH may be the number L of symbols for the second PUSCH. In other words, the terminal apparatus 1 and the base station apparatus 3 may determine the number L of symbols for the second PUSCH, based on one, multiple, or all of the start symbol S given based on the PDCCH, the number L of symbols given based on the PDCCH, the number of symbols in the slot, and the number of symbols used for the first PUSCH. In other words, it can be said that the start symbol expansion and the symbol number expansion are applied to the second PUSCH. The terminal apparatus 1 and the base station apparatus 3 may determine that $N_{slots}=2$ based on one, multiple, or all of $N_{rep}$, $N_{total}$, the start symbol S given based on the PDCCH, the number L of symbols based on the PDCCH, and the number of symbols in the slot. Alternatively, the terminal apparatus 1 may receive, from the base station apparatus 3, information indicating that $N_{slots}=2$.

In FIG. 18(b), $N_{rep}=1$ in the slot A, and $N_{rep}=1$ in the slot B, and thus FIG. 18(b) may be considered to illustrate slot aggregation. In other words, FIG. 18(b) may illustrate symbol allocation expansion (start symbol expansion and/or symbol number expansion) in the second aggregation.

Compared to FIG. 18(a), FIG. 18(c) illustrates application of the intra-slot frequency hopping. $N_{rep}=2$, $N_{total}=2$, and $N_{slots}=1$, and thus the first frequency hop includes the first (Floor($N_{rep}$/2)=1) repetition transmissions. The second frequency hop includes ($N_{rep}$−Floor($N_{rep}$/2)=1) repetition transmissions.

Compared to FIG. 18(b), FIG. 18(d) illustrates application of the inter-slot frequency hopping. The terminal apparatus 1 and the base station apparatus 3 may determine, based on $N_{slots}$, whether to apply the inter-slot frequency hopping or to apply the intra-slot frequency hopping. For example, for $N_{slot}=1$, the intra-slot frequency hopping is applied, and for $N_{slots}=2$, the intra-slot frequency hopping is applied.

Figure 19:
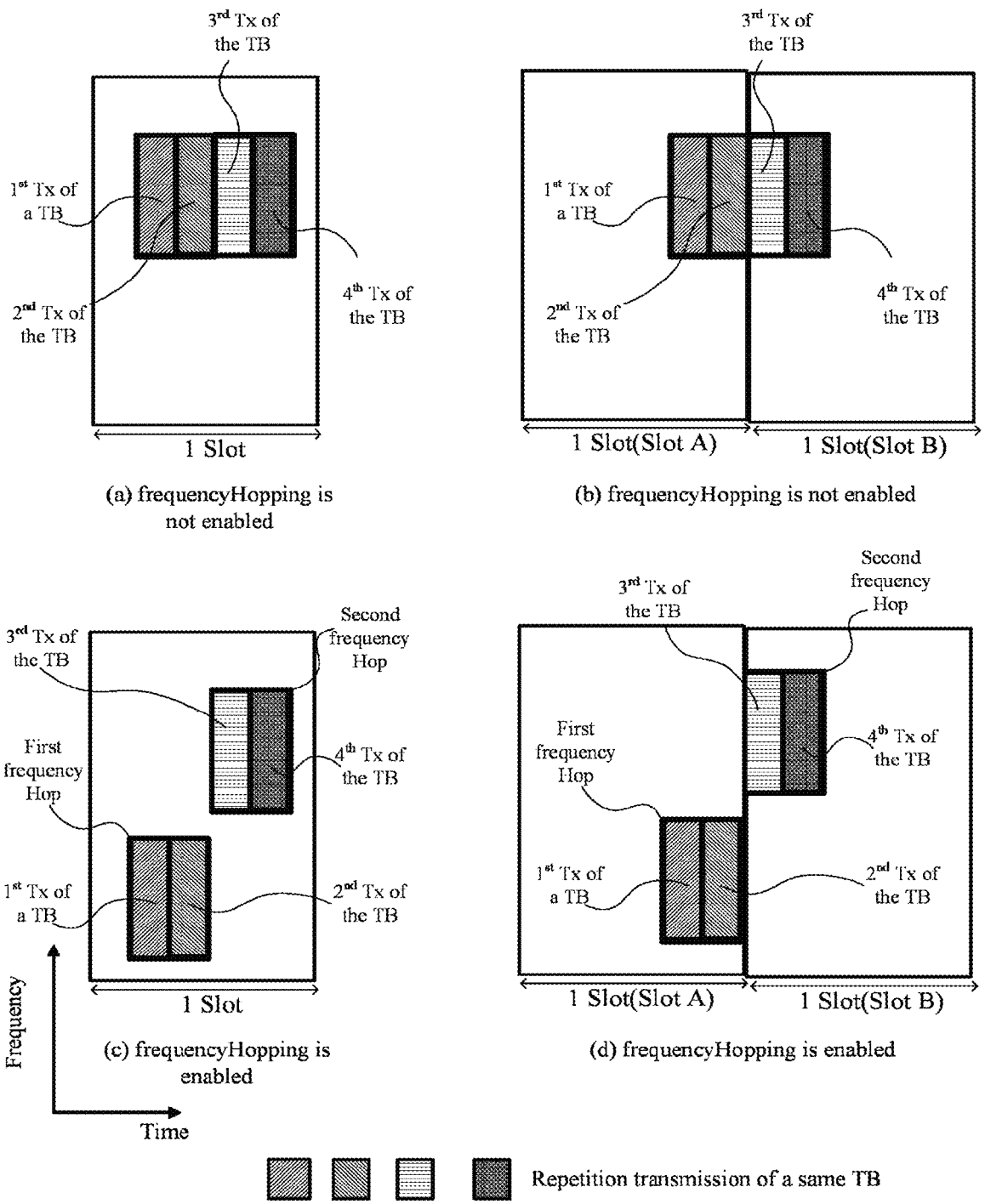
FIG. 19 is a diagram illustrating another example of the determination of the number of repetition transmissions and the frequency hopping according to an embodiment of the present invention.

FIG. 19 is a diagram illustrating another example of the determination of the number of repetition transmissions and the frequency hopping according to the present embodiment. FIG. 19 assumes $N_{total}=4$. FIG. 19(a) is an example of the PUSCH transmission to which the intra-slot mini-slot transmission is applied without frequency hopping. FIG. 19(b) is an example of the PUSCH transmission to which the inter-slot mini-slot transmission is applied without frequency hopping. FIG. 19(c) is an example of the PUSCH transmission to which the intra-slot mini-slot transmission with intra-slot frequency hopping is applied. FIG. 19(d) is an example of the PUSCH transmission to which the inter-slot mini-slot transmission with inter-slot frequency hopping is applied. FIG. 19 may be applied in a case that the second aggregation transmission is configured. The frequency hopping as illustrated in FIG. 19 may be applied to the mini-slot aggregation transmission. Alternatively, the frequency hopping as illustrated in FIG. 19 may be applied to the mini-slot aggregation transmission with more than one repetition transmission within one slot.

In FIG. 19(a), $N_{rep}$=4, $N_{total}$=4, and $N_{slots}$=1. For example, the terminal apparatus 1 may receive $N_{total}$ by a higher layer parameter and/or a field in the DCI scheduling the transport block transmission. The terminal apparatus 1 may receive $N_{rep}$ by a higher layer parameter and/or a field in the DCI scheduling the transport block transmission. The start symbol S of the first PUSCH is given based on the PDCCH transmitted from the base station apparatus 3 to the terminal apparatus 1. The number L of continuous allocated symbols for the first PUSCH is given based on the PDCCH transmitted from the base station apparatus 3 to the terminal apparatus 1. The start symbol S of the second PUSCH may be the first available symbol after the first PUSCH. The start symbol S of the second PUSCH may be the first symbol continuous with the first PUSCH. The number L of continuous allocated symbols for the second PUSCH is given based on the PDCCH transmitted from the base station apparatus 3 to the terminal apparatus 1. Similarly, the start symbol S of the Xth PUSCH may be the first available symbol after the X−1th PUSCH. The start symbol S of the Xth PUSCH may be the first symbol continuous with the X−1th PUSCH. The number L of continuous allocated symbols for the Xth PUSCH is given based on the PDCCH transmitted from the base station apparatus 3 to the terminal apparatus 1.

However, the continuous allocated symbols for the Xth PUSCH are symbols from the start symbol S of the Xth PUSCH to the last symbol of the slot, and do not span the next slot. Thus, in a case that L symbols from the start symbol S of the Xth PUSCH exceed the last symbol number of the slot, L is the number of symbols from the start symbol S of the second PUSCH to the last symbol number of the slot. Additionally, the X+1th PUSCH transmission is performed in the next slot. Alternatively, the X+1th PUSCH transmission is not performed in the next slot. Whether the X+1th PUSCH transmission is performed may be determined based on $N_{slots}$. For example, for $N_{slots}$=1, the X+1th PUSCH transmission is not performed. For $N_{slots}$=2, the X+1th PUSCH is performed in the next slot. Alternatively, whether the X+1th PUSCH transmission is performed may be determined based on $N_{rep}$. In other words, $N_{rep}$+1th PUSCH transmission is not performed. Alternatively, whether the X+1th PUSCH transmission is performed may be determined based on $N_{total}$. In other words, $N_{total}$+1th PUSCH transmission is not performed. In other words, the terminal apparatus 1 and the base station apparatus 3 may determine the number L of symbols for the Xth PUSCH, based on one, multiple, or all of the start symbol S given based on the PDCCH, the number L of symbols given based on the PDCCH, the number of symbols in the slot, $N_{total}$, $N_{rep}$, and $N_{slots}$. Additionally, whether the X+1th PUSCH transmission is performed may be determined based on one, multiple, or all of $N_{total}$, $N_{rep}$, and $N_{slots}$. In other words, it can be said that the mini-slot aggregation, the start symbol expansion, and the symbol number expansion are applied to the PUSCH transmission in FIG. 19(a). The terminal apparatus 1 and the base station apparatus 3 may determine that $N_{slots}$=1 based on one, multiple, or all of $N_{rep}$, $N_{total}$, the start symbol S given based on the PDCCH, the number L of symbols given based on the PDCCH, and the number of symbols in the slot. Alternatively, the terminal apparatus 1 may receive, from the base station apparatus 3, information indicating that $N_{slots}$=1.

In FIG. 19(a), the start symbol S of the first transmission occasion is given based on the PDCCH transmitted from the base station apparatus 3 to the terminal apparatus 1. The number L of continuous allocated symbols on the first transmission occasion is given based on the PDCCH transmitted from the base station apparatus 3 to the terminal apparatus 1. In other words, the first transmission occasion is used for transmission of the first PUSCH. The terminal apparatus 1 may transmit the first PUSCH to the base station apparatus 3 on the first transmission occasion. The first PUSCH corresponds to the first repetition transmission of the transport block. One transmission of the PUSCH may increment the number of repetition transmissions of the transport block by one. In other words, the Xth PUSCH corresponds to the Xth repetition transmission of the repetition transmissions of the transport block. The start symbol S of the second transmission occasion may be the first available symbol after the first transmission occasion. The start symbol S of the second transmission occasion may be the first symbol continuous with the first transmission occasion. The start symbol S of the second transmission occasion may be the first available symbol after the PUSCH transmitted at the nearest time. The start symbol S of the second transmission occasion may be the first symbol continuous with the PUSCH transmitted at the nearest time. On the second transmission occasion, the first PUSCH is the PUSCH transmitted at the nearest time. The number L of continuous allocated symbols for the second transmission occasion is given based on the PDCCH transmitted from the base station apparatus 3 to the terminal apparatus 1. The second PUSCH transmitted on the second transmission occasion corresponds to the second repetition transmission of the transport block.

Similarly, the start symbol S of the Xth transmission occasion may be the first available symbol after the X−1th transmission occasion. The start symbol S of the Xth transmission occasion may be the first symbol continuous with the X−1th transmission occasion. The start symbol S of the Xth transmission occasion may be the first available symbol after the PUSCH transmitted at the nearest time. The start symbol S of the Xth transmission occasion may be the first symbol continuous with the PUSCH transmitted at the nearest time. The number L of continuous allocated symbols for the Xth transmission occasion is given based on the PDCCH transmitted from the base station apparatus 3 to the terminal apparatus 1. The symbols for the Xth transmission occasion may be available symbols. In addition, some or all of the symbols for the Xth transmission occasion may be unavailable symbols. In other words, not all of the symbols included in the transmission occasion can be used for transmission of the PUSCH. At this time, in a case that the number (maximum number) of continuous available symbols on the transmission occasion is equal to or greater than a first value, the terminal apparatus 1 may transmit the PUSCH to the base station apparatus 3 by using the continuous available symbols. In a case that the number (maximum number) of continuous available symbols on the transmission occasion is less than the first value, the terminal apparatus 1 need not transmit the PUSCH to the base station apparatus 3 on the transmission occasion. In this case, the first value may be indicated by a higher layer parameter. The first value may be determined based at least on the symbol L given based on the PDCCH. For example, the first value may be given by ceiling (L*F). F may be a value less than 1. Additionally, the first value may be given by (L−T). T may be equal to or greater than 1. The value of F or T may be indicated by a higher layer parameters. The value of F or T may correspond to different values of L.

However, the continuous allocated symbols for the Xth transmission occasion are symbols from the start symbol S of the Xth transmission occasion to the last symbol of the slot, and do not span the next slot.

Thus, L symbols from the start symbol S of the Xth transmission occasion corresponds to the number of symbols up to last symbol number of the slot.

Additionally, the X+1th transmission occasion may be in the next slot.

In this case, the start symbol S of the X+1th transmission occasion may be the first available symbol of the slot.

The start symbol S of the X+1th transmission occasion may be the first symbol of the slot.

The number L of continuous allocated symbols for the X+1th transmission occasion is given based on the PDCCH transmitted from the base station apparatus 3 to the terminal apparatus 1.

The method for determining the start symbol of each PUSCH and the number of symbols for the PUSCH as described above may also be used for the slot aggregation.

Figure 21:
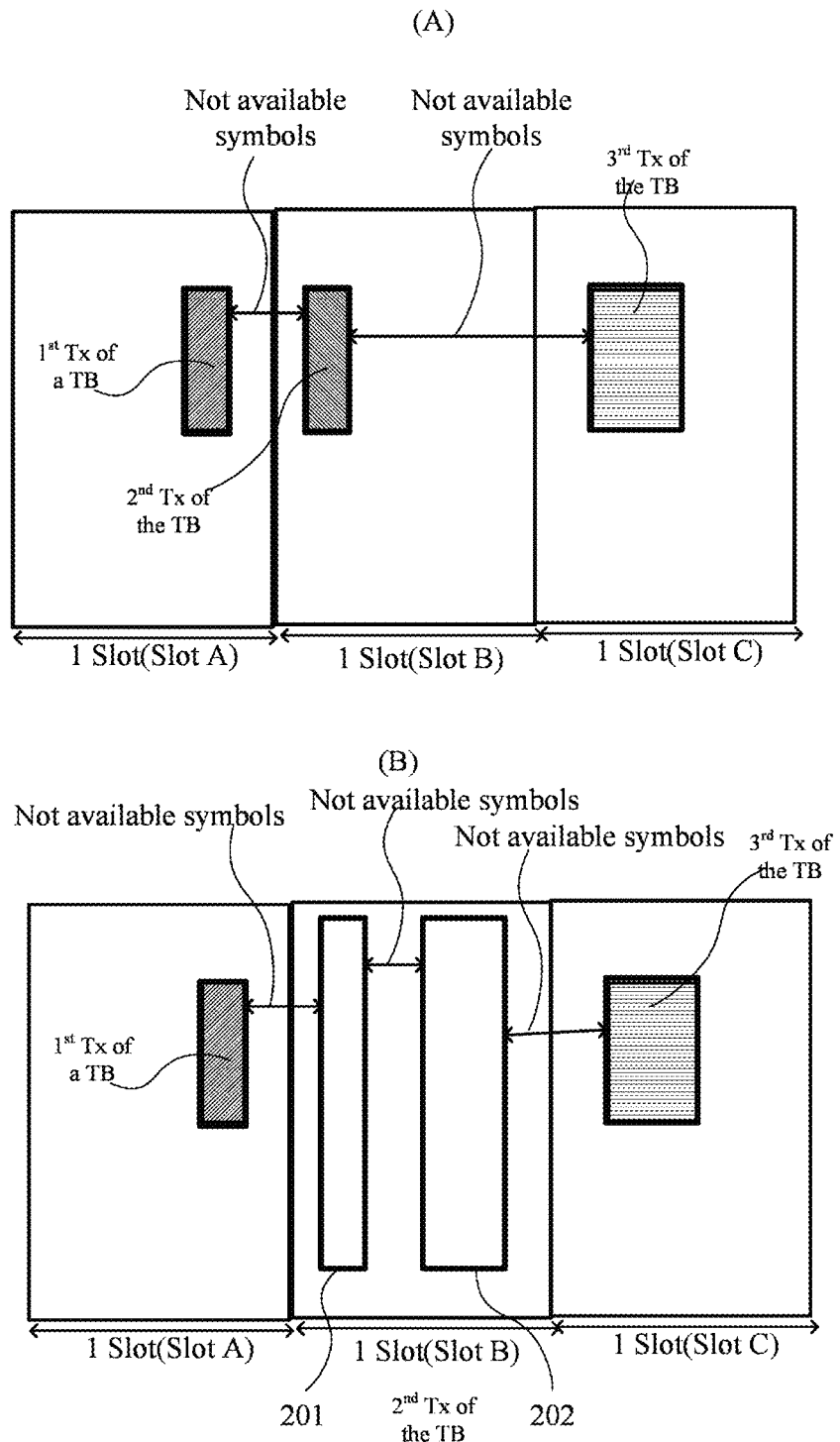
FIG. 21 is a diagram illustrating an example of slot aggregation transmission according to an embodiment of the present invention.

FIG. 21 is a diagram illustrating an example of the slot aggregation transmission (second aggregation transmission) according to the present embodiment.

For example, FIG. 21(A) illustrates a case that $N_{rep}=1$, $N_{total}=3$, and $N_{slot}=3$.

The start symbol S of the first transmission occasion is given based on the PDCCH transmitted from the base station apparatus 3 to the terminal apparatus 1.

The number L of continuous allocated symbols for the first transmission occasion (slot) is given based on the PDCCH transmitted from the base station apparatus 3 to the terminal apparatus 1.

In other words, the first transmission occasion (slot) is used for transmission of the first PUSCH.

The terminal apparatus 1 may transmit the first PUSCH to the base station apparatus 3 on the first transmission occasion (slot).

The first PUSCH corresponds to the first repetition transmission of the transport block.

One transmission of the PUSCH may increment the number of repetition transmissions of the transport block by one.

In other words, the Xth PUSCH corresponds to the Xth repetition transmission of the transport block.

The start symbol S of the second transmission occasion (slot) may be the first available symbol of the slot next to the first transmission occasion (slot).

The number L of continuous allocated symbols for the second transmission occasion (slot) is given based on the PDCCH transmitted from the base station apparatus 3 to the terminal apparatus 1.

The second PUSCH transmitted on the second transmission occasion corresponds to the second repetition transmission of the transport block.

Similarly, the start symbol S of the Xth transmission occasion (slot) may be the first available symbol of the slot next to the X-1th transmission occasion (slot).

The number L of continuous allocated symbols for the Xth transmission occasion (slot) is given based on the PDCCH transmitted from the base station apparatus 3 to the terminal apparatus 1.

The symbols for the Xth transmission occasion (slot) may be available symbols.

Furthermore, some or all of the symbols for the Xth transmission occasion (slot) may be unavailable symbols.

In other words, not all of the symbols included in the transmission occasion (slot) can be used for transmission of the PUSCH.

At this time, in a case that the number (maximum number) of continuous available symbols on the transmission occasion (slot) is equal to or greater than a first value, the terminal apparatus 1 may transmit the PUSCH to the base station apparatus 3 by using the continuous available symbols.

In a case that the number (maximum number) of continuous available symbols on the transmission occasion (slot) is less than the first value, the terminal apparatus 1 need not transmit the PUSCH to the base station apparatus 3 on the transmission occasion (slot).

In this case, the first value may be indicated by a higher layer parameter.

The first value may be determined based at least on the symbol L given based on the PDCCH.

For example, the first value may be given by ceiling (L*F).

F may be a value less than 1.

Additionally, the first value may be given by (L-T).

T may be equal to or greater than 1.

The value of F or T may be indicated by a higher layer parameters.

The value of F or T may correspond to each of different values of L.

Additionally, the slot in which the slot aggregation transmission is performed may include a burst of two or more available symbols.

For example, in FIG. 21(B), the slot B has a burst 201 of available symbols and a burst 202 of available symbols.

Each burst of available symbols includes continuous available symbols in the slot.

Unavailable symbols are present between the bursts 201 and 202.

The terminal apparatus 1 may transmit the PUSCH (second) to the base station apparatus 3 in the slot B by using one of the burst 201 and burst 202.

The number of symbols included in the burst 202 is greater than the number of symbols included in the burst 201.

The terminal apparatus 1 may transmit the PUSCH to the base station apparatus 3 by using one of the multiple bursts that has the maximum length (the maximum number of available symbols).

In other words, the terminal apparatus 1 may transmit the PUSCH to the base station apparatus 3 in the burst 202.

Additionally, the terminal apparatus 1 may transmit the PUSCH to the base station apparatus 3 by using the earliest one of the multiple bursts.

In other words, the terminal apparatus 1 may transmit the PUSCH to the base station apparatus 3 in the burst 201.

Additionally, the terminal apparatus 1 may transmit the PUSCH to the base station apparatus 3 by using the earliest one of the multiple bursts of the same length.

In other words, in a case that the same number of symbols are included in the burst 201 and in the burst 202, the terminal apparatus 1 may transmit the PUSCH to the base station apparatus 3 in the burst 201.

In addition, the terminal apparatus 1 may transmit the PUSCH to the base station apparatus 3 by using the earliest one of the multiple bursts that is equal to or greater than the first value, as described above.

In other words, the start symbol S of the PUSCH transmitted in the slot B may be the first symbol (the first available symbol) of the burst to be used for transmission.

The number of continuous allocated symbols for the PUSCH transmitted in the slot B may be the number L of continuous allocated symbols given based on the PDCCH transmitted from the base station apparatus 3 to the terminal apparatus 1.

Thus, in a case that L symbols from the first symbol of the burst used for transmission exceeds the last symbol number of the burst, L is the number of symbols from the first symbol of the burst used for transmission to the last symbol number of the burst.

Alternatively, the number of continuous allocated symbols of the PUSCH transmitted in the slot B may be the length of the burst used for transmission.

In other words, the number of continuous allocated symbols of the PUSCH transmitted in the slot B corresponds to symbols from the first symbol in the burst used for transmission to the last symbol in the burst, and the symbols do not span beyond the burst.

The terminal apparatus 1 and the base station apparatus 3 may determine the number L of symbols for the transmitted PUSCH, based on one, multiple, or all of the start symbol S given based on the PDCCH, the number L of symbols given based on the PDCCH, the number of symbols in the slot, the number of bursts, the number of symbols in the burst, $N_{total}$, $N_{rep}$, and $N_{slots}$.

This method may be generalized and used for the slot A, the slot B, and/or a slot C.

In FIG. 19 (b), $N_{rep}=2$ in the slot A, $N_{rep}=2$ in the slot B, and $N_{total}=4$, and $N_{slots}=2$.

As is the case with FIG. 19 (a), the terminal apparatus 1 and the base station apparatus 3 may determine the number L of symbols for the Xth PUSCH, based on one, multiple, or all of the start symbol S given based on the PDCCH, the number L of symbols given based on the PDCCH, the number of symbols in the slot, $N_{total}$, $N_{rep}$, and $N_{slots}$.

Additionally, whether the X+1th PUSCH transmission is performed may be determined based on one, multiple, or all of $N_{total}$, $N_{rep}$, and $N_{slots}$.

Compared to FIG. 19 (a), FIG. 19 (c) illustrates application of the intra-slot frequency hopping.

$N_{rep}=4$, $N_{total}=4$, and $N_{slots}=1$, and thus the first frequency hop includes the first (Floor ($N_{rep}/2$)=2) repetition transmissions.

The second frequency hop includes ($N_{rep}$−Floor ($N_{rep}/2$) =2) repetition transmissions.

Compared to FIG. 19 (b), FIG. 19 (d) illustrates application of the inter-slot frequency hopping.

The terminal apparatus 1 and the base station apparatus 3 may determine, based on $N_{slots}$, whether to apply the inter-slot frequency hopping or to apply the intra-slot frequency hopping.

For example, for $N_{slot}=1$, the intra-slot frequency hopping is applied, and for $N_{slots}=2$, the intra-slot frequency hopping is applied.

In the present embodiment, in the formula related to the intra-slot frequency hopping, the ceiling function may be utilized instead of the Floor function. As an example, for Expression Floor($N_{rep}/2$), the ceiling function may be utilized instead of the Floor function to change Floor($N_{rep}/2$) to ceiling ($N_{rep}/2$).

In the uplink transmission of the present embodiment, the available symbols may be symbols indicated as flexible and/or uplink by at least a higher layer parameter TDD-UL-DL-ConfigurationCommon and/or TDD-UL-DL-ConfigDedicated.

In other words, the available symbols are not symbols indicated as downlink by the higher layer parameter TDD-UL-DL-ConfigurationCommon and/or TDD-UL-DL-ConfigDedicated.

The higher layer parameter TDD-UL-DL-Configuration-Common and/or TDD-UL-DL-ConfigDedicated is used to determine an uplink/downlink TDD configuration.

However, the available symbols are not symbols indicated by at least a higher layer parameter ssb-PositionsInBurst.

ssb-PositionsInBurst is used to indicate the time domain position of the SS/PBCH block transmitted to the base station apparatus 3.

In other words, the terminal apparatus 1 recognizes the position of the symbol in which the SS/PBCH block is transmitted by ssb-PositionsInBurst.

The symbol in which the SS/PBCH block is transmitted may be referred to as an SS/PBCH block symbol.

In other words, the available symbols are not SS/PBCH block symbols.

However, the available symbols are at least not symbols indicated by pdcch-ConfigSIB1.

In other words, the available symbols are not symbols indicated by pdcch-ConfigSIB1 for the CORESET for the Type0-PDCCH common search space set.

pdcch-ConfigSIB1 may be included in the MIB or ServingCellConfigCommon.

Thus, the terminal apparatus 1 can transmit uplink data to the base station apparatus 3.

Configurations of apparatuses according to the present embodiment will be described below.

Figure 22:
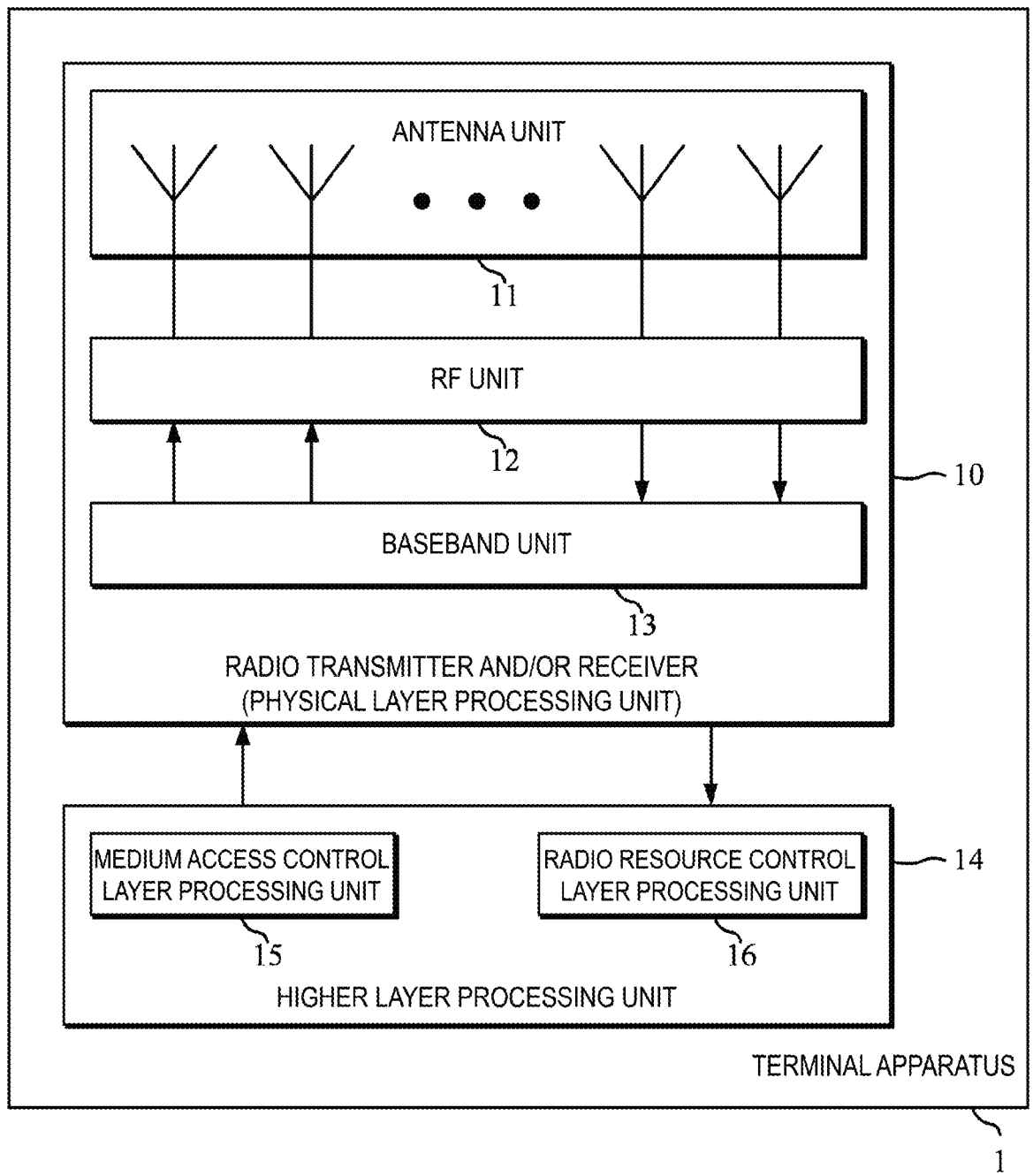
FIG. 22 is a schematic block diagram illustrating a configuration of a terminal apparatus 1 according to an embodiment of the present invention.

FIG. 22 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a monitor unit, or a physical layer processing unit. The higher layer processing unit 14 is also referred to as a measurement unit, a selection unit, or a control unit 14.

The higher layer processing unit 14 outputs uplink data (that may be referred to as transport block) generated by a user operation or the like, to the radio transmission and/or reception unit 10. The higher layer processing unit 14 performs a part or all of the processing of the Medium Access Control (MAC) layer, the Packet Data Convergence Protocol (PDCP) layer, the Radio Link Control (RLC) layer, and the Radio Resource Control (RRC) layer. The higher layer processing unit 14 functions to determine whether to repeatedly transmit the transport block, based on higher layer signaling received from the base station apparatus 3. The higher layer processing unit 14 determines, based on the higher layer signaling received from the base station apparatus 3, whether to perform the first aggregation transmission and/or the second aggregation transmission. The higher layer processing unit 14 functions to control the symbol allocation expansion (start symbol expansion and/or symbol number expansion), the number of dynamic repetitions, and/or the mini-slot aggregation transmission for the aggregation transmission (the second aggregation transmission), based on the higher layer signaling received from the base station apparatus 3. The higher layer processing unit 14 determines whether to perform the frequency hopping transmission of the transport block, based on the higher layer signaling received from the base station apparatus 3. The higher layer processing unit 14 functions to control the configuration of the first frequency hop and the second frequency hop, based on the number of repetition transmissions of the same transport block within one slot. The higher layer processing unit 14 outputs frequency hopping information, aggregation transmission information, and the like to the radio transmission and/or reception unit 10.

The higher layer processing unit 14 functions to control the second number, based on the higher layer signaling including the first number of repetition transmissions and/or the DCI field including the first number. The first number may be the number of repetition transmissions of the same transport block within a slot and across slots. The second number may be the number of repetition transmissions of the same transport block within a slot.

The medium access control layer processing unit 15 included in the higher layer processing unit 14 performs processing of the Medium Access Control layer (MAC layer). The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer (RRC layer). The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. In other words, the radio resource control layer processing unit 16 sets the various configuration information/parameters based on the information indicating the various configuration information/parameters received from the base station apparatus 3. The radio resource control layer processing unit 16 controls (identifies) the resource allocation, based on the downlink control information received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3. The radio transmission and/or reception unit 10 outputs, to the higher layer processing unit 14, the higher layer signaling (RRC message), DCI, and the like received from the base station apparatus 3. Additionally, the radio transmission and/or reception unit 10 generates and transmits an uplink signal, based on an indication from the higher layer processing unit 14. The radio transmission and/or reception unit 10 can repeatedly transmit the transport block to the base station apparatus 3, based on an indication from the higher layer processing unit 14. In a case that the repetition transmission of the transport block is configured, the radio transmission and/or reception unit 10 repeatedly transmits the same transport block. The number of repetition transmissions is given based on an indication from the higher layer processing unit 14. The radio transmission and/or reception unit 10 transmits the PUSCH in the aggregation transmission, based on information related to the first number of repetitions, the first number, and the second number which are indicated by the higher layer processing unit 14. The radio transmission and/or reception unit 10 can control the aggregation transmission, based on prescribed conditions. Specifically, the radio transmission and/or reception unit 10 functions, in a case of satisfying a first condition, to apply the same symbol allocation to each slot and repeatedly transmit the transport block N times in continuous N slots in a case that the second aggregation transmission parameter is configured and to transmit the transport block once in a case that the second aggregation transmission parameter is not configured. Here, the value of N is indicated in the second aggregation transmission parameter. Additionally, the radio transmission and/or reception unit 10 functions, in a case of satisfying a second condition, to apply the mini-slot aggregation transmission and transmit the transport block. The first condition at least includes the DCI received from the base station apparatus 3 and indicating the PUSCH mapping type as the type A. The second condition at least includes the DCI received from the base station apparatus 3 and indicating the PUSCH mapping type as the type B.

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 generates an OFDM symbol by performing Inverse Fast Fourier Transform (IFFT) on the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. Also, the RF unit 12 amplifies power. Additionally, the RF unit 12 may function to determine transmit power for an uplink signal and/or an uplink channel transmitted in the serving cell. The RF unit 12 is also referred to as a transmit power controller.

Figure 23:
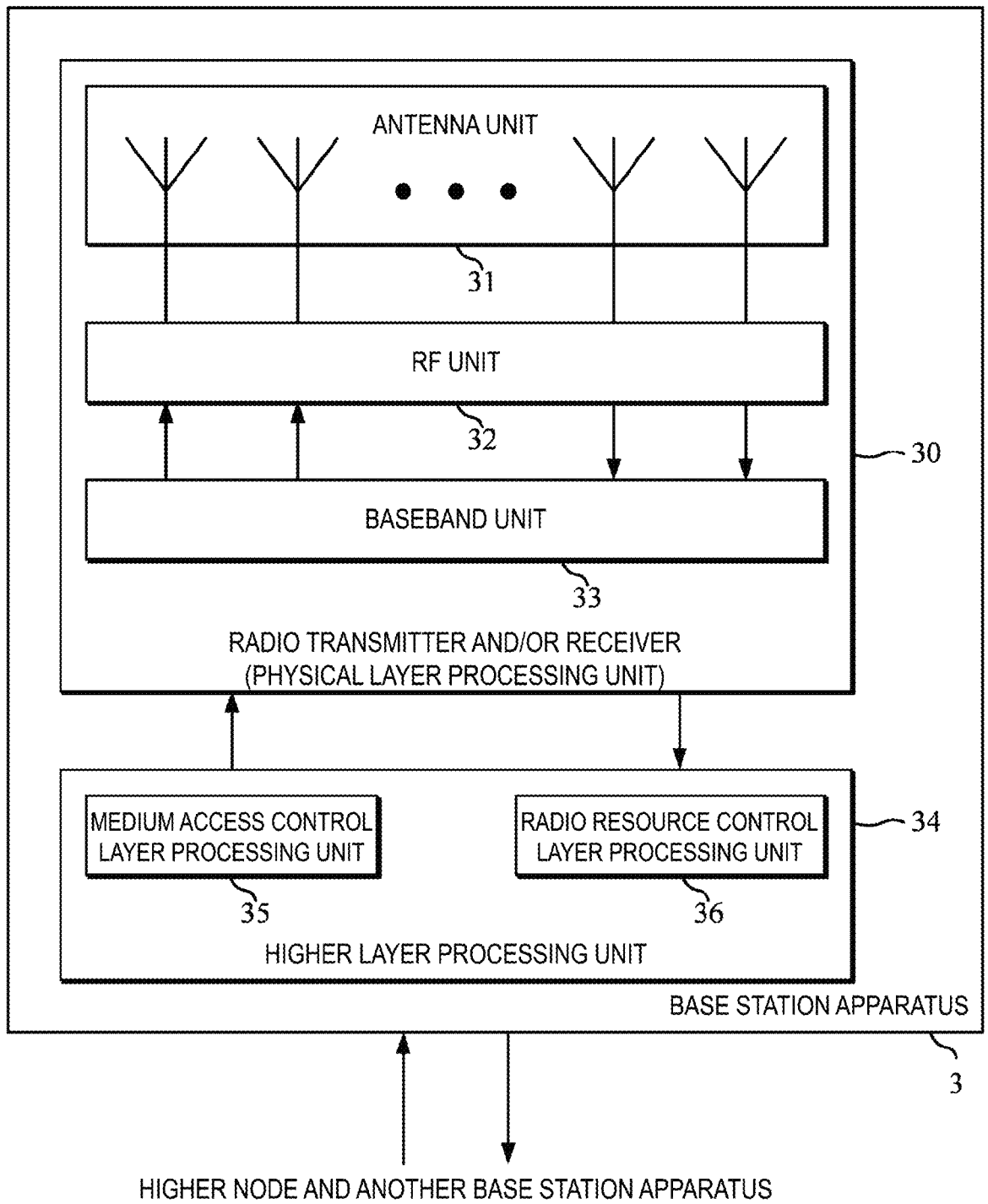
FIG. 23 is a schematic block diagram illustrating a configuration of a base station apparatus 3 according to an embodiment of the present invention.

FIG. 23 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, a monitor unit, or a physical layer processing unit. A controller controlling operations of the units based on various conditions may be separately provided. The higher layer processing unit 34 is also referred to as a control unit 34.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer. The higher layer processing unit 34 functions to determine whether to repeatedly transmit the transport block, based on the higher layer signaling transmitted to the terminal apparatus 1. The higher layer processing unit 34 determines, based on the higher layer signaling transmitted to the terminal apparatus 1, whether to perform the first aggregation transmission and/or the second aggregation transmission. The higher layer processing unit 34 functions to control the symbol allocation expansion (start symbol expansion and/or symbol number expansion), the number of dynamic repetitions, and/or the mini-slot aggregation transmission for the aggregation transmission (the second aggregation transmission), based on the higher layer signaling transmitted to the terminal apparatus 1. The higher layer processing unit 34 determines whether to perform the frequency hopping transmission of the transport block, based on the higher layer signaling transmitted to the terminal apparatus 1. The higher layer processing unit 34 functions to control the configuration of the first frequency hop and the second frequency hop, based on the number of repetition transmissions of the same transport block within one slot. The higher layer processing unit 34 outputs the frequency hopping information, the aggregation transmission information, and the like to the radio transmission and/or reception unit 30.

The higher layer processing unit 34 functions to control the second number, based on the higher layer signaling including the first number of repetition transmissions and/or the DCI field including the first number. The first number may be the number of repetition transmissions of the same transport block within a slot and across slots. The second number may be the number of repetition transmissions of the same transport block within a slot.

The medium access control layer processing unit 35 included in the higher layer processing unit 34 performs processing of the MAC layer. The medium access control layer processing unit 35 performs processing associated with a scheduling request, based on various types of configuration information/parameters managed by the radio resource control layer processing unit 36.

The radio resource control layer processing unit 36 included in the higher layer processing unit 34 performs processing of the RRC layer. The radio resource control layer processing unit 36 generates, for the terminal apparatus 1, downlink control information (uplink grant and downlink grant) including resource allocation information. The radio resource control layer processing unit 36 generates or acquires from a higher node, downlink control information, downlink data (transport block and random access response) mapped to a physical downlink shared channel, system information, an RRC message, a MAC Control Element (CE), and the like, and outputs the generated or acquired data and the like to the radio transmission and/or reception unit 30. Further, the radio resource control layer processing unit 36 manages various types of configuration information/parameters for each terminal apparatus 1. The radio resource control layer processing unit 36 may set various types of configuration information/parameters for each terminal apparatus 1 via higher layer signals. In other words, the radio resource control layer processing unit 36 transmits/broadcasts information indicating various types of configuration information/parameters. The radio resource control layer processing unit 36 may transmit/report information for identifying a configuration of one or multiple reference signals in a certain cell.

In a case that the base station apparatus 3 transmits the RRC message, the MAC CE, and/or the PDCCH to the terminal apparatus 1, and the terminal apparatus 1 performs processing, based on the reception, the base station apparatus 3 performs processing (control of the terminal apparatus 1 and the system) assuming that the terminal apparatus is performing the above-described processing. In other words, the base station apparatus 3 sends, to the terminal apparatus 1, the RRC message, MAC CE, and/or PDCCH intended to cause the terminal apparatus to perform the processing based on the reception.

The radio transmission and/or reception unit 30 transmits higher layer signaling (RRC message), DCI, and the like to the terminal apparatus 1. The radio transmission and/or reception unit 30 receives the uplink signal transmitted from the terminal apparatus 1 based on an indication from the higher layer processing unit 34. The radio transmission and/or reception unit 30 can receive the repetition transmission of the transport block from the terminal apparatus 1, based on an indication from the higher layer processing unit 34. In a case that the repetition transmission of the transport block is configured, the radio transmission and/or reception unit 30 receives the repetition transmission of the same transport block. The number of repetition transmissions is given based on an indication from the higher layer processing unit 34. The radio transmission and/or reception unit 30 receives the PUSCH in the aggregation transmission, based on the information related to the first number of repetitions, the first number, and the second number which are indicated by the higher layer processing unit 34. The radio transmission and/or reception unit 30 can control the aggregation transmission, based on prescribed conditions. Specifically, the radio transmission and/or reception unit 30 functions, in a case of satisfying a first condition, to apply the same symbol allocation to each slot and repeatedly receive the transport block N times in continuous N slots in a case that the second aggregation transmission parameter is configured and to receive the transport block once in a case that the second aggregation transmission parameter is not configured. Here, the value of N is indicated in the second aggregation transmission parameter. The radio transmission and/or reception unit 30 functions, in a case of satisfying a second condition, to receive the transport block by applying the mini-slot aggregation transmission. The first condition at least includes the DCI transmitted to the terminal apparatus 1 and indicating the PUSCH mapping type as the type A. The second condition at least includes the DCI transmitted to the terminal apparatus 1 and indicating the PUSCH mapping type as the type B. In addition, some of the functions of the radio transmission and/or reception unit 30 are similar to the corresponding functions of the radio transmission and/or reception unit 10, and thus description of these functions is omitted. Note that in a case that the base station apparatus 3 is connected to one or multiple transmission reception points 4, some or all of the functions of the radio transmission and/or reception unit 30 may be included in each of the transmission reception points 4.

Further, the higher layer processing unit 34 transmits (transfers) or receives control messages or user data between the base station apparatuses 3 or between a higher network apparatus (MME, S-GW (Serving-GW)) and the base station apparatus 3. Although, in FIG. 23, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a radio resource management layer processing unit or an application layer processing unit reside in the higher layer processing unit 34.

Note that "units" in the drawing refer to constituent elements to realize the functions and the procedures of the terminal apparatus 1 and the base station apparatus 3, which are also represented by the terms such as a section, a circuit, a constituting apparatus, a device, a unit, and the like.

Each of the units having the reference signs 10 to 16 included in the terminal apparatus 1 may be implemented as a circuit. Each of the units having the reference signs 30 to 36 included in the base station apparatus 3 may be implemented as a circuit.

(1) More specifically, a terminal apparatus 1 according to a first aspect of the present invention includes a reception circuitry reception circuitry 10 configured to receive an RRC message including a first aggregation transmission parameter and to receive DCI, a transmission circuitry 10 configured to transmit a PUSCH scheduled by the DCI. In a case of satisfying a first condition, the transmission circuitry 10 applies the same symbol allocation in multiple slots and repeatedly transmits a transport block N times in continuous N slots in a case that a second aggregation transmission parameter is configured, a value of N being indicated in the second aggregation transmission parameter, and the transmission circuitry 10 transmits the transport block once in a case that the second aggregation transmission parameter is not configured, and in a case of satisfying a second condition, the transmission circuitry 10 transmits, by applying mini-slot aggregation transmission, the transport block.

(2) A base station apparatus 3 according to a second aspect of the present invention includes a transmission circuitry 30 configured to transmit an RRC message including a first aggregation transmission parameter and to transmit DCI, and a reception circuitry 30 configured to receive a PUSCH scheduled by the DCI. In a case that a first condition is satisfied, the same symbol allocation is applied in multiple slots and a transport block is repeatedly received N times in continuous N slots in a case that a second aggregation transmission parameter is configured, a value of N being indicated in the second aggregation transmission parameter, and in a case that the second aggregation transmission parameter is not configured, the transport block is received once, and in a case that a second condition is satisfied, mini-slot aggregation transmission is applied and the transport block is received.

(3) In the first aspect or the second aspect of the present invention, in the mini-slot aggregation transmission, the same transport block is repeatedly transmitted once or more than once within one slot.

(4) In the first aspect or the second aspect of the present invention, the first condition at least includes the DCI indicating a PUSCH mapping type as a type A.

(5) In the first aspect or the second aspect of the present invention, the second condition at least includes the DCI indicating a PUSCH mapping type as a type B.

(6) A terminal apparatus 1 according to a third aspect of the present invention includes a reception circuitry 10 configured to receive an uplink grant, and a transmission circuitry 10 configured to transmit a PUSCH including frequency hopping for which the uplink grant is scheduled. The PUSCH includes $N_{rep}$ repetition transmissions of the same transport block within one slot, and the PUSCH includes a first frequency hop and a second frequency hop in one slot, and in a case that the $N_{rep}$ is 1, the first frequency hop includes Floor(L/2) symbols and the second frequency hop includes L−Floor(L/2) symbols, and the L is the number of symbols corresponding to one repetition transmission of the $N_{rep}$ repetition transmissions, and in a case that the $N_{rep}$ is greater than one, the first frequency hop includes symbols corresponding to first Floor($N_{rep}$/2) repetition transmissions of the $N_{rep}$ repetition transmissions, and the second frequency hop includes symbols corresponding to $N_{rep}$−Floor($N_{rep}$/2) repetition transmissions of the $N_{rep}$ repetition transmissions.

(7) A base station apparatus 3 according to a fourth aspect of the present invention includes: a transmission circuitry 30 configured to transmit an uplink grant, and a reception circuitry 30 configured to receive a PUSCH including frequency hopping for which the uplink grant is scheduled.

The PUSCH includes $N_{rep}$ repetition transmissions of the same transport block within one slot, and the PUSCH includes a first frequency hop and a second frequency hop in one slot, and in a case that the $N_{rep}$ is 1, the first frequency hop includes Floor (L/2) symbols and the second frequency hop includes L−Floor(L/2) symbols, and the L is the number of symbols corresponding to one reception transmission of the $N_{rep}$ repetition transmissions, and in a case that the $N_{rep}$ is greater than one, the first frequency hop includes symbols corresponding to first Floor($N_{rep}$/2) repetition transmissions of the $N_{rep}$ repetition transmissions, and the second frequency hop includes symbols corresponding to $N_{rep}$−Floor ($N_{rep}$/2) repetition transmissions of the $N_{rep}$ repetition transmissions.

(8) In the third aspect or the fourth aspect of the present invention, the number of symbols corresponding to each of the repetition transmissions of the same transport block within one slot may be the same or vary.

(9) In the third aspect or the fourth aspect of the present invention, the $N_{rep}$ repetition transmissions are continuously or non-continuously transmitted within one slot.

(10) A terminal apparatus 1 according to a fifth aspect of the present invention includes a reception circuitry 10 configured to receive an RRC message including a first aggregation transmission parameter and to receive DCI, and a transmission circuitry 10 configured to transmit a PUSCH scheduled by the DCI. The first aggregation transmission parameter includes information related to a first number of repetitions, a field in the DCI includes a first number, and a second number is calculated based on the first number, and the transmission circuitry transmits the PUSCH in aggregation transmission, based on the information related to the first number of repetitions, the first number, and the second number.

(11) A base station apparatus 3 according to a sixth aspect of the present invention includes a transmission circuitry 30 configured to transmit an RRC message including a first aggregation transmission parameter and to transmit DCI, and a reception circuitry 30 configured to receive a PUSCH scheduled by the DCI. The first aggregation transmission parameter includes information related to a first number of repetitions, a field in the DCI includes a first number, and a second number is calculated based on the first number, and the reception circuitry receives the PUSCH in aggregation transmission, based on the information related to the first number of repetitions, the first number, and the second number.

(12) In the fifth aspect or the sixth aspect of the present invention, the first number is the number of repetition transmissions of the same transport block within a slot and across slots, and the second number is the number of repetition transmissions of the same transport block within a slot.

(13) In the fifth aspect or the sixth aspect of the present invention, the first number is the number of repetition transmissions of the same transport block within a slot, and the second number is the number of repetition transmissions of the same transport block within a slot and across slots.

(14) In the fifth aspect or the sixth aspect of the present invention, the number of repetition transmissions of the same transport block within a slot, and the second number is the number of slots used for repetition transmissions of the same transport block.

With this configuration, the terminal apparatus 1 is capable of efficiently communicating with the base station apparatus 3.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiments according to the present invention may be recorded in a computer-readable recording medium. It may be implemented by causing a computer system to read and execute the program recorded on this recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general purpose processor may be a microprocessor or may be a processor, a controller, a micro-controller, or a state machine of known type, instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that, in the embodiments according to the present invention, an example has been described in which the present invention is applied to a communication system including a base station apparatus and a terminal apparatus, but the present invention can also be applied in a system in which terminals communicate as in the case of Device to Device (D2D).

Note that the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, as for the present invention, various modifications are possible within the scope of claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

The invention claimed is:

1. A user equipment (UE) comprising:
reception circuitry configured to receive, from a base station apparatus, a physical downlink control channel with a downlink control information (DCI) format;
transmission circuitry configured to perform physical uplink shared channel (PUSCH) repetition transmissions of a transport block (TB) scheduled by the DCI format; and
control circuitry configured to:
determine, based on a value of a time resource assignment field in the DCI format, a starting symbol of a first PUSCH in a first slot, and a first number of consecutive symbols counting from the starting symbol, and
determine, in a case that the first number of consecutive symbols counting from the starting symbol exceed a last symbol of the first slot, the first PUSCH within the first slot and a second PUSCH within a slot next to the first slot, wherein
a number of symbols of the first PUSCH is a second number of symbols from the starting symbol in the first slot to the last symbol of the first slot,
a number of symbols of the second PUSCH is a number of symbols given by subtracting the second number from the first number,
in a case that a number of first consecutively available symbols for PUSCH transmission within a transmission occasion of the first PUSCH exceeds a predetermined value, a repetition of the TB is performed in the first consecutively available symbols of the first PUSCH,
in a case that the number of the first consecutively available symbols for PUSCH transmission within the transmission occasion of the first PUSCH does not exceed the predetermined value, the repetition of the TB is not performed in the transmission occasion of the first PUSCH,
in a case that a number of second consecutively available symbols for PUSCH transmission within a transmission occasion of the second PUSCH exceeds the predetermined value, a repetition of the TB is performed in the second consecutively available symbols of the second PUSCH, and in a case that the number of the second consecutively available symbols for PUSCH transmission within the transmission occasion of the second PUSCH does not exceed the predetermined value, the repetition of the TB is not performed in the transmission occasion of the second PUSCH.

2. A base station apparatus comprising:

control circuitry configured to generate, a downlink control information (DCI) format including a time resource assignment field used to indicate a starting symbol of a first physical uplink shared channel (PUSCH) in a first slot, and a first number of consecutive symbols counting from the starting symbol;

transmission circuitry configured to transmit, to a user equipment (UE), a physical downlink control channel with the DCI format; and reception circuitry configured to receive, from the UE, PUSCH repetition transmissions of a transport block (TB) scheduled by the DCI format, wherein the control circuitry is configured to:
determine, in a case that the first number of consecutive symbols counting from the starting symbol exceed a last symbol of the first slot, the first PUSCH within the first slot and a second PUSCH within a slot next to the first slot, wherein a number of symbols of the first PUSCH is a second number of symbols from the starting symbol in the first slot to the last symbol of the first slot, a number of symbols of the second PUSCH is a number of symbols given by subtracting the second number from the first number, in a case that a number of first consecutively available symbols for PUSCH transmission within a transmission occasion of the first PUSCH exceeds a predetermined value, a repetition of the TB is received by the base station in the first consecutively available symbols of the first PUSCH, and in a case that the number of the first consecutively available symbols for PUSCH transmission within the transmission occasion of the first PUSCH does not exceed the predetermined value, the repetition of the TB is not received by the base station in the transmission occasion of the first PUSCH, in a case that a number of second consecutively available symbols for PUSCH transmission within a transmission occasion of the second PUSCH exceeds the predetermined value, a repetition of the TB is received by the base station in the second consecutively available symbols of the second PUSCH, and in a case that the number of the second consecutively available symbols for PUSCH transmission within the transmission occasion of the second PUSCH does not exceed the predetermined value, the repetition of the TB is not received by the base station in the transmission occasion of the second PUSCH.

3. A communication method for a user equipment (UE), the communication method comprising the steps of:

receiving, from a base station apparatus, physical downlink control channel with a downlink control information (DCI) format;

performing physical uplink shared channel (PUSCH) repetition transmissions of a transport block (TB) scheduled by the DCI format;

determining, based on a value of a time resource assignment field in the DCI format, a starting symbol of a first PUSCH in a first slot, and a first number of consecutive symbols counting from the starting symbol; and determining, in a case that the first number of consecutive symbols counting from the starting symbol exceed a last symbol of the first slot, the first PUSCH within the first slot and a second PUSCH within a slot next to the first slot, wherein a number of symbols of the first PUSCH is a second number of symbols from the starting symbol in the first slot to the last symbol of the first slot, a number of symbols of the second PUSCH is a number of symbols given by subtracting the second number from the first number, in a case that a number of first consecutively available symbols for PUSCH transmission within a transmission occasion of the first PUSCH exceeds a predetermined value, a repetition of the TB is performed in the first consecutively available symbols of the first PUSCH, in a case that the number of the first consecutively available symbols for PUSCH transmission within the transmission occasion of the first PUSCH does not exceed the predetermined value, the repetition of the TB is not performed in the transmission occasion of the first PUSCH, in a case that a number of second consecutively available symbols for PUSCH transmission within a transmission occasion of the second PUSCH exceeds the predetermined value, a repetition of the TB is performed in the second consecutively available symbols of the second PUSCH, and in a case that the number of the second consecutively available symbols for PUSCH transmission within the transmission occasion of the second PUSCH does not exceed the predetermined value, the repetition of the TB is not performed in the transmission occasion of the second PUSCH.

4. A communication method for a base station apparatus, the communication method comprising the steps of:

generating, a downlink control information (DCI) format including a time recourse assignment field used to indicate a starting symbol of a first PUSCH in a first slot, and a first number of consecutive symbols counting from the starting symbol;

transmitting, to a user equipment (UE), a physical downlink control channel with the DCI format;

receiving, from the UE, physical uplink shared channel (PUSCH) repetition transmissions of a transport block (TB) scheduled by the DCI format; and determining, in a case that the first number of consecutive symbols counting from the starting symbol exceed a last symbol of the first slot, the first PUSCH within the first slot and a second PUSCH within a slot next to the first slot, wherein a number of symbols of the first PUSCH is a second number of symbols from the starting symbol in the first slot to the last symbol of the first slot, a number of symbols of the second PUSCH is a number of symbols given by subtracting the second number from the first number, in a case that a number of first consecutively available symbols for PUSCH transmission within a transmission occasion of the first PUSCH exceeds a predetermined value, a repetition of the TB is received by the base station in the first consecutively available symbols of the first PUSCH, in a case that the number of the first consecutively available symbols for PUSCH transmission within the transmission occasion of the first PUSCH does not exceed the predetermined value, the repetition of the TB is not received by the base station in the transmission occasion of the first PUSCH, in a case that a number of second consecutively available symbols for PUSCH transmission within a transmission occasion of the second PUSCH exceeds the predetermined value, a repetition of the TB is received by the base station in the second consecutively available symbols of the second PUSCH, and in a case that the number of the second consecutively available symbols for PUSCH transmission within the transmission occasion of the second PUSCH does not exceed the predetermined value, the repetition of the TB is not received by the base station in the transmission occasion of the second PUSCH.

* * * * *